United States Patent
Yamada

(10) Patent No.: US 12,039,400 B2
(45) Date of Patent: *Jul. 16, 2024

(54) OPTICAL INFORMATION READING DEVICE

(71) Applicant: Keyence Corporation, Osaka (JP)

(72) Inventor: Ikuo Yamada, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,322

(22) Filed: May 17, 2023

(65) Prior Publication Data

US 2023/0289545 A1    Sep. 14, 2023

Related U.S. Application Data

(63) Continuation of application No. 17/542,538, filed on Dec. 6, 2021, now Pat. No. 11,694,048.

(30) Foreign Application Priority Data

Mar. 3, 2021   (JP) .................. 2021-033619
Oct. 5, 2021   (JP) .................. 2021-164236

(51) Int. Cl.
*G06K 7/14*   (2006.01)
*G06K 7/10*   (2006.01)
*G06N 5/04*   (2023.01)

(52) U.S. Cl.
CPC ....... *G06K 7/1417* (2013.01); *G06K 7/10881* (2013.01); *G06N 5/04* (2013.01); *G06K 2007/10524* (2013.01)

(58) Field of Classification Search
CPC ..... G06K 7/1417; G06K 7/10881; G06N 5/04
See application file for complete search history.

(56) References Cited

U.S. PATENT DOCUMENTS 11,694,048 B2 *   7/2023   Yamada ............... G06N 3/0455
                                                235/462.1
2022/0284208 A1   9/2022   Yamada

FOREIGN PATENT DOCUMENTS

JP           6683666 B2    4/2020

OTHER PUBLICATIONS

U.S. Appl. No. 17/542,537, filed Dec. 6, 2021 (126 pages).
(Continued)

*Primary Examiner* — Matthew Mikels
(74) *Attorney, Agent, or Firm* — Kilyk & Bowersox, P.L.L.C.

(57) ABSTRACT

To suppress an increase in processing time due to a load of inference processing while improving reading accuracy by the inference processing of machine learning. An optical information reading device includes a processor including: an inference processing part that inputs a code image to a neural network and executes inference processing of generating an ideal image corresponding to the code image; and a decoding processing part that executes first decoding processing of decoding the code image and second decoding processing of decoding the ideal image generated by the inference processing part. The processor executes the inference processing and the first decoding processing in parallel, and executes the second decoding processing after completion of the inference processing.

12 Claims, 36 Drawing Sheets

(56) References Cited

OTHER PUBLICATIONS

Martel et al., "Neural Sensors: Learning Pixel Exposures for HDR Imaging and Video Compressive Sensing With Programmable Sensors," IEEE Transactions on Pattern Analysis and Machine Intelligence, vol. 42. No. 7, pp. 1642-1653, Jul. 2020.

* cited by examiner

DEFECTIVE IMAGE

IDEAL IMAGE

READ IMAGE (DEGRADED IMAGE)

IMAGE OBTAINED AFTER EXECUTION OF IMAGE PROCESSING FILTER
(AVERAGING FILTER)

REDUCED IMAGE

CODE CANDIDATE REGION EXTRACTION IMAGE

BEFORE INFERENCE PROCESSING     AFTER INFERENCE PROCESSING

OPTICAL INFORMATION READING DEVICE

CROSS-REFERENCE TO RELATED APPLICATIONS

The present application is a continuation of U.S. patent application Ser. No. 17/542,538 filed Dec. 6, 2021, which in turn claims foreign priority based on Japanese Patent Application No. 2021-033619, filed Mar. 3, 2021, and No. 2021-164236, filed Oct. 5, 2021, the contents of which are incorporated herein by references.

BACKGROUND OF THE INVENTION

1. Field of the Invention

The present aspect relates to an optical information reading device that optically reads information.

2. Description of Related Art

In recent years, for example, the importance of so-called traceability that enables a distribution route of an article to be tracked from a manufacturing stage to a consumption stage or a disposal stage has increased, and code readers for the purpose of such traceability have been widely used. In addition to the traceability, the code readers are used in various fields.

In general, a code reader is configured to be capable of capturing an image of a code, such as a bar code and a two-dimensional code, attached to a workpiece with a camera, cutting and binarizing the code included in the obtained image by image processing, and performing decoding processing to read information, and is a device that optically reads information, and thus, is also called an optical information reading device.

As this type of optical information reading device, a device including a machine learning device that learns a model structure representing a relationship between an image of a code acquired by a visual sensor of a robot and an image of an ideal code is known, for example, as disclosed in Japanese Patent No. 6683666.

Japanese Patent No. 6683666 describes that an image appropriate for reading is restored by applying a learning result of the machine learning device to the image of the code acquired by the visual sensor during operation.

Meanwhile, the image restoration by the machine learning, that is, inference processing of an ideal image has a heavy calculation load on a processor, and it takes time for the processing. Therefore, in a case of a code image that is not difficult to read, that is, a code image in a good printing state, it is preferable to immediately execute decoding processing on the code image without inputting the code image into a neural network and executing the inference processing of the ideal image in consideration of the processing time. On the other hand, it is not easy to determine in advance whether the inference processing by the machine learning is necessary from the code image, and it takes time for the processing if the decoding processing and the inference processing by the machine learning are serially performed.

SUMMARY OF THE INVENTION

The present aspect has been made in view of such a point, and an object thereof is to suppress an increase in processing time due to a load of inference processing while improving reading accuracy by the inference processing of machine learning.

In order to achieve the above object, according to one embodiment of the invention, an optical information reading device that reads a code attached to a workpiece is used as a premise. The optical information reading device includes: a camera that captures an image of the code and generates a code image; a storage part that stores a structure and a parameter of a neural network configured to estimate an ideal image corresponding to the code image generated by the camera; and a processor including an inference processing part that inputs the code image generated by the camera to the neural network configured using the structure and parameter stored in the storage part and executes inference processing of generating the ideal image corresponding to the code image, and a decoding processing part that executes first decoding processing of decoding the code image generated by the camera and second decoding processing of decoding the ideal image generated by the inference processing part. The processor is configured to execute inference processing by the inference processing part and first decoding processing by the decoding processing part in parallel, and execute the second decoding processing by the decoding processing part after completion of the inference processing by the inference processing part.

According to this configuration, in a case where a code image generated by the camera during the operation of the optical information reading device is not appropriate for code reading as in a case where a printed state of a code is poor, the code image generated by the camera is input to the inference processing part to execute the inference processing, whereby the ideal image is generated. On the other hand, in a case where a code image generated by the camera during the operation of the optical information reading device is appropriate for code reading as in a case where a printed state of a code is good, the first decoding processing is performed by the decoding processing part without inputting the code image generated by the camera to the inference processing part. Since the inference processing and the first decoding processing are executed in parallel, it is possible to execute the decoding processing on another code image, which does not require the inference processing, during the execution of the inference processing on a code image, which requires the inference processing, or to execute the inference processing on another code image, which requires the inference processing, during the execution of the decoding processing on a code image which does not require the inference processing. As a result, the processing time is shortened. Note that the first decoding processing and the inference processing may be executed on the same code image.

In addition, after the inference processing by the inference processing part is completed, the second decoding processing is executed to decode the ideal image, and thus, the reading accuracy is improved.

According to another embodiment of the invention, the decoding processing part may include a core that executes the first decoding processing and the second decoding processing in parallel with different threads.

According to still another embodiment of the invention, the decoding processing part may include a multi-core capable of executing the first decoding processing and the second decoding processing in different cores.

According to this configuration, the core that executes the first decoding processing and the core that executes the second decoding processing are separate cores, and thus, the first decoding processing and the second decoding processing can be executed in parallel, and the processing time is shortened.

According to still another embodiment of the invention, the decoding processing part includes a general-purpose core that executes extraction processing of extracting a code candidate region in which a code is highly likely to be present from the code image generated by the camera, and the first decoding processing of decoding a partial image extracted from the code image by the extraction processing. The inference processing part includes an inference processing-dedicated core that inputs the partial image extracted from the code image by extraction processing and executes the inference processing of generating an ideal image corresponding to the code image.

According to this configuration, the extraction processing of the code candidate region and the first decoding processing of decoding the partial image extracted by the extraction processing can be executed by the general-purpose core, and the inference processing can be executed by the inference processing-dedicated core specialized in the inference processing different from the general-purpose core. Thus, the inference processing can be speeded up.

According to still another embodiment of the invention, the general-purpose core executes the second decoding processing of decoding the ideal image generated by the inference processing executed by the inference processing-dedicated core.

According to still another embodiment of the invention, the general-purpose core includes a first core that executes the extraction processing, a second core that executes the first decoding processing, and a third core that executes the second decoding processing.

According to this configuration, all of the extraction processing, the first decoding processing, and the second decoding processing can be executed by different cores. In particular, the second core and the third core can be configured as cores specialized for decoding processing, and thus, the processing is further speeded up.

According to still another embodiment of the invention, the general-purpose core executes the second decoding processing of decoding the ideal image in preference to the first decoding processing when the ideal image is generated by the inference processing executed by the inference processing-dedicated core.

That is, when the ideal image is generated by the inference processing, the code image is considered to be difficult to read since the processing time for the first decoding processing on the code image generated by the camera is long. Therefore, when the ideal image is generated, the ideal image is decoded in preference to the first decoding processing on the code image generated by the camera, so that a highly accurate reading result can be obtained in a short time.

According to still another embodiment of the invention, the inference processing-dedicated core can execute the inference processing on a plurality of the partial images in a predetermined order when the plurality of partial images are extracted as a result of the extraction processing by the general-purpose core. In addition, the general-purpose core can execute the first decoding processing on the plurality of partial images in a predetermined order when the plurality of the partial images are extracted as the result of the extraction processing.

That is, there may be a case where a plurality of code candidate regions are present in one code image when the one code image is generated by capturing an image of a workpiece. In this case, the plurality of partial images are extracted. For the plurality of partial images, for example, the inference processing can be executed in descending order of priority of the inference processing. In addition, the first decoding processing can be executed on the plurality of partial images in descending order of priority of the decoding processing, for example. The priority may be based on a condition for determining the predetermined order. For example, the processing may be executed from a partial image having a higher possibility of presence of the code.

According to still another embodiment of the invention, the processor is configured to end the inference processing executed by the inference processing part when decoding has succeeded in the first decoding processing.

That is, the first decoding processing is decoding processing on the code image that has not been subjected to the inference processing. The success in the decoding processing on the code image means that the code image is not difficult to read, and the inference processing is sometimes unnecessary. In this case, it is possible to start the inference processing for another code image input next at an early stage by ending the inference processing even in the middle of the inference processing.

According to still another embodiment of the invention, the general-purpose core can execute first extraction processing of extracting the code candidate region under a first predetermined condition, second extraction processing of extracting the code candidate region under a second predetermined condition that enables extraction with higher accuracy than the first predetermined condition, and first decoding processing of decoding a partial image extracted from the code image by the first extraction processing. In addition, the inference processing-dedicated core can input the partial image extracted from the code image by the second extraction processing and executes the inference processing of generating an ideal image corresponding to the code image.

According to this configuration, the general-purpose core can perform the first extraction processing with relatively low accuracy and the second extraction processing with relatively high accuracy. The first extraction processing can perform high-speed extraction although the accuracy is low. Thus, the partial image extracted from the code image by the first extraction processing is decoded by the first decoding processing, and a reading result can be output in a short time if the decoding succeeds.

On the other hand, a code image that fails in decoding by the first decoding processing is an image that is difficult to read, and is hardly extracted in the first extraction processing in some cases. In such cases, the partial image extracted in the second extraction processing, which enables more accurate extraction, is subjected to the inference processing by the inference processing-dedicated core, thereby generating the ideal image. The reading accuracy is enhanced by performing the second decoding processing on the generated ideal image.

That is, the first decoding processing can output the reading result of the code image that is easy to read at high speed, and the second decoding processing can read the code image that is likely to fail in decoding by the first decoding processing and can reduce the frequency of failure in decoding.

According to still another embodiment of the invention, the optical information reading device further includes a memory that stores the partial image extracted from the code image by the extraction processing, and is accessible by both the general-purpose core and the inference processing-dedicated core.

According to this configuration, an extraction result by the extraction processing can be shared between the general-purpose core and the inference processing-dedicated core, and thus, the processing can be speeded up. The memory includes a RAM or the like, and the general-purpose core and the inference processing-dedicated core can be configured to be capable of accessing the same RAM.

According to still another embodiment of the invention, the general-purpose core and the inference processing-dedicated core may be mounted on the same substrate. In this case, the inference processing-dedicated core can be configured using an IC, an FPGA, or the like dedicated to the inference processing by the neural network.

According to still another embodiment of the invention, an image restoration part that inputs the code image to the neural network and executes inference processing of generating a restored image obtained by restoring the code image, a first decoding processing part that executes first decoding processing on the code image generated by the camera, and a second decoding processing part that executes second decoding processing on the restored image generated by the image restoration part are further provided. The second decoding processing part extracts a code candidate region from the code image and sends a trigger signal to the image restoration part to execute the inference processing. When receiving the trigger signal sent from the second decoding processing part, the image restoration part inputs a partial image corresponding to the code candidate region to the neural network and executes the inference processing of generating a restored image obtained by restoring the partial image. The second decoding processing part can determine a grid position indicating each cell position of the code based on the restored image, and execute decoding of the restored image based on the determined grid position. That is, the first decoding processing part executes decoding of a normal code image that has not been subjected to the inference processing, the image restoration part executes the generation of the restored image by the inference processing, and the second decoding processing part decodes the restored image restored by the inference processing. Thus, it is possible to increase the processing speed by constructing processing circuits suitable for the respective parts. In addition, the image restoration part only needs to restore the partial image corresponding to the code candidate region, and thus, the processing speed can be further increased.

According to still another embodiment of the invention, the inference processing by the image restoration part and the first decoding processing by the first decoding processing part are executed in parallel. Thus, the processing speed can be increased. In addition, at least a part of a period during which the second decoding processing part executes the second decoding processing has a pause period during which the inference processing by the image restoration part is not executed. Thus, it is possible to reduce a load on the image restoration part and suppress heat generation. In this case, the second decoding processing part may include a plurality of cores.

According to still another embodiment of the invention, the first decoding processing part can execute the first decoding processing in a time shorter than a time required for the second decoding processing. Further, the setting part can switch whether to execute the second decoding processing, that is, whether to execute the decoding processing of the restored image. Since the second decoding processing executes the decoding processing of the restored image, the time required for the processing is longer than that of the first decoding processing of executing the decoding processing of the normal code image. Assuming this, in a case where it is set to execute the second decoding processing, a decoding timeout time (decoding limit time) longer than the time required for executing the second decoding processing can be set. On the other hand, in a case where it is set not to execute the second decoding processing, a decoding timeout time shorter than the time required for executing the second decoding processing can be set. Thus, when the decoding of the restored image exceeds the decoding timeout time, it is possible to quickly shift to the decoding processing of the next captured image.

The decoding processing part according to still another embodiment of the invention can execute the second decoding processing on the restored image in parallel with the first decoding processing on the code image generated by the camera, and thus, the processing speed can be increased even if both the code image and the restored image exist. In a case where it is set by the setting part not to execute the second decoding processing, the decoding processing part can allocate resource resources to be used for the second decoding processing to the first decoding processing. The processing resources are, for example, a use area of a memory, a core forming a multi-core CPU, and the like. If it is set not to execute the second decoding processing in a case where a memory area or the core is set in advance as the processing resources to be used for the second decoding processing, the memory area and the core can be used for the first decoding processing, and thus, the first decoding processing can be further speeded up.

The decoding processing part according to still another embodiment of the invention extracts a code candidate region in which the code is highly likely to be present from the code image. The image restoration part inputs a partial image corresponding to the code candidate region to the neural network, and generates a restored image obtained by restoring the partial image. The decoding processing part determines a grid position based on the restored image generated by the image restoration part, and executes decoding of the restored image based on the determined grid position. That is, it takes time to generate the restored image in many cases, the time required for generating the restored image can be shortened by extracting the code candidate region based on, for example, a characteristic amount indicating a code likelihood before generating the restored image. In addition, the determination of the grid position can be executed with high accuracy based on the restored image, and thus, the reading performance is improved.

According to still another embodiment of the invention, tuning processing of determining optimum imaging condition and decoding condition and setting a size of a code to be read is executed. The decoding processing part can determine a size of the extracted image including the code candidate region from the code image based on the size of the code set in the tuning processing. Since the extracted image is enlarged or reduced to an image having a predetermined size and then input to the neural network, a PPC of a code image input to the neural network can be kept within a predetermined range, and an image restoration effect by the neural network can be stably achieved. In addition, it is conceivable that there are various sizes of codes to be read, but the size of the code to be finally input to the neural network can be fixed, and thus, the balance between high-speed processing and the ease of decoding can be maintained at a certain level or more.

The camera according to still another embodiment of the invention receives light, which has passed through a first polarizing plate and been reflected from the code, through a second polarizing plate, and generates a code image having lower contrast as compared with a case where the first polarizing plate and the second polarizing plate are not interposed. Since a specular reflection component of the workpiece is removed by using the polarizing plate, it is possible to acquire the code image in which the influence of the specular reflection component has been reduced. For example, the polarizing plate is suitable for an image having many specular reflection components as in a case where the image is obtained by capturing a metal workpiece, but there is a case where the code image becomes dark due to a decrease in the amount of light, and the contrast decreases. In such a case, the reading performance is improved by converting the code image into the restored image with the high contrast by the inference processing of the neural network.

According to still another embodiment of the invention, the tuning execution part can set a plurality of imaging conditions and code conditions including first imaging condition and code condition and second imaging condition and code condition. The decoding processing part can input a code image generated under the first imaging condition and code condition to the neural network to generate a restored image, and can input a code image generated under the second imaging condition and code condition different from the first imaging condition and code condition to the neural network to generate a restored image when the decoding processing of the restored image fails, and execute decoding of the restored image.

As described above, the inference processing by the inference processing part and the decoding processing by the decoding processing part can be executed in parallel, and the decoding processing can be executed on the ideal image obtained after completion of the inference processing. Thus, it is possible to suppress the increase in processing time due to the load of the inference processing while improving the reading accuracy by the inference processing.

BRIEF DESCRIPTION OF THE DRAWINGS

FIGS. 8A and 8B illustrate a pair of a defective image and an ideal image, in which FIG. 8A is an example of the defective image and FIG. 8B is an example of the ideal image;

DETAILED DESCRIPTION OF PREFERRED EMBODIMENTS

Hereinafter, an embodiment of an aspect will be described in detail with reference to the drawings. Note that the following preferred embodiment is described merely as examples in essence, and there is no intention to limit the aspect, its application, or its use.

(Stationary Optical Information Reading Device)

Figure 1:
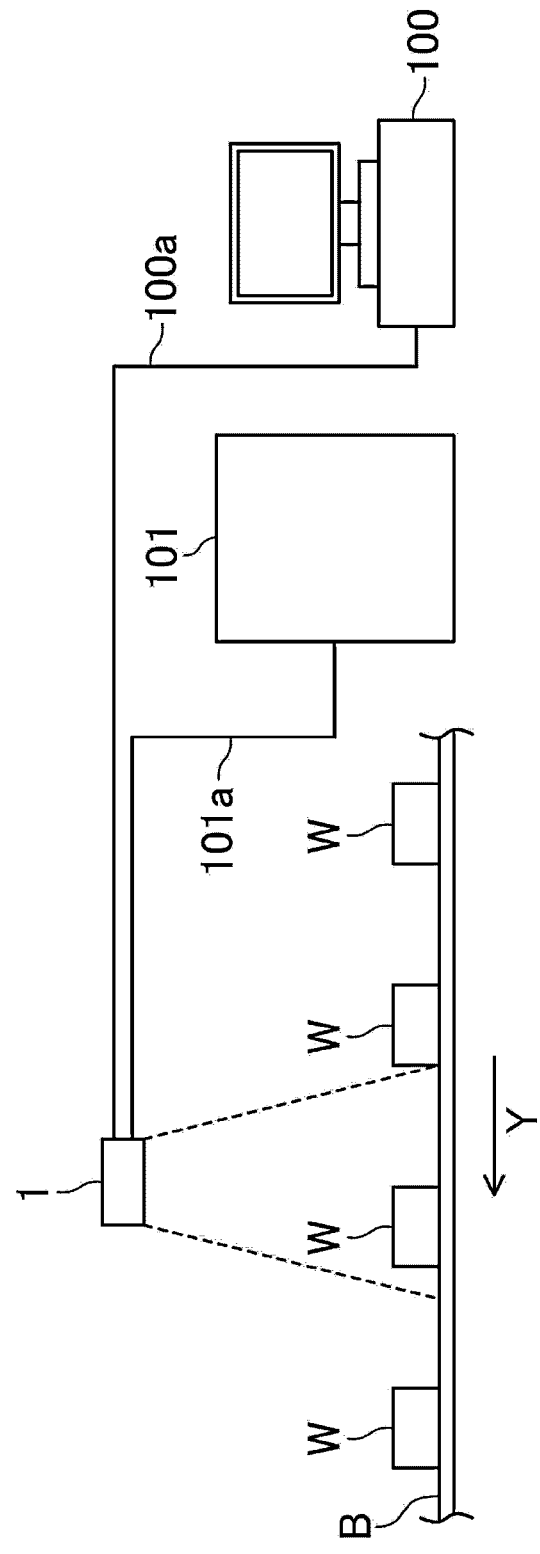
FIG. 1 is a diagram for describing the operation time of a stationary optical information reading device.

FIG. 1 is a diagram schematically illustrating the operation time of a stationary optical information reading device 1 according to the embodiment of the present aspect. In this example, a plurality of workpieces W are conveyed in a direction of arrow Y in FIG. 1 in the state of being placed on an upper surface of a conveying belt conveyor B, the optical information reading device 1 according to the embodiment is installed at a place separated upward from the workpieces W. The optical information reading device 1 is a code reader configured to be capable of capturing an image of a code attached to the workpiece W and reading information by performing decoding processing of the code included in the captured image. In the example illustrated in FIG. 1, the optical information reading device 1 is the stationary type. During the operation time of the stationary optical information reading device 1, the optical information reading device 1 is used in the state of being fixed to a bracket or the like (not illustrated) so as not to move. Note that the stationary optical information reading device 1 may be used in the state of being held by a robot (not illustrated). In addition, the code of the workpiece W in a stationary state may be read by the optical information reading device 1. The operation time of the stationary optical information reading device 1 is the time during which an operation of sequentially reading codes of the workpieces W conveyed by the conveying belt conveyor B is performed.

In addition, the code is attached to an outer surface of each of the workpieces W. The codes include both a barcode and a two-dimensional code. Examples of the two-dimensional code include a QR code (registered trademark), a micro QR code, a data matrix (data code), a Veri code, an Aztec code, PDF 417, a Maxi code, and the like. The two-dimensional code has a stack type and a matrix type, and the present aspect can be applied to any two-dimensional code. The code may be attached by printing or engraving directly on the workpiece W, may be attached by being pasted to the workpiece W after being printed on a label, and any mechanism or method may be used.

The optical information reading device 1 is connected to a computer 100 and a programmable logic controller (PLC) 101 in a wired manner by signal lines 100a and 101a, respectively. However, the aspect is not limited thereto, and the optical information reading device 1, the computer 100, and the PLC 101 may have built-in communication modules to wirelessly connect the optical information reading device 1 with the computer 100 and the PLC 101. The PLC 101 is a control device configured for sequence control of the conveying belt conveyor B and the optical information reading device 1, and can use a general-purpose PLC. The computer 100 can use a general-purpose or dedicated electronic calculator, a portable terminal, or the like.

In addition, the optical information reading device 1 receives a reading start trigger signal that defines a code reading start timing from the PLC 101 via the signal line 101a during its operation time. Then, the optical information reading device 1 captures an image of the code and decodes the image based on the reading start trigger signal. Thereafter, the decoding result is transmitted to the PLC 101 via the signal line 101a. In this manner, during the operation time of the optical information reading device 1, the input of the reading start trigger signal and the output of the decoding result are repeatedly performed via the signal line 101a between the optical information reading device 1 and an external control device such as the PLC 101. Note that the input of the reading start trigger signal and the output of the decoding result may be performed via the signal line 101a between the optical information reading device 1 and the PLC 101 as described above, or may be performed via another signal line (not illustrated). For example, a sensor configured to detect arrival of the workpiece W and the optical information reading device 1 may be directly connected to each other to input the reading start trigger signal from the sensor to the optical information reading device 1.

Figure 2:
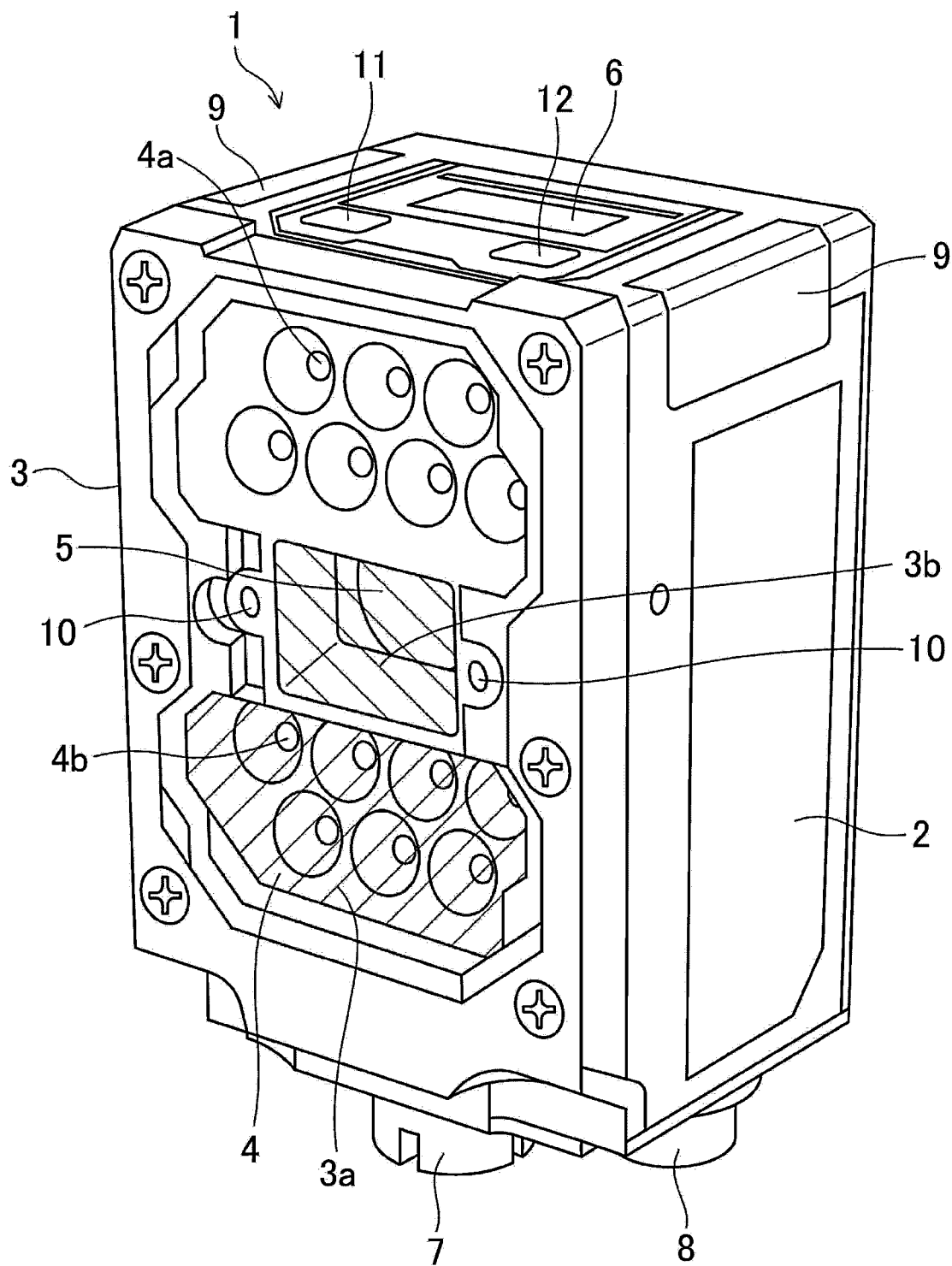
FIG. 2 is a perspective view of the stationary optical information reading device.

As illustrated in FIG. 2, the optical information reading device 1 includes a box-shaped housing 2, a polarizing filter attachment 3, an illumination part 4, a camera 5, a display part 6, a power connector 7, and a signal line connector 8. In addition, the housing 2 is provided with indicators 9, aimer light irradiation parts (light irradiation parts) 10, and operation buttons 11 and 12, and the indicator 9, the aimer light irradiation part 10, and the operation buttons 11 and 12 are also components of the optical information reading device 1.

The housing 2 has a shape that is long in a predetermined direction, but the shape of the housing 2 is not limited to the illustrated shape. The polarizing filter attachment 3 is detachably attached to a front outer surface of the housing 2. The housing 2 accommodates the illumination part 4, the camera 5, the aimer light irradiation part 10, a processor 20, a storage device 30, a ROM 40, a RAM 41, and the like. The processor 20, the storage device 30, the ROM 40, and the RAM 41 are also components of the optical information reading device 1.

Figure 3:
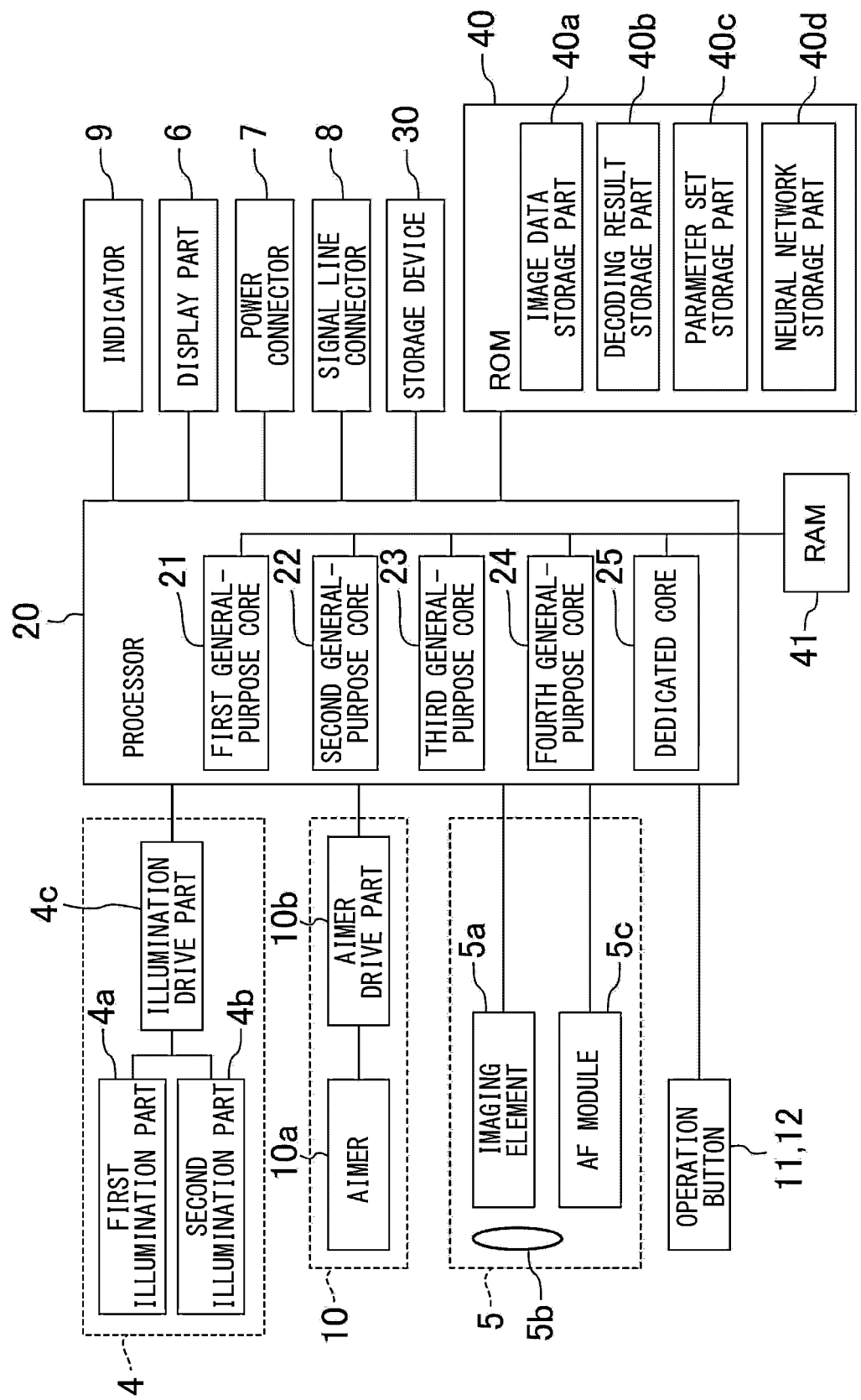
FIG. 3 is a block diagram of an optical information reading device.

The illumination part 4 is provided on the front side of the housing 2. The illumination part 4 is a portion configured to illuminate at least the code of the workpiece W by emitting light toward the front of the optical information reading device 1. As also illustrated in FIG. 3, the illumination part 4 includes a first illumination part 4a formed of a plurality of light emission diodes (LEDs), a second illumination part 4b formed of a plurality of light emission diodes, and an illumination drive part 4c formed of an LED driver or the like that drives the first illumination part 4a and the second illumination part 4b. The first illumination part 4a and the second illumination part 4b are individually driven by the illumination drive part 4c, and can be separately turned on and off. The illumination drive part 4c is connected to the processor 20, and the illumination drive part 4c is controlled by the processor 20. Note that one of the first illumination part 4a and the second illumination part 4b may be omitted.

As illustrated in FIG. 2, the camera 5 is provided in a central part on the front side of the housing 2. An optical axis direction of the camera 5 substantially coincides with a light irradiation direction of the illumination part 4. The camera 5 is a portion that captures a code and generates a code image. As illustrated in FIG. 3, the camera 5 includes: an imaging element 5*a* that receives light reflected from the code attached to the workpiece W and illuminated by the illumination part 4; an optical system 5*b* having a lens and the like; and an autofocus module (AF module) 5*c*. The light reflected from a portion of the workpiece W to which the code is attached is incident on the optical system 5*b*, and the incident light is emitted toward the imaging element 5*a* and forms an image on an imaging surface of the imaging element 5*a*.

The imaging element 5*a* is an image sensor including a light receiving element, such as a charge-coupled device (CCD) and a complementary metal oxide semiconductor (CMOS), which converts the image of the code obtained through the optical system 5*b* into an electrical signal. The imaging element 5*a* is connected to the processor 20, and the electrical signal converted by the imaging element 5*a* is input to the processor 20 as data of the code image. In addition, the AF module 5*c* is a mechanism that performs focusing by changing a position and a refractive index of a focusing lens among the lenses constituting the optical system 5*b*. The AF module 5*c* is also connected to the processor 20 and controlled by the processor 20.

As illustrated in FIG. 2, the display part 6 is provided on a side surface of the housing 2. The display part 6 is configured using, for example, an organic EL display, a liquid crystal display, or the like. The display part 6 is connected to the processor 20, and can display, for example, the code image-captured by the imaging part 5, a character string that is a decoding result of the code, a Reading Success rate, a matching level, and the like. The read success rate is an average read success rate when read processing is executed a plurality of times. The matching level is a reading margin that indicates the ease of reading the code that has been successfully decoded. This can be obtained from the number of error corrections having occurred during decoding, and can be expressed numerically, for example. The matching level (reading margin) increases as the error corrections decrease, and the matching level (reading margin) decreases as the error corrections increase.

A power cable (not illustrated), configured to supply power to the optical information reading device 1 from the outside, is connected to the power connector 7. In addition, the signal lines 100*a* and 101*a*, configured to perform communication with the computer 100 and the PLC 101, are connected to the signal line connector 8. The signal line connector 8 can be configured using, for example, an Ethernet connector, a serial communication connector such as an RS 232C, a USB connector, or the like.

The housing 2 is provided with the indicator 9. The indicator 9 is connected to the processor 20 and can be configured using a light emitting body such as a light emission diode. An operating state of the optical information reading device 1 can be notified to the outside by a lighting state of the indicator 9.

The pair of aimer light irradiation parts 10 is provided on the front side of the housing 2 so as to sandwich the camera 5. As illustrated in FIG. 3, the aimer light irradiation part 10 includes an aimer 10*a* formed of a light emission diode and the like, and an aimer drive part 10*b* that drives the aimer 10*a*. The aimer 10*a* emits light (aimer light) toward the front of the optical information reading device 1 to indicate a capturing range or the center of the visual field of the camera 5, a guide of an optical axis of the illumination part 4, and the like. Specifically, the aimer 10*a* emits visible light of a color (for example, red, green, or the like), different from ambient light, toward the inside of a capturing visual field range of the camera 5, and forms a mark visible to the naked eye on a surface irradiated with the visible light. The mark may be various figures, symbols, characters, or the like. A user can also refer to the light emitted from the aimer 10*a* to install the optical information reading device 1.

As illustrated in FIG. 2, the operation buttons 11 and 12 used at the time of setting the optical information reading device 1 are provided on the side surface of the housing 2. The operation buttons 11 and 12 include, for example, a select button, an enter button, and the like. In addition to the operation buttons 11 and 12, for example, a touch panel type operation mechanism may be provided. The operation buttons 11 and 12 are connected to the processor 20, and the processor 20 can detect operation states of the operation buttons 11 and 12. It is possible to select one of a plurality of options displayed on the display part 6 or to confirm a selected result by operating the operation buttons 11 and 12.

(Handheld Optical Information Reading Device)

Figure 4:
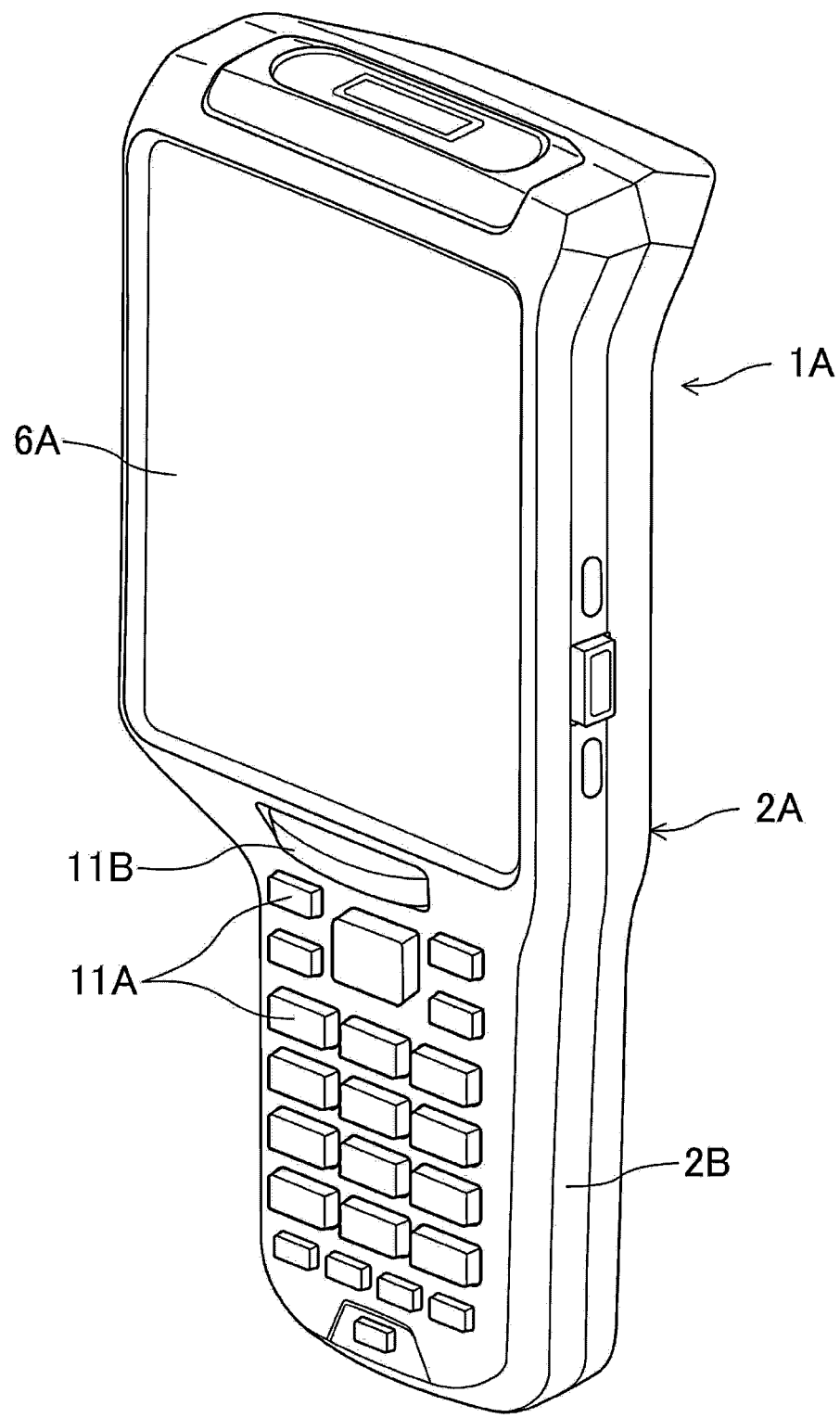
FIG. 4 is a perspective view of a handheld optical information reading device.

Although the case where the optical information reading device 1 is the stationary type has been described in the example described above, the present aspect can also be applied to an optical information reading device other than the stationary optical information reading device 1. FIG. 4 illustrates a handheld optical information reading device 1A, and the present aspect can also be applied to the handheld optical information reading device 1A as illustrated in FIG. 4.

A housing 2A of the handheld optical information reading device 1A has a shape that is long in the up-down direction. Note that an orientation of the optical information reading device 1A at the time of use is not limited to the illustrated orientation, and the optical information reading device 1A can be used in various orientations, but the up-down direction of the optical information reading device 1A is specified for convenience of the description.

A display part 6A is provided in an upper portion of the housing 2A. The display part 6A is configured similarly to the display part 6 of the stationary optical information reading device 1. A lower portion of the housing 2A is a grip part 2B to be gripped by a user during the operation. The grip part 2B is a portion that can be held by a general adult with one hand, and shape and size thereof can be freely set. The optical information reading device 1A can be carried and moved by holding the grip part 2B. That is, the optical information reading device 1A is a portable terminal device, and can also be referred to as a handy terminal, for example.

The housing 2A of the handheld type also accommodates an illumination part, a camera, an aimer light irradiation part, a processor, a storage part, a ROM, a RAM, and the like (not illustrated) similarly to the stationary optical information reading device 1. An optical axis of the illumination part, an optical axis of the camera, and an optical axis of the aimer light irradiation part are directed obliquely upward from the vicinity of an upper end of the housing 2A. In addition, the housing 2A of the handheld type is also provided with a buzzer (not illustrated).

A plurality of operation buttons 11A and a trigger key 11B are provided in the grip part 2B and the vicinity thereof. The operation buttons 11A are similar to the operation button 11 and the like of the stationary optical information reading device 1. If the user presses the trigger key 11B with a distal end (upper end) of the optical information reading device 1A facing the workpiece W, aimer light is emitted from the distal end of the optical information reading device 1A. If the user adjusts the direction of the optical information reading device 1A while visually observing the aimer light reflected on a surface of the workpiece W to make the aimer light focus on a code to be read, reading processing and decoding processing of the code are automatically performed. When the reading is completed, a completion notification sound is generated from the buzzer.

As a use example of the handheld optical information reading device 1A, there is an example in which the handheld optical information reading device 1A is used for picking work in a distribution warehouse. For example, when an ordered product is shipped from the distribution warehouse, the necessary product is picked from a product shelf in the product warehouse. This picking work is performed while a user carrying an order slip describing a code collates the code of the order slip with a code attached to the product or the product shelf after moving to the product shelf. In this case, the code of the order slip and the code attached to the product or the product shelf are alternately read by the handheld optical information reading device 1A.

(Configuration of Processor)

The following description is common to the stationary optical information reading device 1 and the handheld optical information reading device 1A, and can also be applied to both the devices 1 and 1A unless otherwise specified. As illustrated in FIG. 3, the processor 20 is configured using a multi-core processor having a plurality of cores which are central processing devices. Specifically, the processor 20 includes a first general-purpose core 21, a second general-purpose core 22, a third general-purpose core 23, a fourth general-purpose core 24, and a dedicated core 25 dedicated to inference processing by a neural network. The first to fourth general-purpose cores 21 to 24 and the dedicated core 25 are so-called system-on-a-chips (SoCs, SOCs), and are mounted on the same substrate. Note that the first to fourth general-purpose cores 21 to 24 and the dedicated cores 25 are not necessarily SoCs. In such a case, the first to fourth general-purpose cores 21 to 24 and the dedicated cores 25 are not necessarily mounted on the same substrate, but such a case is also included in the scope of the present aspect. Although a case where the number of general-purpose cores is four is described in this embodiment, but the present aspect is not limited thereto, and the number of general-purpose cores may be one or an arbitrary number of two or more (for example, six cores, eight cores, and the like).

The RAM 41 as the same memory is connected to the first to fourth general-purpose cores 21 to 24 and the dedicated core 25, and both the first to fourth general-purpose cores 21 to 24 and the dedicated core 25 can access the same RAM 41. In addition, the ROM 40 as the same memory is connected to the processor 20, and any of the first to fourth general-purpose cores 21 to 24 and the dedicated core 25 can access the same ROM 40.

The first to fourth general-purpose cores 21 to 24 are so-called general-purpose processors, and are portions that execute, for example, AF control, illumination control, camera control, extraction processing of extracting a code candidate region, decoding processing on a code image, various filter processing on the code image, and the like. Specific processing examples of the first to fourth general-purpose cores 21 to 24 will be described later.

On the other hand, the dedicated core 25 is an inference processing-dedicated core for executing the inference processing of generating an ideal image corresponding to the code image using the neural network, and is specialized in executing a product-sum operation necessary for processing by the neural network at an ultra-high speed. The dedicated core 25 includes, for example, an IC, an FPGA, and the like. Note that the code image can be restored to an image appropriate for decoding by applying a learning result of the neural network to perform the inference processing, and thus, generation of the ideal image by the inference processing is also referred to as restoration of the code image. In this case, the dedicated core 25 is a portion that attempts to restore the code image using the neural network.

Figure 5:
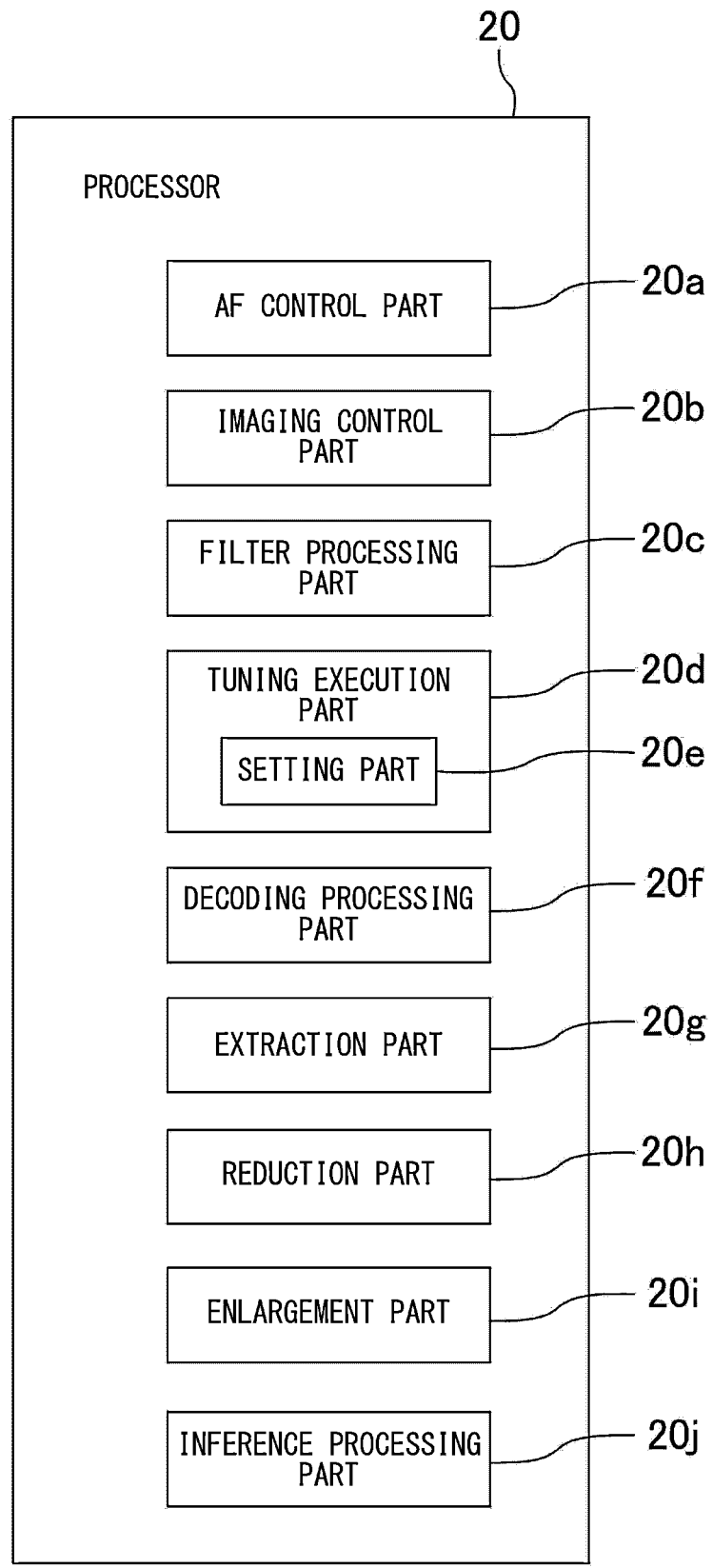
FIG. 5 is a diagram for describing each part configured by a processor.

As illustrated in FIG. 5, an AF control part 20a, an imaging control part 20b, a filter processing part 20c, a tuning execution part 20d, a decoding processing part 20f, an extraction part 20g, a reduction part 20h, an enlargement part 20i, and an inference processing part 20j are configured by the processor 20. The AF control part 20a, the imaging control part 20b, the filter processing part 20c, the tuning execution part 20d, the decoding processing part 20f, the extraction part 20g, the reduction part 20h, and the enlargement part 20i are portions configured by arithmetic processing of the first to fourth general-purpose cores 21 to 24. On the other hand, the inference processing part 20j is a portion configured using the dedicated core 25 and is a portion that executes the inference processing of generating the restored image obtained by restoring the code image, and thus, is also referred to as an image restoration part.

(Configuration of AF Control Part)

The AF control part 20a is a unit that controls the AF module 5c illustrated in FIG. 3, and is configured to be capable of performing focusing of the optical system 5b by conventionally known contrast AF and phase difference AF. The AF control part 20a may be configured using a core to serve as the decoding processing part 20f and the extraction part 20g among the first to fourth general-purpose cores 21 to 24, or may be configured using a core other than the core to serve as the decoding processing part 20f and the extraction part 20g.

(Configuration of Imaging Control Part)

The imaging control part 20b is a unit that adjusts the gain of the camera 5, controls the amount of light of the illumination part 4, and controls the exposure time (shutter speed) of the imaging element 5a. Here, the gain of the camera 5 is an amplification factor (also referred to as magnification) when the brightness of an image output from the imaging element 5a is amplified by digital image processing. The amount of light of the illumination part 4 can be changed by separately controlling the first illumination part 4a and the second illumination part 4b. The gain, and the amount of light and the exposure time of the illumination part 4 are imaging conditions of the camera 5. The imaging control part 20b may be configured using a core to serve as the decoding processing part 20f and the extraction part 20g among the first to fourth general-purpose cores 21 to 24, or may be configured using a core other than the core to serve as the decoding processing part 20f and the extraction part 20g. Note that the AF control part 20a and the imaging control part 20b may be configured using the same core or may be configured using different cores.

(Configuration of Filter Processing Part)

The filter processing part 20c is a portion that executes an image processing filter on the code image, and may be configured using a core to serve as the decoding processing part 20f and the extraction part 20g, or may be configured by a core other than the core to serve as the decoding processing part 20f and the extraction part 20g. The core forming the filter processing part 20c may be a DSP core.

The filter processing part 20c executes a noise removal filter that removes noise included in an image generated by the camera 5, a contrast correction filter that corrects contrast, an averaging filter, and the like. The image processing filter executed by the filter processing part 20c is not limited to the noise removal filter, the contrast correction filter, and the averaging filter, and may include other image processing filters.

The filter processing part 20c is configured to execute the image processing filter on a code image before execution of the inference processing to be described later. In addition, the filter processing part 20c is configured to execute the image processing filter on a code image before enlargement or reduction to be described later. Note that the filter processing part 20c may be configured to execute the image processing filter on a code image obtained after execution of the inference processing, or may be configured to execute the image processing filter on an enlarged or reduced code image.

[Configuration of Tuning Execution Part]

The tuning execution part 20d illustrated in FIG. 5 repeats imaging and decoding processing while changing the imaging conditions of the camera 5 and decoding conditions of the decoding processing, determines the optimum imaging conditions and decoding conditions based on the matching level indicating the ease of code reading calculated under each of the imaging conditions and decoding conditions, and executes tuning processing of setting a size of a code to be read. Specifically, the tuning execution part 20d is a portion that changes the imaging conditions, such as the gain of the camera 5, the amount of light and the exposure time of the illumination part 4, and image processing conditions in the filter processing part 20c and sets various conditions (tuning parameters) so as to obtain the conditions appropriate for decoding at the time of setting the optical information reading devices 1 and 1A. The image processing conditions in the filter processing part 20c include a coefficient of an image processing filter (the strength of the filter) or switching of image processing filters, a combination of different types of image processing filters, and the like in a case where there are a plurality of image processing filters. Appropriate imaging conditions and image processing conditions differ depending on the influence of external light on the workpiece W during conveyance, a color and a material of a surface to which the code is attached, and the like. Accordingly, the tuning execution part 20d searches for more appropriate imaging conditions and image processing conditions, and sets the processing by the AF control part 20a, the imaging control part 20b, and the filter processing part 20c.

The tuning execution part 20d is configured to be capable of acquiring the size of the code included in the code image generated by the camera 5. When acquiring the size of the code, first, the tuning execution part 20d searches for the code based on a characteristic amount indicating a code likeness. Next, the tuning execution part 20d acquires a pixel per cell (PPC), a code type, a code size, and the like of the searched code. The PPC, the code type, the code size, and the like are included in code parameters or code conditions, and accordingly, the tuning execution part 20d is configured to be capable of acquiring the code parameters or code conditions of the searched code.

A two-dimensional code is configured by randomly arranging a plurality of white modules and black modules. For example, in Model 2 as a QR code, the number of modules is 21×21 to 177×177. In the case of the stationary optical information reading device 1, the code to be read is read in advance to limit the number of modules and the PPC, and the operation is performed by limiting a size (pixel size) of the code to the number of modules×PPC.

When focusing on one module among the modules forming the code, a code parameter indicating how many pixels the module is formed of is the PPC. The tuning execution part 20d can acquire the PPC by specifying one module and then counting the number of pixels forming the one module.

The code type is, for example, a type of a code such as a QR code, a data matrix code, and a verification code. Since each code has a characteristic, the tuning execution part 20d can discriminate the code type depending on, for example, the presence or absence of a finder pattern.

In addition, the code size can be calculated by the PPC and the number of modules arrayed in the vertical or horizontal direction of the code. The tuning execution part 20d calculates the number of modules arrayed in the vertical or horizontal direction of the code, calculates the PPC, and integrates the number of modules arrayed in the vertical or horizontal direction and the PPC to acquire the code size.

(Configuration of Decoding Processing Part)

The decoding processing part 20f is a portion that decodes data binarized into black and white. For decoding, a table indicating a comparison of relationship of encoded data can be used. Further, the decoding processing part 20f checks whether a decoding result is correct according to a predetermined check scheme. When an error is found in data, correct data is calculated using an error correction function. The error correction function varies depending on the code type.

In this embodiment, the decoding processing part 20f decodes a code included in an ideal image obtained after the inference processing to be described later, but can also decode a code included in the code image before the inference processing. The decoding processing part 20f is configured to write a decoding result obtained by decoding the code in a decoding result storage part 40b of the ROM 40 illustrated in FIG. 3.

(Configuration of Extraction Part)

The extraction part 20g is a portion that extracts a code candidate region in which a code is highly likely to be present from the code image generated by the camera 5. The code candidate region can be extracted based on a characteristic amount indicating a code likeness. In this case, the characteristic amount indicating the code likeness is information for identifying the code. For example, the extraction part 20g can acquire a code image and search for the code based on the characteristic amount indicating the code likeness with respect to the acquired code image. Specifically, it is searched whether there is a portion having a predetermined or more characteristic amount indicating a code likeness in the acquired code image. If a portion having a characteristic amount indicating the code likeness can be searched as a result, a region including the portion is extracted as the code candidate region. The code candidate region may include a region other than the code, but includes at least a portion having a predetermined or higher possibility of being the code. Note that the code candidate region is just the region in which the code is highly likely to be present, and thus, there may be a case where the code candidate region is a region that does not include a code in the end.

The extraction part 20g can also extract the code candidate region by using position information of the aimer light emitted from the aimer light irradiation part 10 as information for identifying the code. In this case, the extraction part 20g identifies a portion corresponding to the mark formed by the aimer light irradiation part 10 from the code image, and extracts the identified portion as the code candidate region. That is, since the aimer light indicates the capturing range and the center of the visual field of the camera 5 as described above, the mark formed by the aimer light can be set to coincide with the center of the visual field of the camera 5 in advance. In particular, in the case of the handheld optical information reading device 1A, the user makes the aimer light focus on the code to be read, and thus, the mark formed by the aimer light has a high probability of overlapping with the code. That is, when the extraction part 20g extracts a region including the center of the visual field of the camera 5 by setting the portion corresponding to the mark formed by the aimer light irradiation part 10 to coincide with the center of the visual field of the camera 5, the region becomes a region in which the code is highly likely to be present. In this case, the portion corresponding to the mark formed by the aimer light irradiation part 10 is not necessarily set to completely coincide with the center of the visual field of the camera 5, and may be slightly shifted in the vertical direction or the horizontal direction of the visual field. Since the code has a predetermined size, the region extracted by the extraction part 20g is a region having not only the center of the visual field of the camera 5 but also a predetermined size including the center of the visual field.

The extraction part 20g can also identify a center portion of the code image and extract the center portion as the code candidate region. For example, when the center of the visual field of the camera 5 is acquired in advance as information for identifying the code, a portion to be the center of the visual field of the camera 5 can be identified on the code image. In particular, in the case of the handheld optical information reading device 1A, a center portion identified on the code image corresponds to the mark formed by the aimer light irradiation part 10, and thus, the center portion is the region in which the code is highly likely to be present.

The extraction part 20g can be configured to receive designation of a predetermined portion by the user from the code image, and can extract the designated portion as the code candidate region. That is, when the user designates a region having an arbitrary size at an arbitrary position (coordinate) on the code image, the extraction part 20g receives designation of a predetermined portion from the code image based on information of the coordinate of the position and the size. The extraction part 20g extracts the received portion as the code candidate region. For example, in the case of the stationary optical information reading device 1, the workpiece W conveyed by the conveying belt conveyor B is captured and the decoding processing of the code is executed as illustrated in FIG. 1. However, the workpiece W is not necessarily present at the central part of the conveying belt conveyor B in the width direction, and there is a case where the workpiece W is present at an end. In this case, it is possible to accurately extract a region in which the code is highly likely to be present by designating a portion corresponding to the end of the conveying belt conveyor B from the code image. In addition, there is also a case where a code is displayed in the vicinity of an end away from the central part of a large workpiece W. In this case, it is possible to accurately extract a region in which the code is highly likely to be present by designating a portion corresponding to the vicinity of the end of the workpiece W from the code image.

(Configurations of Storage Device and ROM)

The storage device 30 illustrated in FIG. 3 can be configured using a readable/writable storage device such as a solid state drive (SSD). The storage device 30 can store various programs, setting information, image data, and the like.

The ROM 40 includes an image data storage part 40a, a decoding result storage part 40b, a parameter set storage part 40c, and a neural network storage part 40d. The image data storage part 40a stores a code image generated by the camera 5. The decoding result storage part 40b is a portion that stores a decoding result of a code executed by the decoding processing part 20f. The parameter set storage part 40c is a portion that stores a result of tuning performed by the tuning execution part 20d and various set conditions, and various conditions set by the user. The neural network storage part 40d is a portion that stores a structure and a parameter of a trained neural network to be described later.

At least some of the storage parts 40a, 40b, 40c, and 40d may be provided in a portion other than the ROM 40, for example, may be provided in the storage device 30.

(Inference Processing Using Neural Network)

The optical information reading devices 1 and 1A have an ideal image generation function of performing the inference processing on the code image acquired by the camera 5 using the neural network to generate the ideal image. In the present embodiment, a description is given regarding an example in which the optical information reading device 1 or 1A hold in advance the structure and parameter of the neural network that has already finished learning, instead of performing machine learning by the optical information reading device 1 or 1A, and perform the inference processing by the neural network configured using the held structure and parameter. However, the present aspect is not limited thereto, and the structure and parameter of the neural network may be changed by performing machine learning by the optical information reading device 1 or 1A.

Figure 6:
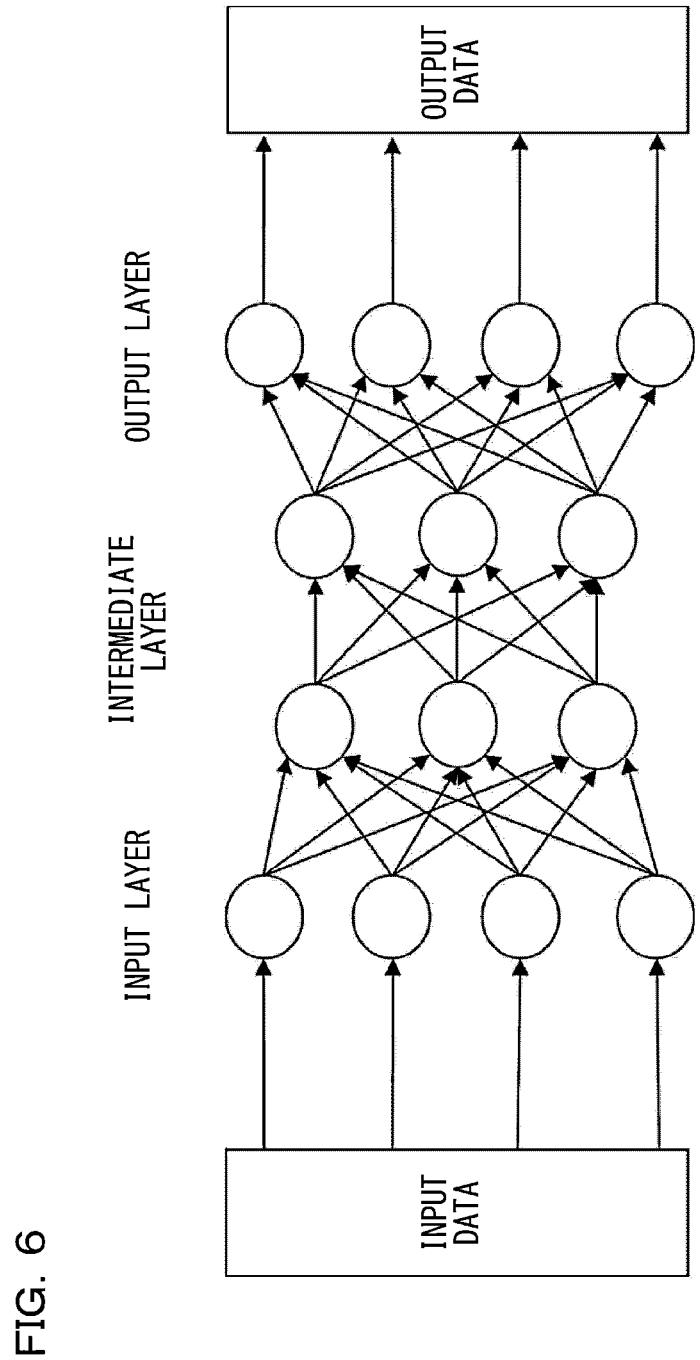
FIG. 6 is a conceptual view of a neural network.

As illustrated in FIG. 6, the neural network includes an input layer to which input data (image data in this example) is input, an output layer that outputs output data, and an intermediate layer provided between the input layer and the output layer. A plurality of the intermediate layers can be provided, for example, thereby forming the neural network having a multilayer structure.

(Learning of Neural Network) First, a basic procedure at the time of learning of the neural network will be described based on a flowchart illustrated in FIG. 7. The learning of the neural network can be performed using a computer prepared for learning other than the optical information reading devices 1 and 1A, but may be performed using a general-purpose computer other than the computer for learning. The optical information reading device 1 or 1A may perform learning. A conventionally known method may be used as a learning method of the neural network.

Figure 8A:
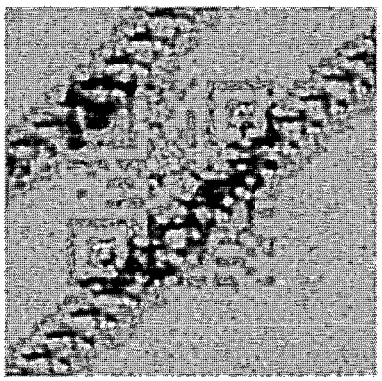
Figure 8B:
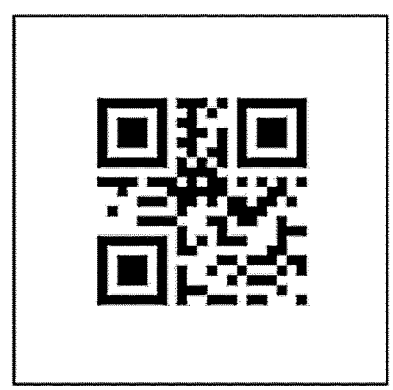

In Step SA1 after the start, data of a defective image prepared in advance is read. The defective image is an image having a portion inappropriate for reading a code, and can be exemplified by an image as illustrated at a left side in FIG. 8. The inappropriate portion is, for example, a dirty portion or a colored portion. Thereafter, the processing proceeds to Step SA2 to read data of an ideal image prepared in advance. The ideal image is an image appropriate for reading a code, and can be exemplified by an image as illustrated at a right side in FIG. 8. The defective image and the ideal image are paired, and a plurality of such pairs are prepared. When the optical information reading device 1 or 1A performs the learning, a defective image and an ideal image are input to the optical information reading device 1 or 1A.

In Step SA2, a loss function is calculated to obtain a difference between the defective image and the ideal image. In Step SA3, the parameters of the neural network are updated by reflecting the difference obtained in Step SA2.

In Step SA4, it is determined whether a completion condition of the machine learning is satisfied. The completion condition of the machine learning can be set based on the difference obtained in Step SA2, and it can be determined that the completion condition of the machine learning is satisfied, for example, when the difference is equal to or less than a predetermined value. When YES is determined in Step SA4 and the completion condition of the machine learning is satisfied, the machine learning is ended. On the other hand, when NO is determined in Step SA4 and the machine learning completion condition is not satisfied, the processing returns to Step SA1 to read another defective image, and then, proceeds to Step SA2 to read another ideal image paired with the another defective image.

In this manner, the trained neural network can be generated in advance by causing the machine learning of the plurality of defective images and the plurality of ideal images respectively corresponding to the plurality of defective images. When the optical information reading devices 1 and 1A hold the structure and parameter of the trained neural network, the trained neural network can be constructed in the optical information reading devices 1 and 1A. As in this example, if the machine learning is performed outside the optical information reading device 1 or 1A and the structure and parameter of the neural network obtained as a result are held in the optical information reading device 1 or 1A, it is possible to perform the inference processing by the neural network while reducing the size and weight of the optical information reading device 1 or 1A. When the processor 20 having a sufficiently high arithmetic processing capability is mounted, there is no problem even if the learning is performed by the optical information reading device 1 or 1A.

Figure 9:
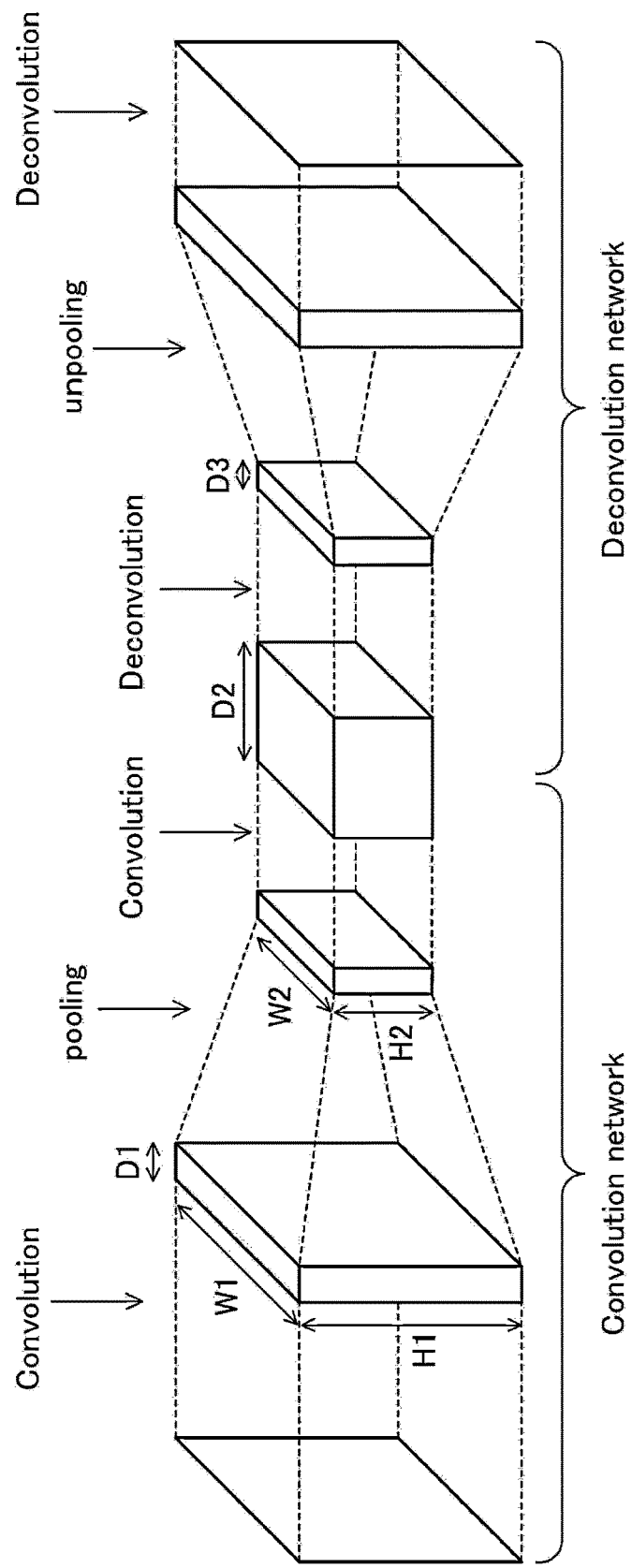
FIG. 9 is a conceptual view of a convolutional neural network used for image conversion.

FIG. 9 is a conceptual diagram of a convolutional neural network (CNN) configured as described above. In "convolution", characteristics of an input image are extracted. This layer is configured by a convolution operation such as an image processing filter. A weight of the filter is called a kernel, and a characteristic amount is extracted according to the kernel. The convolution layer generally has a plurality of different kernels, and the number of maps (D) increases according to the number of kernels. A size of the kernel can be set to, for example, 3×3, 5×5, or the like.

In "pooling", reduction processing is performed to gather reactions of each kernel. In "Deconvolution", an image is reconstructed from a characteristic value by a deconvolution filter. In "Unpooling", enlargement processing is performed to sharpen a reaction value.

The structure and parameter of the trained neural network are stored in the neural network storage part 40d of the ROM 40 illustrated in FIG. 3. The structure of the neural network is the number (D) of the intermediate layers provided between the input layer and the output layer, the number of image processing filters, and the like. The parameters of the neural network are the parameters set in Step SA3 of the flowchart illustrated in FIG. 7.

In addition, the neural network storage part 40d can store structures and parameters of a plurality of neural networks having different numbers of layers or different numbers of image processing filters. In this case, the structures and parameters of the plurality of neural networks and code conditions can be stored in association with each other in the neural network storage part 40d. For example, a structure and parameters of a neural network for forming a first neural network are associated with a first code condition corresponding to the first neural network. Since the number of layers or the number of filters of the first neural network can be specified in advance by the first code condition, particularly a first PPC, at the time of performing the association, the association is performed so as to maintain such a relationship. Similarly, a structure and parameters of a second neural network different from the first neural network are associated with a second code condition different from the first code condition.

In a case where structures and parameters of the plurality of neural networks are stored in the neural network storage part 40d, the tuning execution part 20d operates as follows at the time of setting the optical information reading device 1 or 1A. That is, when setting a code condition included in a code image generated by the camera 5, the tuning execution part 20d reads a structure and a parameter of a neural network associated with the set code condition from the neural network storage part 40d and identifies the read structure and parameters as a neural network to be used during the operation. For example, when the tuning execution part 20d sets the first code condition by setting the code condition included in the code image, the structure and parameter of the first neural network associated with the first code condition are read from the neural network storage part 40d. Then, the structure and parameter of the first neural network are identified as the neural network to be used during the operation of the optical information reading device 1 or 1A. As a result, it is possible to execute the inference processing on the code image with the structure and parameter of the neural network optimal for the code condition, and thus, it is possible to improve the reading accuracy.

In learning of the neural network, it is also possible to cause machine learning of a defective image in which a pixel resolution of a module forming a code falls within a specific range and an ideal image. The pixel resolution of the module can be expressed by, for example, the number of pixels (PPC) of one module forming the code, and the machine learning of the neural network may be performed only with the defective image in which the PPC falls within the specific range and the ideal image.

The specific range is a range that includes a pixel resolution having a high inference processing effect on the code image and excludes a pixel resolution with which the inference processing effect on the code image is hardly improved, and can be set on the premise of the inference processing on an image including a code formed of a plurality of modules. As a result, the processing speed can be improved as a neural network structure specialized for inference processing on an image including a code.

The specific range of the number of pixels can be set to, for example, 4 PPC or more and 6 PPC or less, but may be less than 4 PPC or more than 6 PPC. In addition, for example, when machine learning is performed with the specific range limited to 4 PPC or more and 6 PPC or less, it is possible to eliminate an extra scale variation from images used for learning and to optimize a trained neural network structure.

(Inference Processing)

As illustrated in FIG. 5, the processor 20 of each of the optical information reading devices 1 and 1A is provided with the inference processing part 20j configured using the dedicated core 25. The inference processing part 20j reads a structure and a parameter of a neural network stored in the neural network storage part 40d of the ROM 40, and configures the neural network in the optical information reading device 1 or 1A with the read structure and parameters of the neural network. The neural network configured in the optical information reading device 1 or 1A is the same as the trained neural network that has performed learning by the procedure illustrated in the flowchart of FIG. 7.

The inference processing part 20j inputs a code image generated by the camera 5 to the neural network and executes inference processing of generating an ideal image corresponding to the code image according to the structure and parameter of the neural network stored in the neural network storage part 40d. Since the ideal image generated by the inference processing part 20j is merely an image generated by the inference processing, the image is not necessarily the same as the ideal image used at the time of learning described above, but the image generated by the inference processing part 20j is also referred to as the ideal image in the present embodiment.

The filter processing part 20c is configured to execute an image processing filter on the code image before the inference processing part 20j inputs the code image generated by the camera 5 to the neural network. As a result, it is possible to execute appropriate image processing before executing the inference processing by the neural network, and as a result, the inference processing becomes more accurate.

The inference processing part 20j may execute the inference processing on all the code images subjected to the decoding processing by the decoding processing part 20f, or the inference processing part 20j may execute the inference processing only on some code images subjected to the decoding processing by the decoding processing part 20f. For example, the decoding processing part 20f executes decoding processing on the code image before the execution of the inference processing, and determines whether decoding has succeeded. The success in the decoding means that the code image does not require inference processing, and the resultant is directly output. On the other hand, when the decoding fails, the inference processing part 20j executes the inference processing, and the decoding processing part 20f executes the decoding processing on the generated ideal image.

(Input of Partial Image)

An image that is input to the neural network by the inference processing part 20j may be the entire code image generated by the camera 5. However, the amount of calculation by the neural network increases and a calculation load of the processor 20 becomes heavy as a size of the input image increases, so that there is a possibility that the processing speed decreases. Specifically, in a fully convolutional network (FCN) type neural network as illustrated in FIG. 9, when structures are assumed to be equal, the amount of calculation is an amount proportional to an input image size, and the input image size is proportional to the square of a code size, and thus, the amount of calculation is also proportional to the square of the code size.

On the other hand, it may be said that there is no case where a code is present in the entire code image generated by the camera 5. A code is present only in a partial region of a code image during the normal operation, and the reading accuracy can be improved if the inference processing using the neural network can be executed only in the region.

Therefore, the image input to the neural network by the inference processing part 20j can be a part of the code image generated by the camera 5, that is, a partial image including a code. Specifically, a partial image corresponding to the code candidate region extracted by the extraction part 20g is stored in the image data storage part 40a, and is made accessible by the inference processing part 20j. The inference processing part 20j inputs the partial image to the neural network, thereby executing the inference processing on the partial image according to the structure and parameter stored in the neural network storage part 40d. Then, the decoding processing part 20f executes decoding processing on the generated ideal image. As will be described later, in a case where the decoding processing is executed without executing the inference processing on the partial image, the decoding processing part 20f is configured to be capable of accessing the image data storage part 40a, and the decoding processing part 20f reads the partial image stored in the image data storage part 40a and executes the decoding processing.

Since there is almost no case where a code is present in the entire code image as described above, a size of the partial image corresponding to the code candidate region is smaller than a size of the code image. As a result, the size of the image input to the neural network is reduced, and thus, the calculation load of the processor 20 is reduced so that the increase in the processing speed is realized. In addition, the partial image corresponds to the region in which the code is highly likely to be present, the partial image can be an image including information necessary for reading, that is, the entire code. Since the image including the entire code is input to the neural network, a decrease of the reading accuracy is suppressed.

The inference processing part 20j can determine an input size of the partial image to the neural network based on the code size acquired by the tuning execution part 20d. As described above, the tuning execution part 20d can acquire the code size. The inference processing part 20j increases the input size of the partial image input to the neural network by a predetermined amount from the code size acquired by the tuning execution part 20d.

That is, the calculation load can be reduced by inputting the partial image to the neural network. However, for example, in a case where a code is rotating or a position of the code is not accurately detectable, there is a possibility that a part of the code in the partial image is missing and decoding processing fails. Since the input size to the neural network is not the same as the code size acquired by the tuning execution part 20d and is larger than the code size by the predetermined amount in the present embodiment, it is possible to suppress the missing of a part of the code in the partial image. Note that the input size to the neural network can have an upper limit by making the code size larger than the code size by the predetermined amount, and accordingly, the calculation load can be made not to be heavy. Regarding the "predetermined amount", for example, a horizontal (or vertical) length of the partial image input to the neural network may be set to 1.5 times or more, 2.0 times or more, or 3.0 times or more of a horizontal (or vertical) length of the code acquired by tuning execution part 20d.

When the inference processing part 20j determines the input size of the partial image to be input to the neural network, the input size can be determined based on the number of pixels of one module forming the code acquired by the tuning execution part 20d and the number of modules arranged in the vertical or horizontal direction of the code.

The tuning execution part 20d can set the code conditions as described above. The inference processing part 20j can also set the size of the code image to be input to the neural network based on a code condition set by the tuning execution part 20d. For example, if the inference processing part 20j acquires the code size among the code conditions set by the tuning execution part 20d, a partial image having a size larger than the acquired code size by a predetermined amount is input to the neural network. The size of the partial image input to the neural network increases when the code size is large, and the size of the partial image input to the neural network decreases when the code size is small. That is, the size of the partial image input to the neural network can be changed according to the code condition.

(Reduction and Enlargement Function)

Here, it is necessary to extract a characteristic amount within a range covering a certain number of modules in order to sufficiently capture characteristics of a code in the convolutional neural network as illustrated in FIG. 9 and obtain an ideal image appropriate for decoding. For example, assuming that one characteristic value obtained from a neural network is a value extracted from a range of 6×6 modules, it is necessary to design the neural network to calculate an aggregated characteristic value from a range of 120×120 pixels in a case of an image captured with one module having 20 pixels. That is, the hierarchy of the neural network needs to be deeper as a pixel range that is desirably covered becomes wider. For example, when the characteristic value is to be aggregated from the above-described range of 120×120 pixels, the convolution layer applied six times is required.

However, since the code is configured by randomly arranging the white module and the black module, the relationship between the pixel values in a wide range is sparse, and the inference processing effect is hardly improved even if the pixel range to be covered is expanded to a certain extent or more. Such a characteristic is referred to as a narrow range characteristic in the present specification.

In addition, the arrangement of a determined module pattern such as a finder pattern included in the code or a quadrangular shape of the entire code can be a wide range characteristic. However, it is possible to sufficiently perform the inference processing only using the narrow range characteristic without using the wide range characteristic as long as modules and a background are roughly separated. Note that the wide range characteristic can be defined as a characteristic having a shape determined over a wide range.

Figure 7:
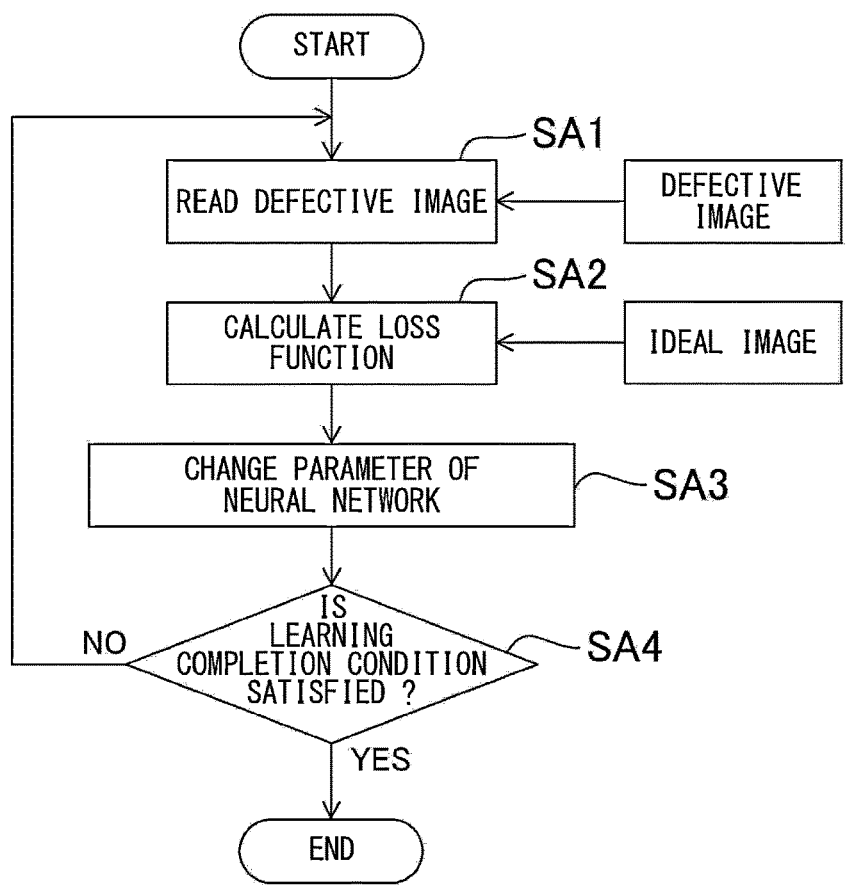
FIG. 7 is a flowchart illustrating an example of a basic procedure during learning of the neural network.

Therefore, an image in which the PPC of the code is in the specific range can be used at the time of learning of the neural network illustrated in FIG. 7. As a result, the processing speed can be improved as the neural network structure specialized for the inference processing on the image including the code, but there is a concern that the inference processing effect on a code image in which the PPC is out of the specific range deteriorates. Note that the image in which the PPC of the code is out of the specific range may be used at the time of learning of the neural network.

The optical information reading devices 1 and 1A of the present embodiment have a function of reducing and enlarging a code image in order to make the PPC of the code image fall within the specific range. As illustrated in FIG. 5, the processor 20 includes the reduction part 20h and the enlargement part 20i. The reduction part 20h is a portion that generates a code image reduced such that the pixel resolution of the module forming the code in the code image generated by the camera 5 falls within the above-described specific range. In addition, the enlargement part 20i is a portion that generates a code image enlarged such that the pixel resolution of the module forming the code in the code image generated by the camera 5 falls within the above-described specific range.

For example, the reduction part 20h and the enlargement part 20i determine whether the PPC of the code in the code image generated by the camera 5 is out of the specific range (4 PPC or more and 6 PPC or less), do not execute the reduction or enlargement when the PPC of the code falls within the specific range, and execute the reduction or enlargement when the PPC of the code is out of the specific range. When the reduction or enlargement is executed, the PPC of the code in the partial image input to the neural network by the inference processing part 20j falls within the specific range.

The inference processing part 20j inputs the code image, enlarged or reduced to fall within the specific range, to the neural network configured using the structure and parameter stored in the neural network storage part 40d, thereby executing the inference processing on the code image according to the structure and parameter. Then, the decoding processing part 20f executes decoding processing on the generated ideal image.

The extraction part 20g may be configured to search for a code with respect to a code image enlarged by the enlargement part 20i or a code image reduced by the reduction part 20h, and extract a region including the searched code as the code candidate region in which the code is highly likely to be present. In this case, the inference processing part 20j inputs a partial image corresponding to the code candidate region extracted by the extraction part 20g to the neural network configured using the structure and parameter stored in the neural network storage part 40d, thereby executing the inference processing on the code image according to the structure and parameter.

The tuning execution part 20d can generate a plurality of code images (enlarged images) with different enlargement ratios and generate a plurality of code images (reduced images) with different reduction ratios at the time of setting the optical information reading device 1 or 1A. The tuning execution part 20d inputs the plurality of generated code images (enlarged images or reduced images) to the neural network to execute the inference processing on each of the code images, and executes decoding processing on each of the generated ideal images to obtain a reading margin indicating the ease of code reading. The tuning execution part 20d identifies an enlargement ratio or a reduction ratio of a code image with the obtained reading margin higher than a predetermined value as the enlargement ratio or reduction ratio to be used during the operation. When the tuning execution part 20d has identified the enlargement ratio or reduction ratio, the reduction part 20h and the enlargement part 20i enlarge or reduce a code image at the enlargement ratio or reduction ratio identified by the tuning execution part 20d during the operation of the optical information reading devices 1 and 1A.

That is, for example, in a case where the specific range has a certain degree of extent, it is conceivable that the reading margin changes if the enlargement ratio or reduction ratio is changed even within the specific range. Since the enlargement ratio or reduction ratio of the code image during the operation can be identified such that the reading margin obtained by the tuning execution part 20d becomes higher than the predetermined value, the processing speed and the reading accuracy are improved.

After obtaining the reading margins of the respective code images, the tuning execution part 20d can identify an enlargement ratio or a reduction ratio of a code image having the highest reading margin among the plurality of obtained reading margins as the enlargement ratio or reduction ratio to be used during the operation. As a result, the processing speed and the reading accuracy can be further improved.

In addition, types of parameter sets can also be increased by using the fact that a code image can be reduced and enlarged by the reduction part 20h and the enlargement part 20i. A plurality of parameter sets having different reduction ratios by the reduction part 20h and a plurality of parameter sets having different enlargement ratios by the enlargement part 20i are generated, and these parameter sets can be stored in the parameter set storage part 40*c* of the ROM 40. For example, in a case where a plurality of reduction ratios, such as ½, ¼, and ⅛ can be set by the reduction part 20*h*, a parameter set having the reduction ratio of ½, a parameter set having the reduction ratio of ¼, and a parameter set having the reduction ratio of ⅛ can be stored in the parameter set storage part 40*c*. In addition, in a case where a plurality of enlargement ratios, such as twice, four times, and eight times, can be set by the enlargement part 20*i*, a parameter set having the enlargement ratio of twice, a parameter set having the enlargement ratio of four times, and a parameter set having the enlargement ratio of eight times can be stored in the parameter set storage part 40*c*. Then, an arbitrary parameter set can be applied from among the plurality of parameter sets stored in the parameter set storage part 40*c*.

(Inference Processing Filter)

The inference processing part 20*j* may be a portion that executes an inference processing filter to execute inference processing using a neural network. The inference processing filter is a filter that inputs a code image to a neural network configured using a structure and a parameter stored in the neural network storage part 40*d* to execute the inference processing according to the structure and parameter stored in the neural network storage part 40*d*, and exhibits the same function as the above-described inference processing function.

In the case of enabling the inference processing filter to be executed, a setting part 20*e* (illustrated in FIG. 5) for setting the inference processing filter can be provided. The setting part 20*e* is configured to be capable of receiving the setting of the inference processing filter performed by the user. For example, at the time of setting the optical information reading device 1 or 1A, the setting part 20*e* can be configured to generate a user interface that allows the user to select one of "application of the inference processing filter" and "non-application of the inference processing filter", display the user interface on the display part 6, and receive the selection by the user. Therefore, the inference processing part 20*j* applies the inference processing filter set by the setting part 20*e* to the code image to execute the inference processing on the code image.

The setting part 20*e* may be included in the tuning execution part 20*d*, or may be configured separately from the tuning execution part 20*d*. In a case where the setting part 20*e* is included in the tuning execution part 20*d*, it is possible to set parameters related to the inference processing filter at the time of tuning. The parameters related to the inference processing filter can include "application of the inference processing filter" and "non-application of the inference processing filter". "Application of the inference processing filter" means that the inference processing filter is set to be executable, and "non-application of the inference processing filter" means that the inference processing filter is not set.

The parameter related to the inference processing filter are also information related to the inference processing filter. In this case, a parameter set including the information related to the setting of the inference processing filter can be stored in the parameter set storage part 40*c*. Since the parameters related to the inference processing filter include "application of the inference processing filter" and "non-application of the inference processing filter", the parameter set stored in the parameter set storage part 40*c* includes a first parameter set for setting the inference processing filter to be executable and a second parameter set for not setting the inference processing filter. During the operation of the optical information reading device 1 or 1A, one parameter set selected from the first parameter set and the second parameter set is applied. When the first parameter set is applied, the decoding processing part 20*f* executes decoding processing on an ideal image on which inference processing has been executed by the inference processing filter. On the other hand, when the second parameter set is applied, the decoding processing part 20*f* executes decoding processing on a code image on which inference processing has not been executed.

The parameter set stored in the parameter set storage part 40*c* also includes items for setting the code condition included in the code image generated by the camera 5. In the items for setting the code condition, a PPC, a code type, a code size, and the like acquired by the tuning execution part 20*d* are set. For example, one parameter set can include the PPC, the code type, and the code size as the items for setting the code condition, the gain of the camera 5 as the imaging condition, the amount of light and the exposure time of the illumination part 4, an image processing filter type as an item of the image processing filter applied by the filter processing part 20*c*, parameters of the image processing filter, and an application item of the inference processing filter. The values and the like set by the tuning execution part 20*d* may be used directly as these items, or the user can arbitrarily change these items.

Example of Procedure of Tuning Step

Figure 10:
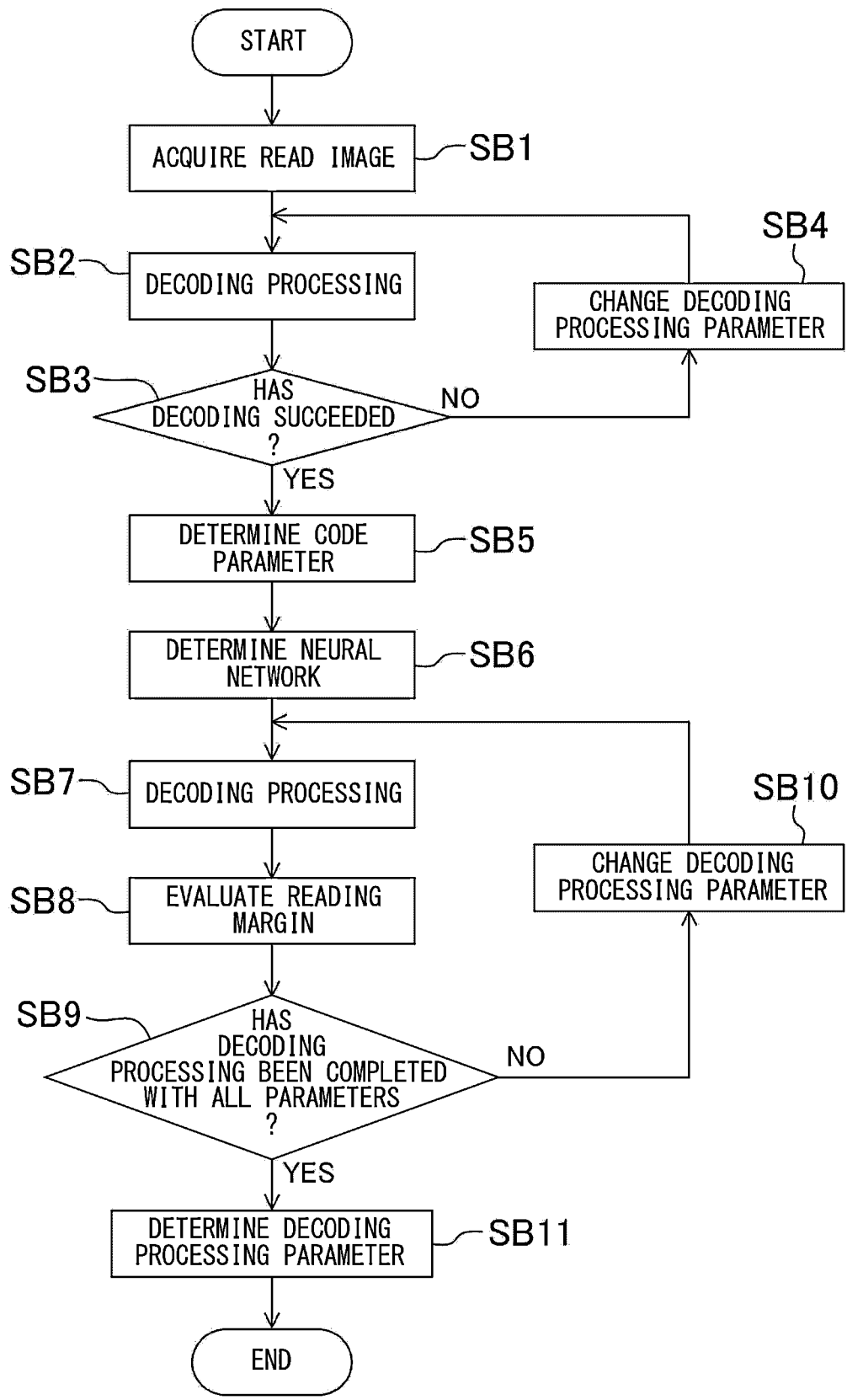
FIG. 10 is a flowchart illustrating an example of a procedure of a tuning step performed during setting of the optical information reading device.

An example of a procedure of a tuning step performed by the tuning execution part 20*d* at the time of setting the optical information reading device 1 or 1A will be specifically described with reference to a flowchart illustrated in FIG. 10. In Step SB1 after the start of the flowchart illustrated in FIG. 10, the tuning execution part 20*d* controls the illumination part 4 and the camera 5 to cause the camera 5 to generate a code image, and the tuning execution part 20*d* acquires the code image. At this time, the presence or absence and a type of an image processing filter executed before decoding processing, and a decoding processing parameter for applying inference processing using a neural network are set to arbitrary parameters. Next, the processing proceeds to Step SB2, where the tuning execution part 20*d* causes the decoding processing part 20*f* to execute the decoding processing on the acquired code image.

After the decoding processing, the processing proceeds to Step SB3, and the tuning execution part 20*d* determines whether the decoding processing in Step SB2 has succeeded. When NO is determined in Step SB3 and the decoding processing in Step SB2 fails, that is, when reading of the code has failed, the processing proceeds to Step SB4, the decoding processing parameter is changed to another parameter, and then, the decoding processing is executed again in Step SB2. When the decoding processing has failed with all the decoding processing parameters, this flow is ended and a notification is given to the user.

On the other hand, when YES is determined in Step SB3 and the decoding processing in Step SB2 has succeeded, the processing proceeds to Step SB5, and the tuning execution part 20*d* determines code parameters (a PPC, a code type, a code size, and the like). When the tuning execution part 20*d* determines the code parameters, a structure and parameters of a neural network stored in the neural network storage part 40*d* in association with the code parameters are also determined (Step SB6). In Step SB6, the neural network is configured using the structure and parameter read from the neural network storage part 40*d*.

In Step SB7, the inference processing part 20*j* inputs the code image to the neural network configured in Step SB6 to execute the inference processing, and the decoding processing part 20*f* executes the decoding processing on the generated ideal image. Thereafter, the processing proceeds to Step SB8, and the tuning execution part 20*d* evaluates a reading margin based on a result of the decoding processing in Step SB7 and temporarily stores a result of the evaluation.

In Step SB9, it is determined whether the execution of the decoding processing has been completed with all the decoding processing parameters. When NO is determined in Step SB9 and the execution of the decoding processing has not been completed with all the decoding processing parameters, the processing proceeds to Step SB10, the decoding processing parameter is changed to another parameter, and then, the processing proceeds to Step SB7.

On the other hand, when YES is determined in Step SB9 and the execution of the decoding processing has been completed with all the decoding processing parameters, the processing proceeds to Step SB11. In Step SB11, the tuning execution part 20*d* selects a decoding processing parameter having the highest reading margin from among all the decoding processing parameters, and determines the selected decoding processing parameter as a parameter to be applied during the operation. Note that the imaging condition and the like are also set to appropriate conditions in the tuning step.

(Decoding Processing Procedure Before Determination of Reduction Ratio and Enlargement Ratio)

Next, an example of a decoding processing procedure before determination of a reduction ratio and an enlargement ratio will be specifically described with reference to a flowchart illustrated in FIG. 11. The processing specified in the flowchart illustrated in FIG. 11 can be executed in Step SB2 of the flowchart illustrated in FIG. 10.

Figure 11:
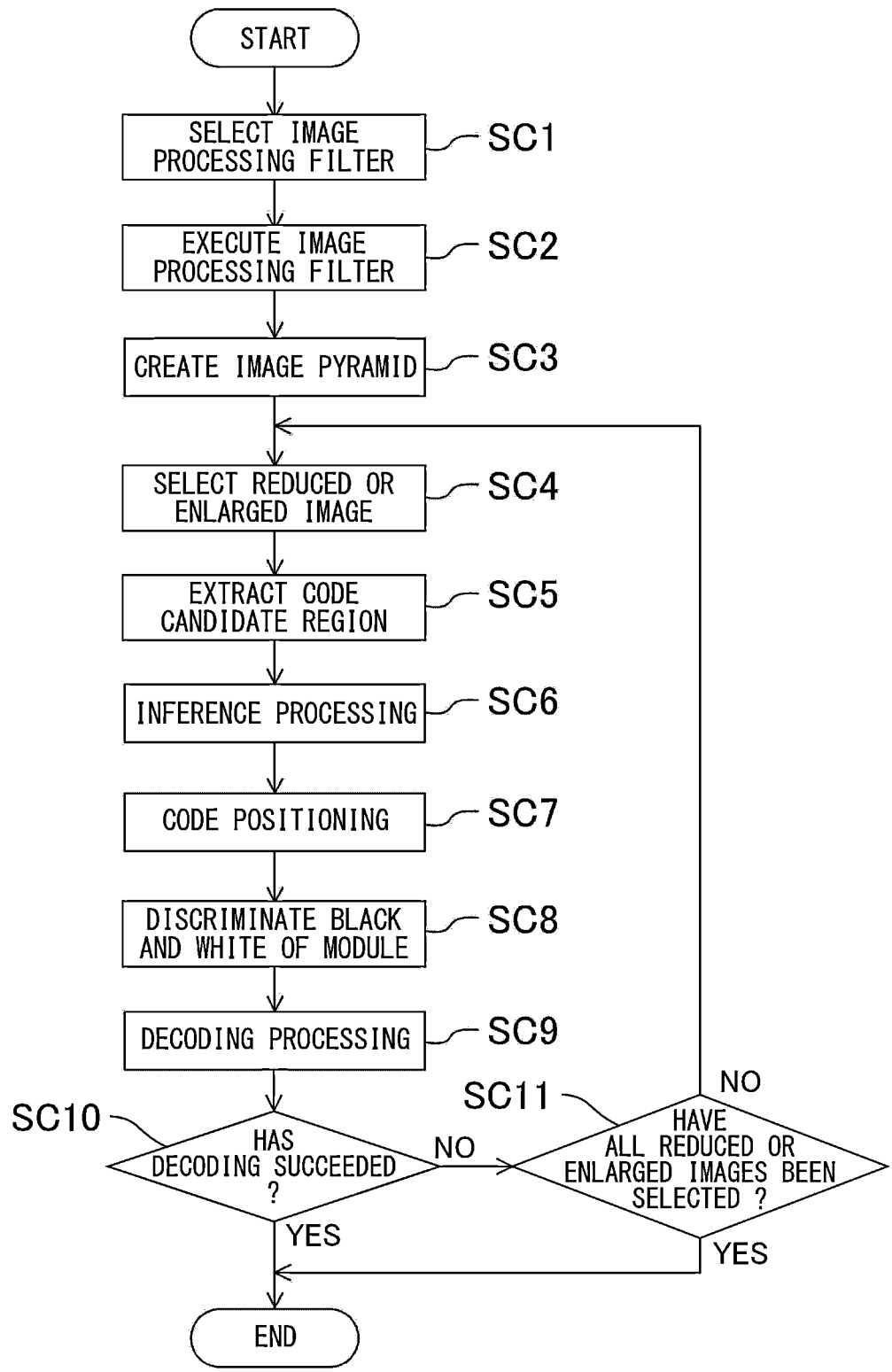
FIG. 11 is a flowchart illustrating an example of a decoding processing procedure before a reduction ratio and an enlargement ratio are determined.

In Step SC1 after the start of the flowchart illustrated in FIG. 11, the tuning execution part 20*d* selects an arbitrary image processing filter from the plurality of image processing filters. This image processing filter is a filter to be executed by the filter processing part 20*c*. Thereafter, the filter processing part 20*c* executes the image processing filter selected in Step SC1 on a code image in Step SC2.

Next, the processing proceeds to Step SC3 to create an image pyramid. The image pyramid includes an original code image, an image obtained by reducing the original code image to ½, an image obtained by reducing the original code image to ¼, an image obtained by reducing the original code image to ⅛, and so on. The reduction of the code image is executed by the reduction part 20*h*. In addition, the image pyramid can also include an original code image, an image obtained by enlarging the original code image twice, an image obtained by enlarging the original code image four times, an image obtained by enlarging the original code image eight times, and so on. The enlargement of the code image is performed by the enlargement part 20*i*. Note that one of the reduced image and the enlarged image may be omitted.

After the image pyramid is created, the processing proceeds to Step SC4, and an arbitrary code image is selected from the plurality of code images forming the image pyramid. There is also a case where the selected image includes the original code image that has not been reduced or enlarged. In Step SC5, the extraction part 20*g* extracts the code candidate region in which the code is highly likely to be present from the code image selected in Step SC4. Thereafter, the processing proceeds to Step SC6, and the inference processing part 20*j* inputs a partial image corresponding to the code candidate region extracted in Step SC5 to the neural network to execute the inference processing. A size of the partial image input to the neural network is determined by the code condition described above.

After the inference processing is executed to generate the ideal image, the processing proceeds to Step SC7 to execute a process of positioning a contour of the code and modules forming the code. After the positioning process, the processing proceeds to Step SC8 to discriminate whether each of the modules forming the code is white or black. After the black and white are discriminated, the processing proceeds to Step SC9, and the decoding processing part 20*f* executes decoding processing on the generated ideal image. In the decoding processing, for example, a technique of restoring a character string from a (0,1)-matrix of a module can be adopted.

Thereafter, the processing proceeds to Step SC10, and the tuning execution part 20*d* determines whether the decoding processing in Step SC9 has succeeded. When NO is determined in Step SC10 and the decoding processing in Step SC9 has failed, the processing proceeds to Step SC11 to determine whether all the code images forming the image pyramid have been selected. When NO is determined in Step SC11 and all the code images forming the image pyramid have not been selected, the processing proceeds to Step SC4 to select another reduced code image or another enlarged code image forming the image pyramid, and the processing proceeds to Step SC5.

On the other hand, when YES is determined in Step SC11 and all the code images forming the image pyramid have been selected, this flow is ended, and a condition under which decoding has succeeded is stored.

(Decoding Processing Procedure after Determination of Reduction Ratio and Enlargement Ratio)

Next, an example of a decoding processing procedure after determination of a reduction ratio and an enlargement ratio will be specifically described with reference to a flowchart illustrated in FIG. 12. The processing specified in the flowchart illustrated in FIG. 12 can be executed in Step SB7 of the flowchart illustrated in FIG. 10 and during the operation of the optical information reading device 1 or 1A.

Figure 12:
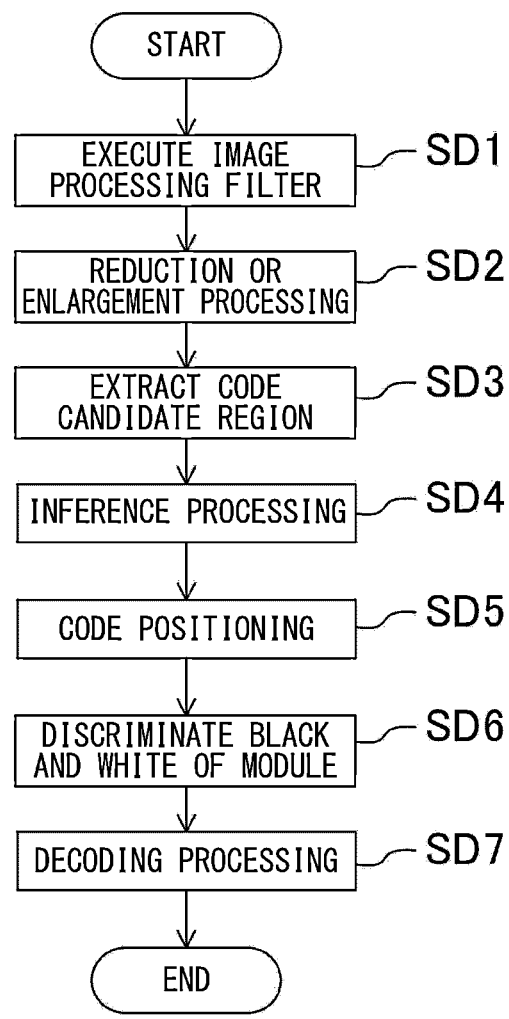
FIG. 12 is a flowchart illustrating an example of a decoding processing procedure after the reduction ratio and the enlargement ratio are determined.
Figure 13A:
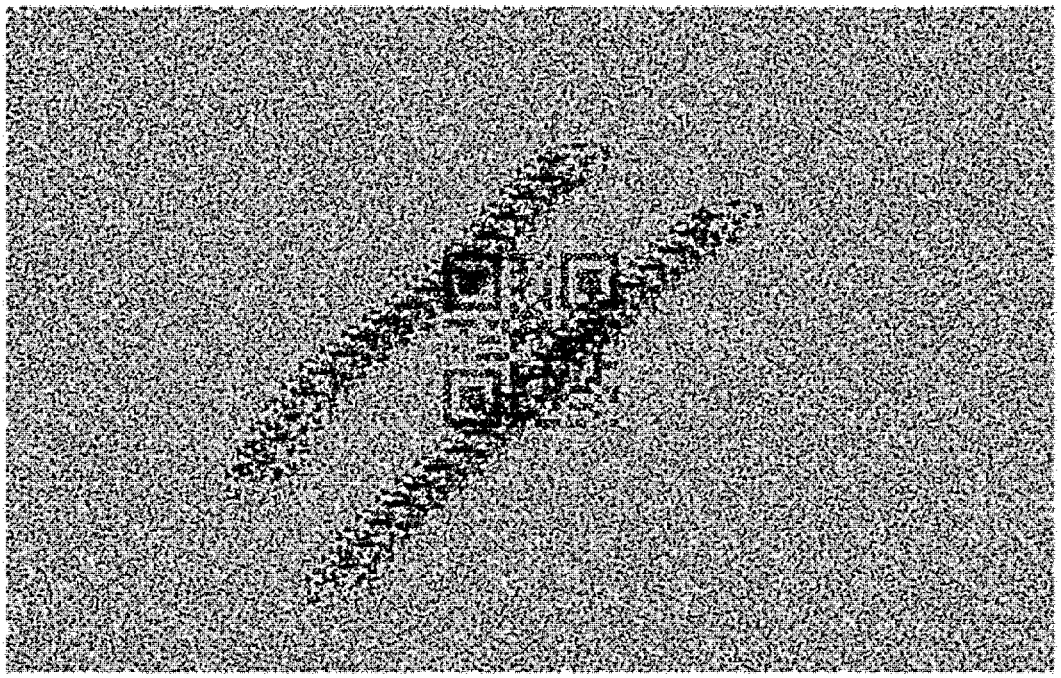
FIG. 13A is a view illustrating an example of a code image generated by a camera.
Figure 13B:
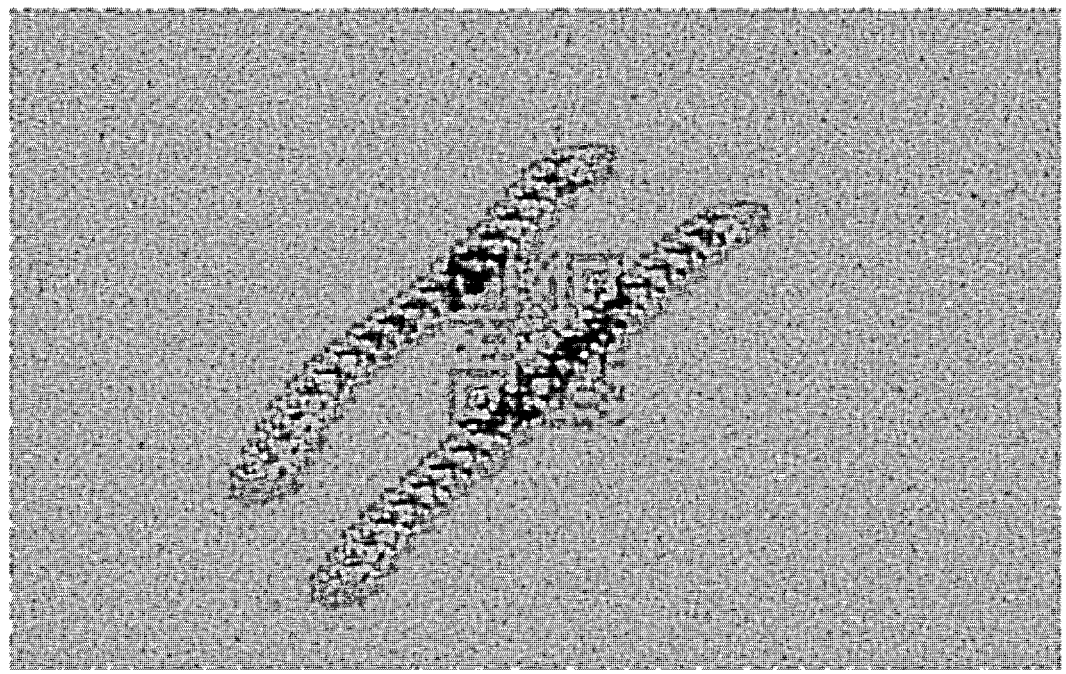
FIG. 13B is a view illustrating an example of an image obtained after execution of an image processing filter.

In Step SD1 after the start of the flowchart illustrated in FIG. 12, the filter processing part 20*c* executes the image processing filter selected in Step SC1 of the flowchart illustrated in FIG. 11 on a code image. At this time, when the filter processing part 20*c* executes the averaging filter on the code image as illustrated at upper side in FIG. 13, an image obtained after execution of the image processing filter as illustrated at a lower side in FIG. 13 is obtained.

Figure 14A:
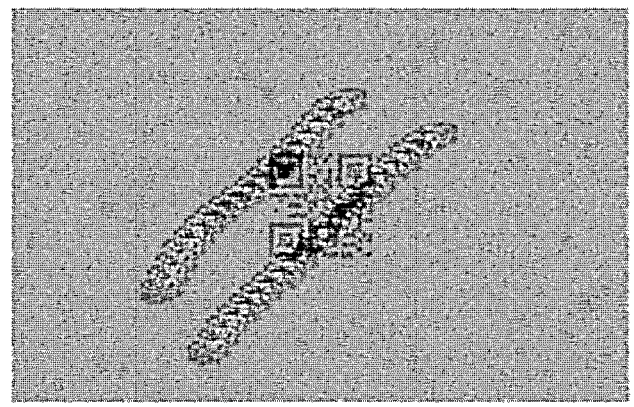
FIG. 14A is a view illustrating an example of an image obtained after reduction processing.
Figure 14B:
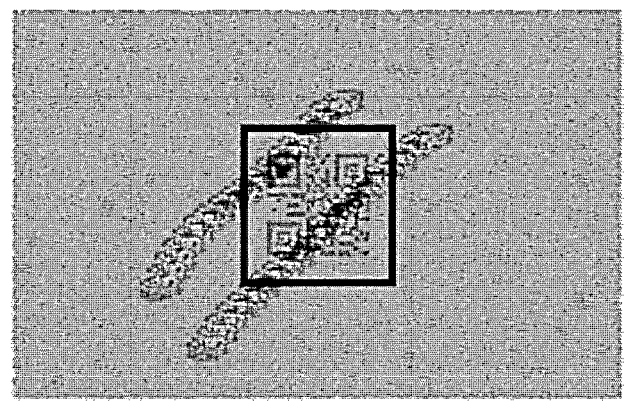
FIG. 14B is a view illustrating an example of an image obtained after code region extraction.

Thereafter, the processing proceeds to Step SD2 to execute reduction or enlargement processing on the code image as necessary. Specifically, the reduction or enlargement is not executed when the PPC of the code in the code image obtained after execution of the image processing filter falls within the specific range, and the reduction or enlargement is executed when the PPC is out of the specific range such that the PPC falls within the specific range. An example of a code image obtained after the reduction processing is illustrated at an upper side in FIG. 14.

Next, in Step SD3, the extraction part 20*g* extracts the code candidate region in which the code is highly likely to be present from the code image reduced or enlarged in Step SD2. An example of a code candidate region extraction image is illustrated at a lower side in FIG. 14. Note that, when the original code image is not reduced or enlarged in Step SD2, the extraction processing is executed on the original code image in Step SD3.

Figure 15:
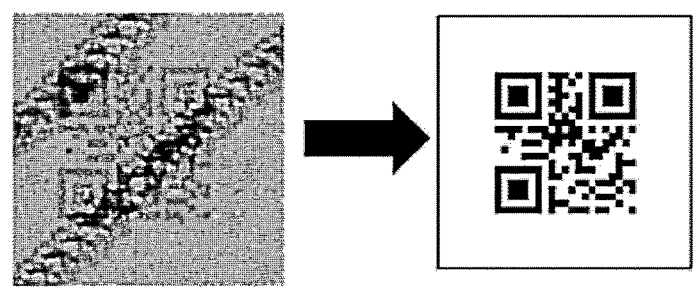
FIG. 15 is a view illustrating an example in which inference processing is executed on the code image using a neural network.

Thereafter, the processing proceeds to Step SD4, and the inference processing part 20*j* inputs a partial image corresponding to the code candidate region extracted in Step SD3 to the neural network to execute the inference processing. FIG. 15 illustrates examples of the code image before execution of the inference processing and the ideal image obtained after execution of the inference processing. After the ideal image is generated, the flow is ended after passing through Steps SD5 to SD7. Steps SD5 to SD7 are the same as Steps SC7 to SC9 in the flowchart illustrated in FIG. 11.

(Two Types of Decoding Processing)

As described above, the present embodiment include: a case where the inference processing part 20*j* does not execute the inference processing on the code image generated by the camera 5 and the decoding processing part 20*f* executes the decoding processing on the code image; and a case where the inference processing part 20*j* executes the inference processing on the code image generated by the camera 5 to generate the ideal image and the decoding processing part 20*f* executes the decoding processing on the generated ideal image. The former case, that is, the case of performing the decoding processing on the code image is referred to as first decoding processing, and the latter case, that is, the case of performing the decoding processing on the ideal image generated by the inference processing is referred to as second decoding processing.

The first decoding processing and the second decoding processing are executed by the common decoding processing part 20*f*, but may be executed by different decoding processing parts. That is, since the processor 20 includes the dedicated core 25 and the first to fourth general-purpose cores 21 to 24, the inference processing by the inference processing part 20*j* configured using the dedicated core 25 and the first decoding processing by the decoding processing part 20*f* configured using at least one of the first to fourth general-purpose cores 21 to 24 can be executed in parallel at high speed. Further, the processor 20 can execute the second decoding processing by the decoding processing part 20*f* after the inference processing by the inference processing part 20*j* is completed. Hereinafter, specific examples will be described.

First Example

Figure 16:
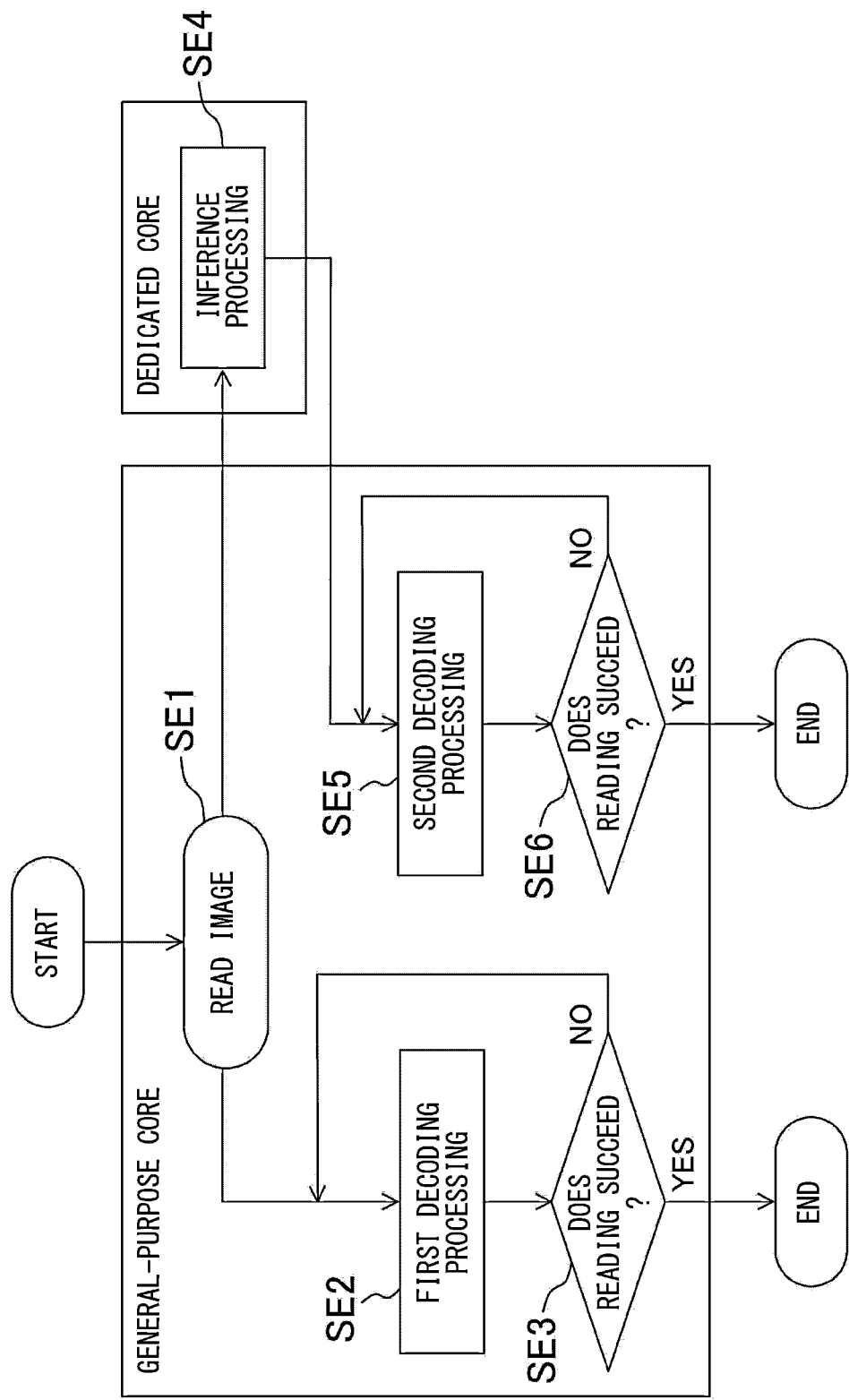
FIG. 16 is a flowchart illustrating a first example in a case where decoding processing on the code image and the inference processing are executed in parallel.

FIG. 16 is a flowchart illustrating a first example in a case where the first decoding processing and the inference processing are executed in parallel. In Step SE1 after the start of this flowchart, the processor 20 acquires a code image. Thereafter, in Step SE2, the first decoding processing, that is, decoding processing on the code image is executed by the decoding processing part 20*f*. After the first decoding processing, the processing proceeds to Step SE3, and it is determined whether reading has succeeded. When the reading does not succeed, the processing returns to Step SE2, and the first decoding processing is executed again. If the reading does not succeed even after a predetermined number of times (time) elapses, a timeout occurs, and the decoding processing is ended. On the other hand, when it is determined in Step SE3 that the reading has succeeded, the decoding processing is ended.

In addition, the processing proceeds to Step SE4 in parallel with proceeding from Step SE1 to Step SE2. In Step SE4, the inference processing part 20*j* executes inference processing on a code image generated by the camera 5 to generate an ideal image. The generation of the ideal image and the first decoding processing in Step SE2 are executed in parallel, and different code images are used. After the ideal image is generated in Step SE4, the processing proceeds to Step SE5, and the second decoding processing, that is, decoding processing on the ideal image generated in Step SE4 is executed by the decoding processing part 20*f*. After the second decoding processing, the processing proceeds to Step SE6, and it is determined whether reading has succeeded. When the reading does not succeed, the processing returns to Step SE5, and the second decoding processing is executed again. If the reading does not succeed even after a predetermined number of times (time) elapses, a timeout occurs, and the decoding processing is ended. On the other hand, when it is determined in Step SE6 that the reading has succeeded, the decoding processing is ended.

A function of canceling Steps SE4 to SE6 may be provided in the optical information reading device 1. Steps SE4 to SE6 are steps of executing the inference processing and the second decoding processing, but particularly the inference processing requires time. Thus, the processing can be speeded up by canceling Steps SE4 to SE6. As a method of canceling Steps SE4 to SE6, for example, there is a method of using the user's operation. For example, as one of parameters stored in the parameter set storage part 40*c*, a selection parameter as to whether to execute the inference processing may be included. When this selection parameter is changed by the user, it is possible to switch between a mode in which the inference processing is executed and a mode in which the inference processing is not executed. The selection parameter may be, for example, a selection parameter of a "speed priority mode". When the "speed priority mode" is selected by the user, the operation is performed in the mode in which the inference processing is not executed. On the other hand, when the "speed priority mode" is not selected, the operation is performed in the mode in which the inference processing is executed. Note that the inference processing may be automatically canceled in a case where it is determined that the inference processing is unnecessary based on information obtained by tuning.

Figure 17A:
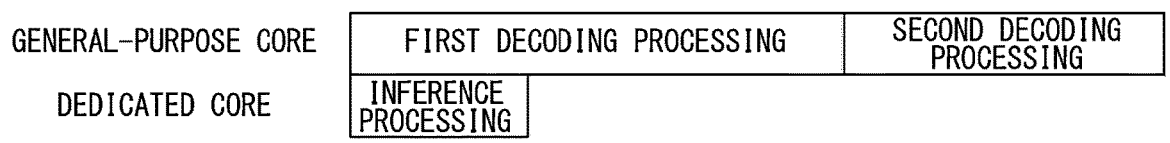
FIG. 17A is a sequence diagram illustrating Sequence Example 1 of the first example.

FIG. 17A is a sequence diagram illustrating Sequence Example 1 of the first example. As illustrated in FIG. 17A, the dedicated core 25 executes the inference processing while at least one general-purpose core among the first to fourth general-purpose cores 21 to 24 is executing the first decoding processing. When the first decoding processing ends and the inference processing ends, the general-purpose core executes the second decoding processing.

Figure 17B:
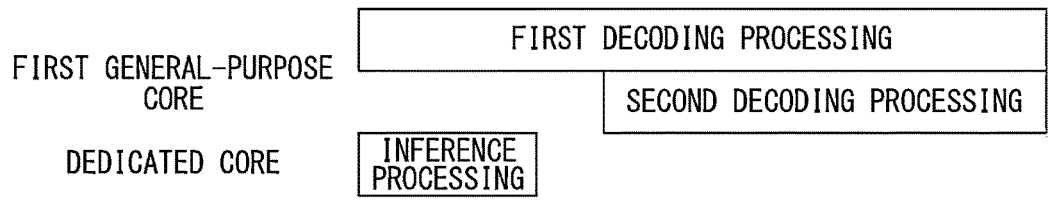
FIG. 17B is a sequence diagram illustrating Sequence Example 2 of the first example.

FIG. 17B is a sequence diagram illustrating Sequence Example 2 of the first example. In this example, the first general-purpose core 21 executes the first decoding processing and the second decoding processing in parallel with different threads. Specifically, the dedicated core 25 executes the inference processing while the first general-purpose core 21 is executing the first decoding processing. When the inference processing ends, the first general-purpose core 21 executes the second decoding processing with a thread different from that for the first decoding processing without waiting for the end of the first decoding processing.

Figure 17C:
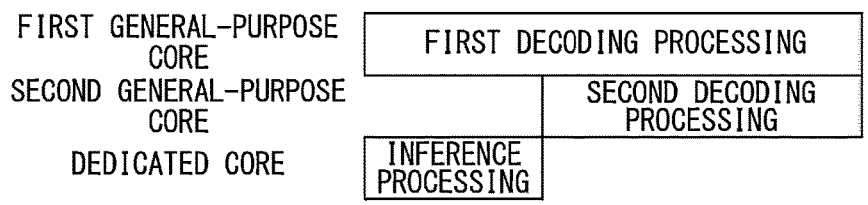
FIG. 17C is a sequence diagram illustrating Sequence Example 3 of the first example.

FIG. 17C is a sequence diagram illustrating Sequence Example 3 of the first example. In this example, the first general-purpose core 21 executes the first decoding processing, and the second general-purpose core 22 executes the second decoding processing. Specifically, the dedicated core 25 executes the inference processing while the first general-purpose core 21 is executing the first decoding processing. When the inference processing ends, the second general-purpose core 22 executes the second decoding processing without waiting for the end of the first decoding processing. As a result, the first decoding processing and the second decoding processing can be executed by different general-purpose cores, and thus, the processing is further speeded up.

Second Example

Figure 18:
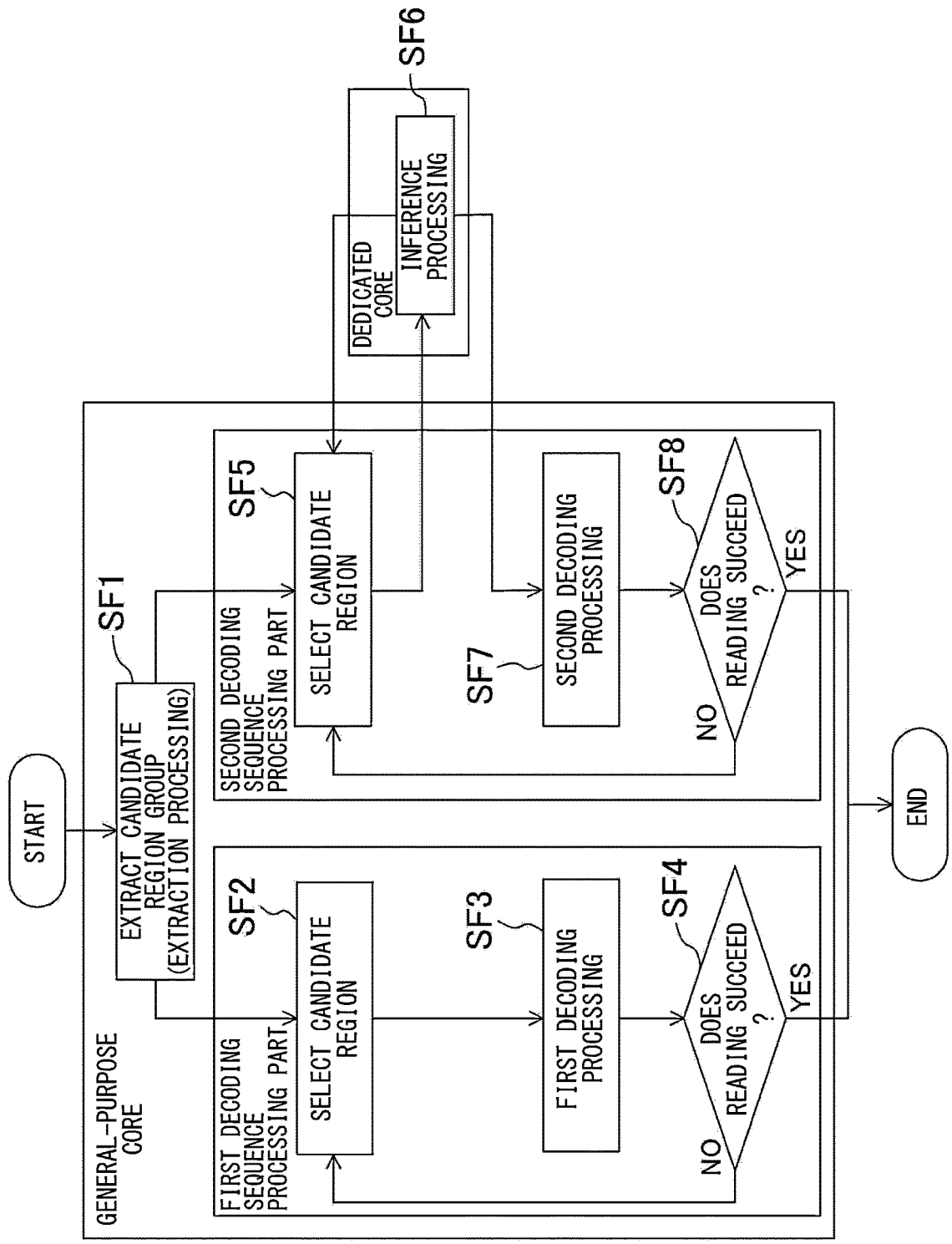
FIG. 18 is a flowchart illustrating a second example in the case where the decoding processing on the code image and the inference processing are executed in parallel.

FIG. 18 is a flowchart illustrating a second example in the case where the first decoding processing and the inference processing are executed in parallel, and the second example illustrates a case where a plurality of code candidate regions are extracted. In Step SF1 after the start of this flowchart, the extraction part 20g executes extraction processing of extracting code candidate regions in which a code is highly likely to be present from the code image generated by the camera 5. As a result, a candidate region group including the plurality of code candidate regions is extracted. The plurality of code candidate regions are extracted from one code image, and e a region not including the code may be mixed in practice.

After Step SF1, the processing is divided into processing by a first decoding sequence processing part and processing by a second decoding sequence processing part. In Step SF2, the first decoding sequence processing part selects one code candidate region from the code candidate region group. At this time, the regions are ranked in a descending order from a region having a higher possibility of presence of the code, and the region having the higher possibility of presence of the code is preferentially selected. In Step SF3, the decoding processing part 20f executes the first decoding processing on the code candidate region selected in Step SF2. After the first decoding processing, the processing proceeds to Step SF4, and it is determined whether reading has succeeded. When it is determined in Step SF4 that the reading has succeeded, the decoding processing is ended.

On the other hand, if the reading does not succeed, the processing returns to Step SF2, and only one code candidate region on which the first decoding processing has not been executed is selected from the code candidate region group in the above order. Thereafter, the processing proceeds to Step SF3, and the decoding processing part 20f executes the first decoding processing on the code candidate region selected in Step SF2. If the reading does not succeed again, the processing returns to Step SF2. If the reading does not succeed, the decoding processing part 20f repeatedly performs the first decoding processing on all the code candidate regions. When the reading has not succeeded even once, the timeout also occurs, and the decoding processing is ended.

On the other hand, in Step SF5, the second decoding sequence processing part selects one code candidate region from the code candidate region group similarly to Step SF2. In Step SF6, the inference processing part 20j executes inference processing on the code candidate region selected in Step SF5 to generate an ideal image. The generation of the ideal image and the first decoding processing in Step SF3 are executed in parallel. After the ideal image is generated in Step SF6, the processing proceeds to Step SF7, and the second decoding processing, that is, decoding processing on the ideal image generated in Step SF6 is executed by the decoding processing part 20f. After the second decoding processing, the processing proceeds to Step SF8, and it is determined whether reading has succeeded. When it is determined in Step SF8 that the reading has succeeded, the decoding processing is ended.

On the other hand, if the reading does not succeed, the processing returns to Step SF5, and only one code candidate region on which the inference processing has not been executed is selected from the code candidate region group in the above order. Thereafter, the processing proceeds to Step SF6 to generate an ideal image, and then, the processing proceeds to Step SF7. In Step SF7, the second decoding processing is executed. If the reading does not succeed again, the processing returns to Step SF5. If the reading does not succeed, the generation of the ideal image and the second decoding processing are repeated for all the code candidate regions. When the reading has not succeeded even once, the decoding processing is also ended.

Figure 19:
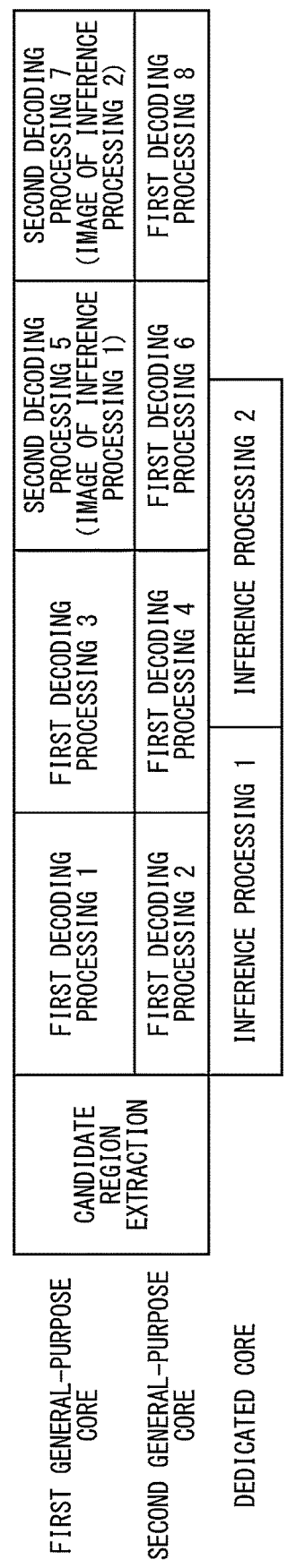
FIG. 19 is a sequence diagram illustrating a sequence example of the second example.

FIG. 19 is a sequence diagram illustrating a sequence example of the second example. In this example, both the first general-purpose core 21 and the second general-purpose core 22 execute the extraction processing. As a result, the extraction processing is completed at high speed even when there are the plurality of code candidate regions. In this example, a case where Code Candidate Regions 1 to 8 are extracted will be described.

After the extraction processing, the first general-purpose core 21 executes the first decoding processing on Code Candidate Region 1 (First Decoding Processing 1). In addition, the second general-purpose core 22 executes the first decoding processing on Code Candidate Region 2 (First Decoding Processing 2). First Decoding Processing 1 and First Decoding Processing 2 are executed in parallel. In addition, the dedicated core 25 executes the inference processing on Code Candidate Region 5 while First Decoding Processing 1 and First Decoding Processing 2 are being executed (Inference Processing 1).

When First Decoding Processing 1 ends, the first general-purpose core 21 executes the first decoding processing on Code Candidate Region 3 (First Decoding Processing 3). In addition, when First Decoding Processing 2 ends, the second general-purpose core 22 executes the first decoding processing on Code Candidate Region 4 (First Decoding Processing 4). When the dedicated core 25 ends Inference Processing 1 while First Decoding Processing 3 and First Decoding Processing 4 are being executed, the dedicated core 25 executes the inference processing on Code Candidate Region 7 (Inference Processing 2).

When First Decoding Processing 3 ends, the first general-purpose core 21 executes the second decoding processing on an ideal image (image corresponding to Code Candidate Region 5) generated by Inference Processing 1 since Inference Processing 1 has already ended (Second Decoding Processing 5). On the other hand, when First Decoding Processing 4 ends, the second general-purpose core 22 executes the first decoding processing on Code Candidate Region 6 since Inference Processing 2 has not ended (First Decoding Processing 6).

The dedicated core 25 ends Inference Processing 2 while Second Decoding Processing 5 and First Decoding Processing 6 are being executed. When First Decoding Processing 5 ends, the first general-purpose core 21 executes the second decoding processing on an ideal image (image corresponding to Code Candidate Region 7) generated by Inference Processing 2 since Inference Processing 2 has already ended (Second Decoding Processing 7). On the other hand, when First Decoding Processing 6 ends, the second general-purpose core 22 executes the first decoding processing on Code Candidate Region 8 (First Decoding Processing 8). In this manner, in the case where the ideal image has been generated by the inference processing by the dedicated core 25, the first general-purpose core 21 and the second general-purpose core 22 are configured to execute the second decoding processing in preference to the next first decoding processing without executing the next first decoding processing if the first decoding processing that is being currently executed ends.

Among the plurality of general-purpose cores 21 to 24, for example, the first general-purpose core 21 may execute the extraction processing, the second general-purpose core 22 may execute the first decoding processing, and the third general-purpose core 23 may execute the second decoding processing. In addition, the fourth core 24 may execute imaging control of the camera 5 and control of the illumination part 4. Since the plurality of types of processing are shared among the general-purpose cores 21 to 24 in this manner, the processing can be further speeded up.

Third Example

Figure 20:
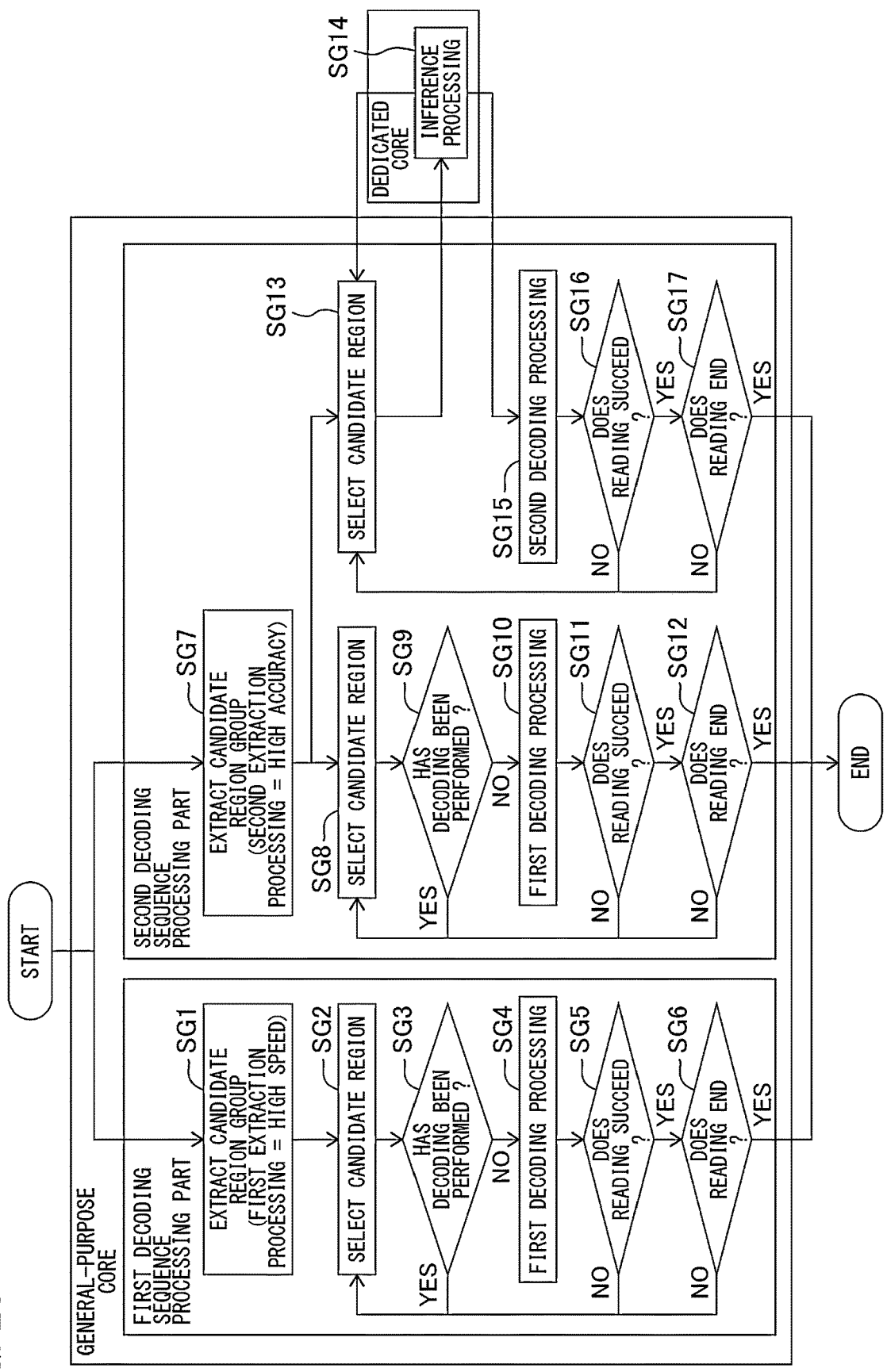
FIG. 20 is a flowchart illustrating a third example in the case where the decoding processing on the code image and the inference processing are executed in parallel.

FIG. 20 is a flowchart illustrating a third example in the case where the first decoding processing and the inference processing are executed in parallel. In the third example, in a case where a plurality of code candidate regions are extracted, the first decoding processing is performed when it is determined that decoding has not been completed after a step of determining whether decoding has been completed for a code candidate region.

In this flowchart, after the start, processing is divided into processing by the first decoding sequence processing part and processing by the second decoding sequence processing part. In Step SG1 of the first decoding sequence processing part, the extraction part 20g executes first extraction processing of extracting a code candidate region in which a code is highly likely to be present from the code image generated by the camera 5. On the other hand, in Step SG7 of the second decoding sequence processing part, the extraction part 20g executes second extraction processing of extracting a code candidate region in which a code is highly likely to be present from the code image generated by the camera 5.

The first extraction processing in Step SG1 and the second extraction processing in Step SG7 have different extraction conditions. As will be described later, the first decoding processing is performed on the code candidate region extracted in the first extraction processing (Step SG4), and the inference processing is performed on the code candidate region extracted in the second extraction processing (Step SG14). A reason why the extraction conditions are varied between the first extraction processing and the second extraction processing in this manner is that the first decoding sequence processing part is intended to take an image that is easy to read at high speed and read the image at high speed and the second decoding sequence processing part is intended to take an image, which is highly likely to fail in the first decoding sequence processing part and is difficult to read, with high accuracy and accurately read the image.

For example, the first extraction processing extracts the code candidate region under a first predetermined condition that enables high-speed extraction, and the second extraction processing extracts the code candidate region under a second predetermined condition that enables extraction with higher accuracy than the first predetermined condition. In other words, under the first predetermined condition, the high-speed extraction processing is possible although the extraction accuracy is lower than that under the second predetermined condition. Thus, the first predetermined condition is a condition that enables extraction faster than that under the second predetermined condition.

As specific condition setting, an extraction threshold of the first predetermined condition is set to be lower than an extraction threshold of the second predetermined condition, or the number of extraction conditions forming the first predetermined condition is set to be smaller than the number of extraction conditions forming the second predetermined condition. In addition, the second predetermined condition may be configured by combining another extraction condition with the extraction condition forming the first predetermined condition.

After the high-speed extraction processing is executed in Step SG1, the processing proceeds to Step SG2 to select one code candidate region from a code candidate region group. Thereafter, the processing proceeds to Step SG3, and it is determined whether the code candidate region selected in Step SG2 is a code candidate region that has already been subjected to the decoding processing. When YES is determined in Step SG3 and the code candidate region is the code candidate region that has been already subjected to the decoding processing, the processing returns to Step SG2 to select another code candidate region from the code candidate region group, and proceeds to Step SG3.

Since the case where YES is determined in Step SG3 means that the code candidate region selected in Step SG2 has not yet been subjected to the decoding processing, the processing proceeds to Step SG4, and the decoding processing part 20f executes the first decoding processing on the code candidate region selected in Step SG2. After the first decoding processing, the processing proceeds to Step SG5, and it is determined whether reading has succeeded. When it is determined in Step SG5 that reading has succeeded, the processing proceeds to Step SG6 to determine whether the reading has ended. This flow is ended when the reading has ended in the first decoding processing in Step SG5, but the processing returns to Step SG2 to select another code candidate region from the code candidate region group, and proceeds to Step SG3 when the reading has not ended. If the reading does not succeed in Step SG5, the processing returns to Step SG2.

On the other hand, when the processing proceeds to Step SG8 through Step SG7 of the second decoding sequence processing part, one code candidate region is selected from the code candidate region group. Steps SG9 to SG12 are steps similar to Steps SG3 to SG6 described above.

When the processing proceeds to Step SG13 through Step SG7, one code candidate region is selected from the code candidate region group. In Step SG14, the inference processing part 20j executes inference processing on the code candidate region selected in Step SG13 to generate an ideal image. The generation of the ideal image and the first decoding processing of Step SG4 and/or Step SG10 are executed in parallel. After the ideal image is generated in Step SG14, the processing proceeds to Step SG15 to execute the second decoding processing. After the second decoding processing, the processing proceeds to Step SG16, and it is determined whether reading has succeeded. When it is determined in Step SG16 that reading has succeeded, whether the reading has ended is determined in Step SG17. This flow is ended when the reading has ended with the first decoding processing in Steps SG4 and SG10 or the second decoding processing in Step SG15, but the processing returns to Step SG13 to select another code candidate region from the code candidate region group, and proceeds to Step SG14 when the reading has not ended. If the reading does not succeed in Step SG16, the processing returns to Step SG13.

Figure 21:
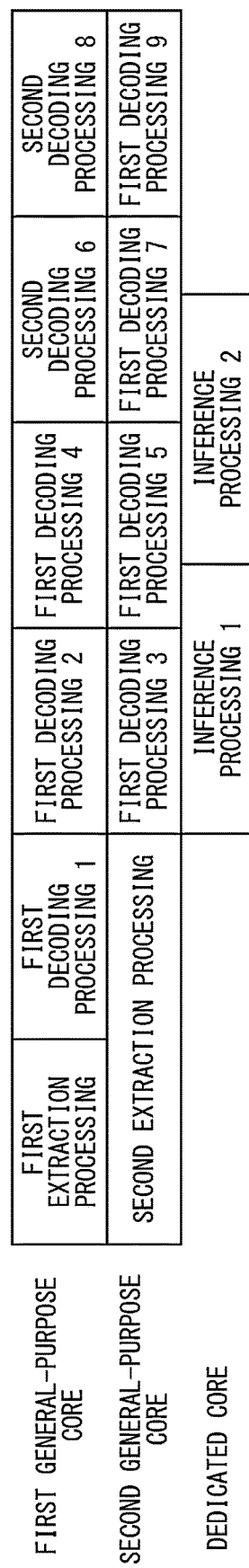
FIG. 21 is a sequence diagram illustrating a sequence example of the third example.

FIG. 21 is a sequence diagram illustrating a sequence example of the third example. In this example, since the first general-purpose core 21 executes the first extraction processing at a relatively high speed and the second general-purpose core 22 executes the second extraction processing with relatively high accuracy, the time for the second extraction processing is longer than the time for the first extraction processing. In addition, a case where Code Candidate Regions 1 to 9 are extracted by the first extraction processing and the second extraction processing will be described in this example.

After the first extraction processing, the first general-purpose core 21 executes the first decoding processing on Code Candidate Region 1 (First Decoding Processing 1). When First Decoding Processing 1 ends, the first general-purpose core 21 executes the first decoding processing on Code Candidate Region 2 (First Decoding Processing 2). In addition, after the second extraction processing, the second general-purpose core 22 executes the first decoding processing on Code Candidate Region 3 (First Decoding Processing 3). First Decoding Processing 2 and First Decoding Processing 3 are executed in parallel. In addition, after the second extraction processing, the dedicated core 25 executes the inference processing on Code Candidate Region 6 (code candidate region extracted in the second extraction processing) while First Decoding Processing 2 and First Decoding Processing 3 are being executed (Inference Processing 1).

In addition, when First Decoding Processing 2 ends, the first general-purpose core 21 executes the first decoding processing on Code Candidate Region 4 (First Decoding Processing 4). When First Decoding Processing 3 ends, the second general-purpose core 22 executes the first decoding processing on Code Candidate Region 5 (First Decoding Processing 5). When the dedicated core 25 ends Inference Processing 1 while First Decoding Processing 4 and First Decoding Processing 5 are being executed, the dedicated core 25 executes the inference processing on Code Candidate Region 8 (Inference Processing 2).

When First Decoding Processing 4 ends, the first general-purpose core 21 executes the second decoding processing on an ideal image (image corresponding to Code Candidate Region 6) generated by Inference Processing 1 since Inference Processing 1 has already ended (Second Decoding Processing 6). On the other hand, when First Decoding Processing 5 ends, the second general-purpose core 22 executes the first decoding processing on Code Candidate Region 7 since Inference Processing 2 has not ended (First Decoding Processing 7).

The dedicated core 25 ends Inference Processing 2 while Second Decoding Processing 6 and First Decoding Processing 7 are being executed. When Second Decoding Processing 6 ends, the first general-purpose core 21 executes the second decoding processing on an ideal image (image corresponding to Code Candidate Region 8) generated by Inference Processing 2 since Inference Processing 2 has already ended (Second Decoding Processing 8). On the other hand, when First Decoding Processing 7 ends, the second general-purpose core 22 executes the first decoding processing on Code Candidate Region 9 (First Decoding Processing 9).

(Description of Task Sequence)

Figure 22:
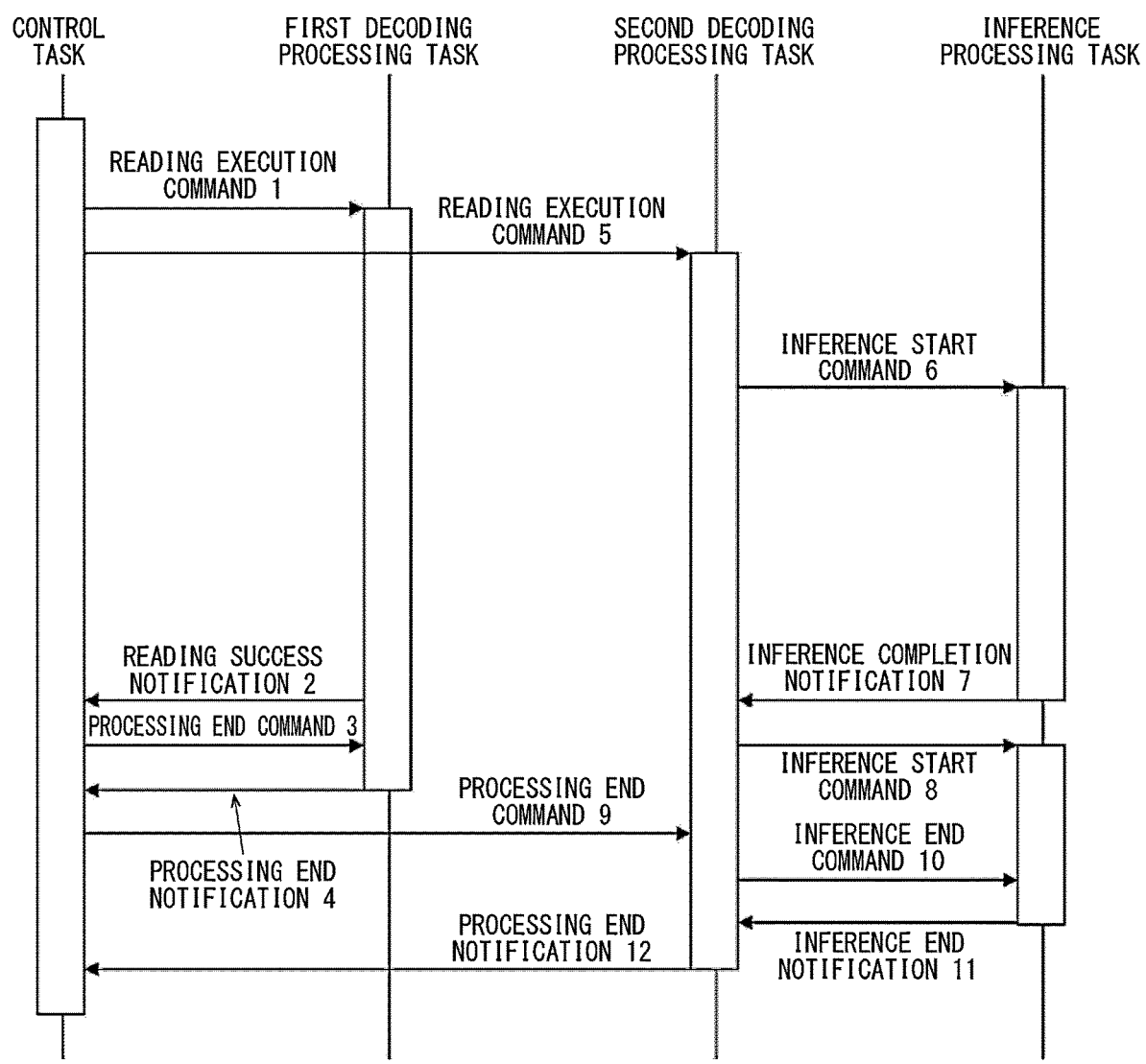
FIG. 22 is a task sequence diagram in a case where reading has succeeded in first decoding processing.

FIG. 22 is a task sequence diagram in a case where reading has succeeded in the first decoding processing. FIG. 22 illustrates a control task, a first decoding processing task, a second decoding processing task, and an inference processing task. When the control task issues Reading Execution Command 1 to the first decoding processing task, the first decoding processing is started. Reading Success Notification 2 is issued to the control task at a stage where the reading has succeeded in the first decoding processing. When receiving Reading Success Notification 2, the control task issues Processing End Command 3 to the first decoding processing task, and the first decoding processing task issues Processing End Notification 4 to the control task.

When the control task issues Reading Execution Command 5 to the second decoding processing task, the second decoding processing task issues Inference Start Command 6 to the inference processing task. When the inference processing is completed, the inference processing task issues Inference Completion Notification 7 to the second decoding processing task. Thereafter, the second decoding processing task issues the next Inference Start Command 8 to the inference processing task. Thereafter, since Processing End Notification 4 has been issued to the control task, the control task issues Processing End Command 9 to the second decoding processing task. The second decoding processing task issues Inference End Command 10 to the inference processing task, and the inference processing task issues Inference End Notification 11 to the second decoding processing task. Next, the second decoding processing task issues Processing End Notification 12 to the control task to end the reading. That is, the processor 20 is configured to end the inference processing in the middle even if the inference processing by the inference processing part 20j has not been completed in a case where the decoding has succeeded in the first decoding processing. As a result, the next inference processing can be started at an early stage.

Figure 23:
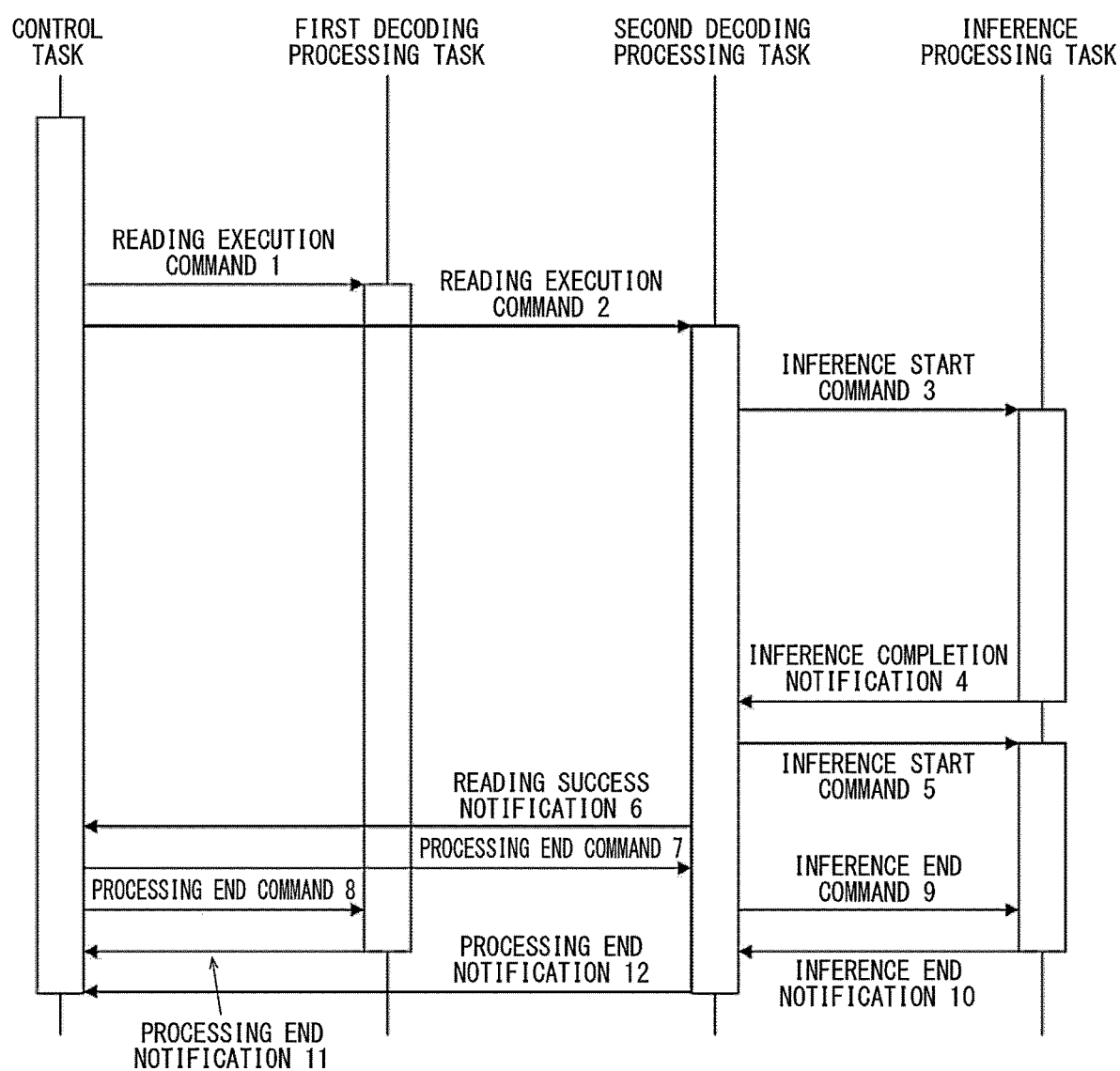
FIG. 23 is a task sequence diagram in a case where reading has succeeded in second decoding processing.

FIG. 23 is a task sequence diagram in a case where reading has succeeded in the second decoding processing. The control task issues Reading Execution Command 1 to the first decoding processing task, and issues Reading Execution Command 2 to the second decoding processing task. The second decoding processing task issues Inference Start Command 3 to the inference processing task. When the inference processing is completed, the inference processing task issues Inference Completion Notification 4 to the second decoding processing task. Thereafter, the second decoding processing task issues the next Inference Start Command 5 to the inference processing task.

The second decoding processing task receives Inference Completion Notification 4 and starts the second decoding processing. When the reading succeeds in the second decoding processing and the second decoding processing task issues Reading Success Notification 6 to the control task, the control task issues Processing End Command 7 to the second decoding processing task. At this time, the control task also issues Processing End Command 8 to the first decoding processing task.

When the second decoding processing task receives Processing End Command 7, Inference End Command 9 is issued to the inference processing task, and the inference processing task issues Inference End Notification 10 to the second decoding processing task. In addition, the first decoding processing task issues Processing End Notification 11 to the control task. In addition, the second decoding processing task issues Processing End Notification 12 to the control task. In this example, when the decoding has succeeded in the second decoding processing, the inference processing by the inference processing part 20j can be ended.

Figure 24:
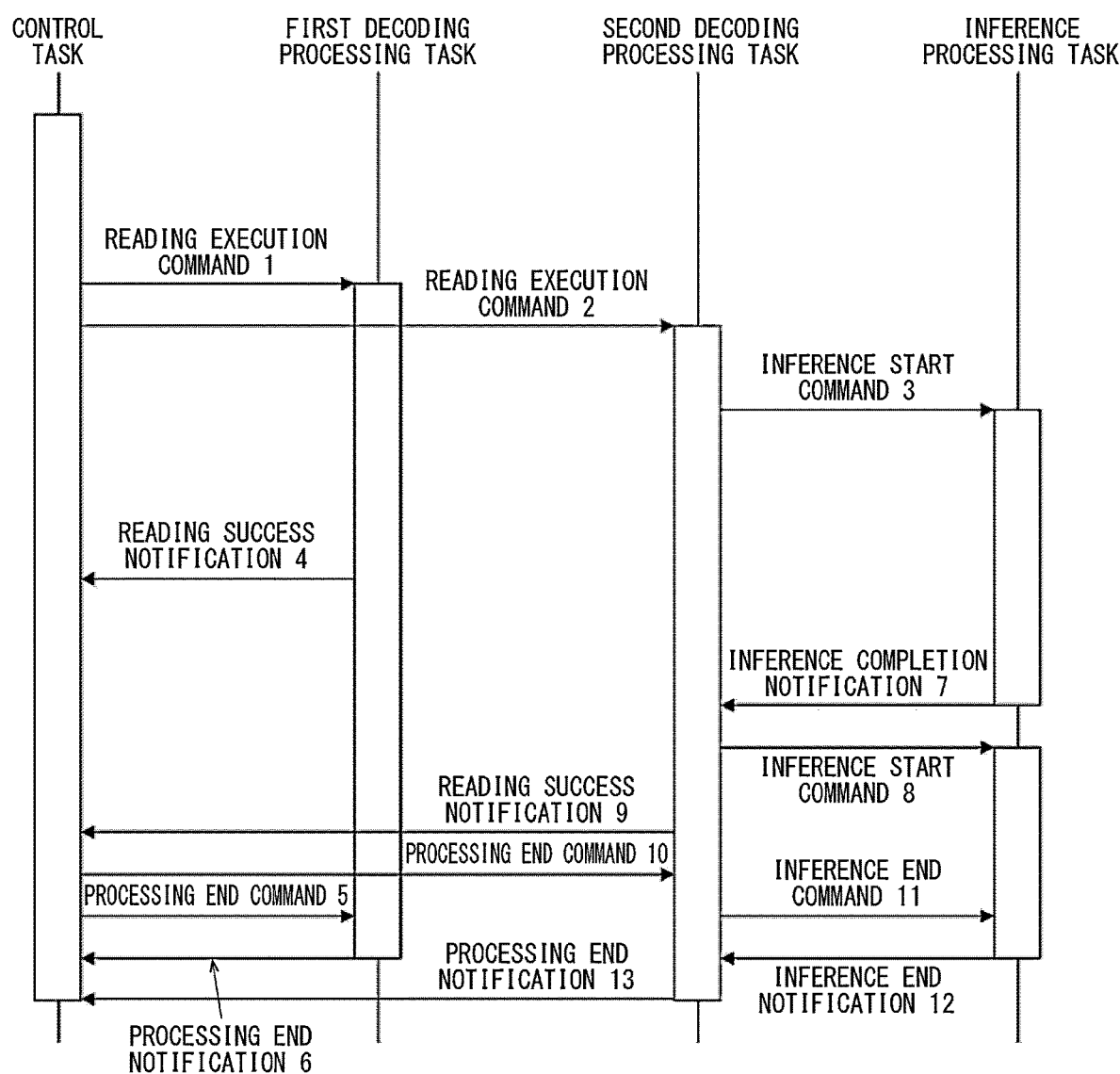
FIG. 24 is a task sequence diagram in a case where reading has succeeded in the first decoding processing and the second decoding processing.

FIG. 24 is a task sequence diagram in a case where reading has succeeded in the first decoding processing and the second decoding processing. The control task issues Reading Execution Command 1 to the first decoding processing task, and issues Reading Execution Command 2 to the second decoding processing task. The second decoding processing task issues Inference Start Command 3 to the inference processing task. The first decoding processing task starts the first decoding processing. When the reading succeeds in the first decoding processing and the first decoding processing task issues Reading Success Notification 4 to the control task, the control task issues Processing End Command 5 to the second decoding processing task. The second decoding processing task issues Processing End Notification 6 to the control task.

On the other hand, when the inference processing is completed, the inference processing task issues Inference Completion Notification 7 to the second decoding processing task. Thereafter, the second decoding processing task issues the next Inference Start Command 8 to the inference processing task. The second decoding processing task receives Inference Completion Notification 7 and starts the second decoding processing. When the reading succeeds in the second decoding processing and the second decoding processing task issues Reading Success Notification 9 to the control task, the control task issues Processing End Command 10 to the second decoding processing task.

When the second decoding processing task receives Processing End Command 10, Inference End Command 11 is issued to the inference processing task, and the inference processing task issues Inference End Notification 12 to the second decoding processing task. After receiving Inference End Notification 12, the second decoding processing task issues Processing End Notification 13 to the control task. In this example, when the decoding has succeeded in both the first decoding processing and the second decoding processing, the inference processing by the inference processing part 20j can be ended.

Figure 25:
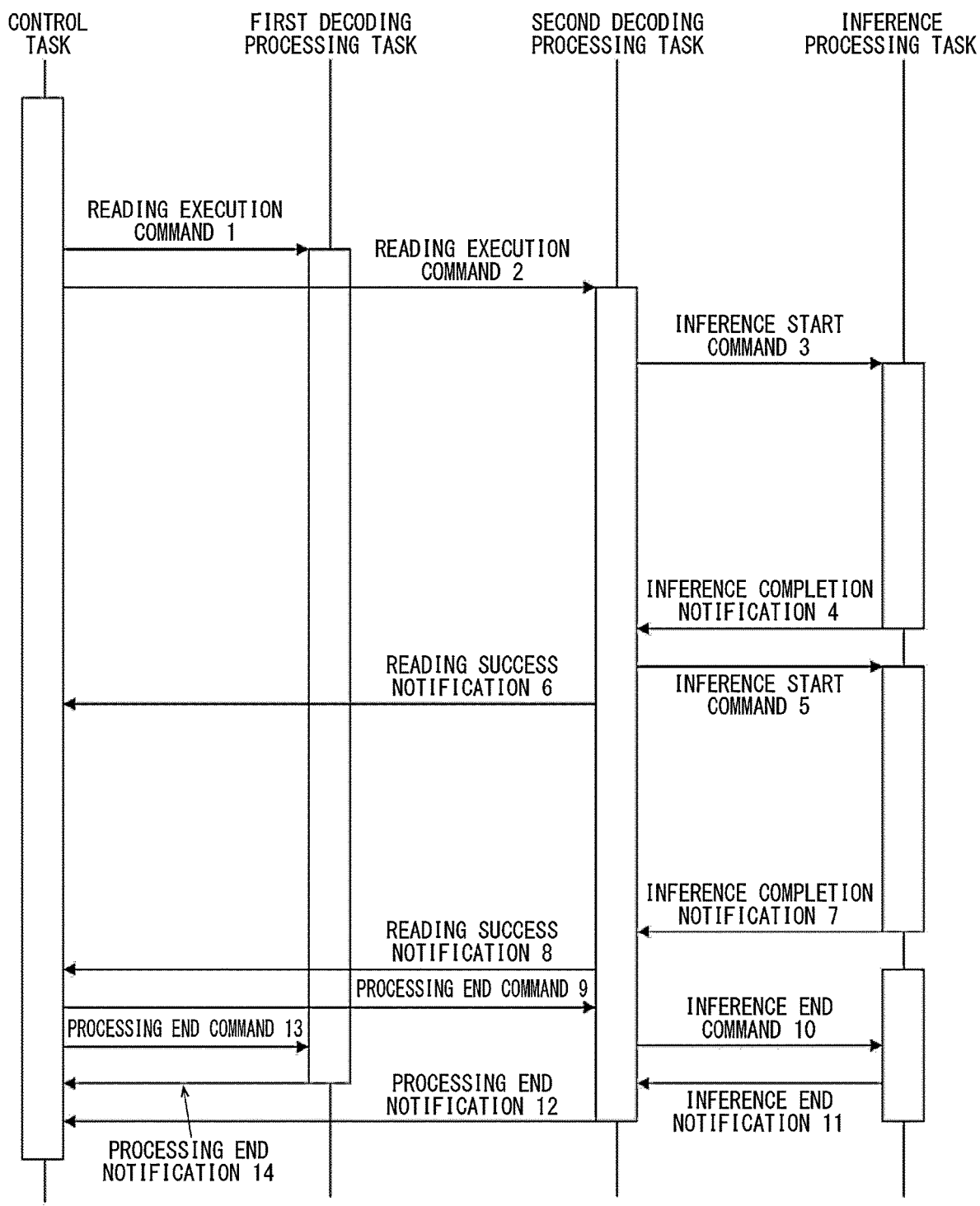
FIG. 25 is a task sequence diagram in a case where reading has succeeded twice in the second decoding processing.

FIG. 25 is a task sequence diagram in a case where reading has succeeded twice in the second decoding processing. The control task issues Reading Execution Command 1 to the first decoding processing task, and issues Reading Execution Command 2 to the second decoding processing task. The second decoding processing task issues Inference Start Command 3 to the inference processing task. When the inference processing is completed, the inference processing task issues Inference Completion Notification 4 to the second decoding processing task. Thereafter, the second decoding processing task issues the next Inference Start Command 5 to the inference processing task. The second decoding processing task receives Inference Completion Notification 4 and starts the second decoding processing. The reading succeeds in the second decoding processing, and the second decoding processing task issues Reading Success Notification 6 to the control task.

Thereafter, the inference processing for the second time is completed in the inference processing task, and Second Inference Completion Notification 7 is issued to the second decoding processing task. The second decoding processing task receives Second Inference Completion Notification 7 and starts the decoding processing for the second time. The reading also succeeds in the second decoding processing for the second time, and the second decoding processing task issues Reading Success Notification 8 to the control task. Since the reading has not succeeded in the first decoding processing task during this time, Reading Success notification is not issued from the first decoding processing task.

The control task issues Processing End Command 9 to the second decoding processing task. When the second decoding processing task receives Processing End Command 9, Inference End Command 10 is issued to the inference processing task, and the inference processing task issues Inference End Notification 11 to the second decoding processing task. After receiving Inference End Notification 11, the second decoding processing task issues Processing End Notification 12 to the control task. When the control task issues Processing End Command 13 to the first decoding processing task, the first decoding processing task issues Processing End Notification 14 to the control task. In this example, when the decoding has succeeded in both the second decoding processing executed for the first time and the second decoding processing executed for the second time, the inference processing by the inference processing part 20j can be ended.

(Continuous Capturing by Camera)

In a case where the optical information reading device 1 is used at a site where a plurality of workpieces W continuously flow as illustrated in FIG. 1, codes sequentially pass the front of the camera 5 at certain time intervals. Therefore, the camera 5 needs to continuously capture images at predetermined short intervals to sequentially acquire code images, and the optical information reading device 1 needs to end reading within a predetermined time.

Figure 26:
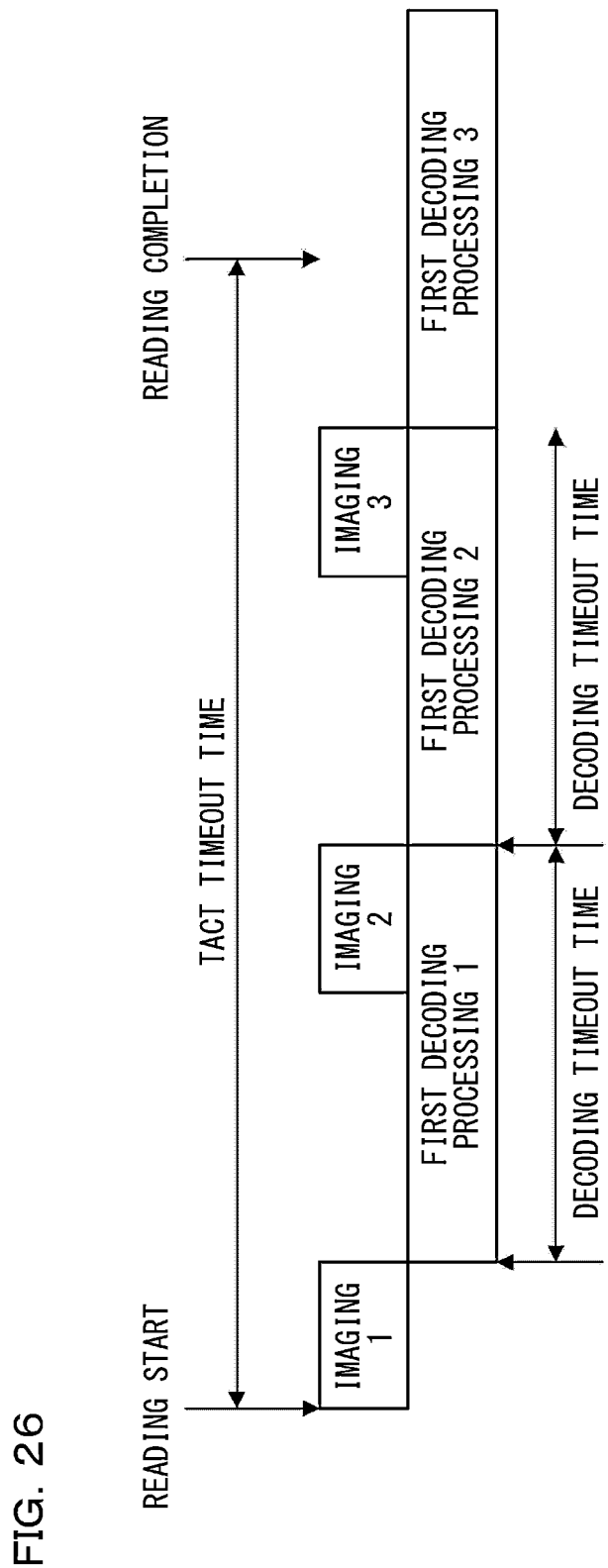
FIG. 26 is a reading sequence diagram during continuous capturing.

FIG. 26 is a reading sequence diagram in a case where capturing and decoding processing are repeated for a certain period of time after receiving a reading start trigger signal. The time for one decoding processing is set in advance, and is referred to as a decoding timeout time. In addition, a total reading limit time is set in advance separately from the decoding timeout time, and is referred to as a tact timeout time. In addition, there are three timings of a timing at which the decoding processing has succeeded (Timing 1), a time point at which the decoding timeout time has elapsed since the start of reading (Timing 2), and a time point at which the tact timeout time has elapsed since the start of reading (Timing 3) as a timing at which it is desired to forcibly end the decoding processing. For example, when a response speed to a forced end command of read processing is set to about 10 msec, there is a case where it is also desirable that the decoding processing be enabled to make an end response within a similar amount of time.

On the other hand, the inference processing is executed by the dedicated core 25 and requires a processing time of about several tens msec to several hundreds msec, so that there is a case where it is preferable to provide one or both of a function of ending the inference processing in the middle and a function of starting new inference processing in the middle of the inference processing.

Figure 27:
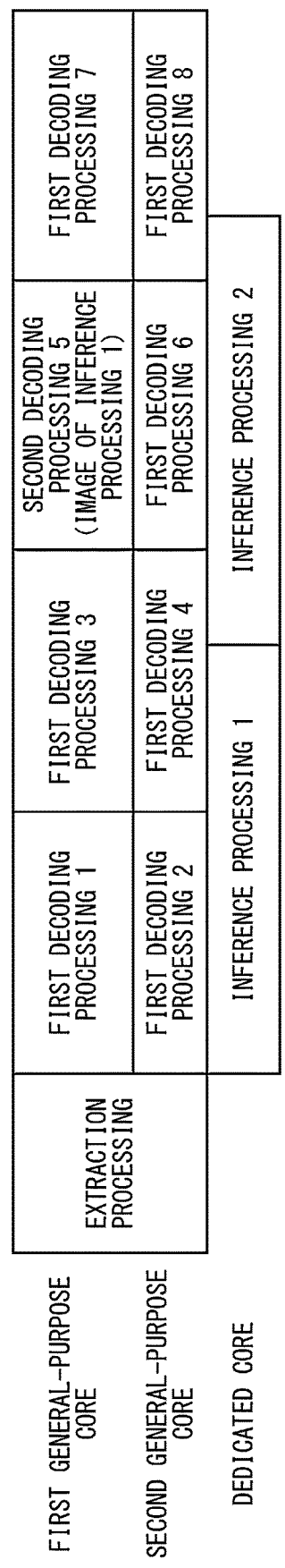
FIG. 27 is a decoding processing sequence diagram during the continuous capturing.

FIG. 27 is a decoding processing sequence diagram during the continuous capturing. This decoding processing sequence diagram is similar to the sequence diagram illustrated in FIG. 19, but illustrates an example in which any of the above timings 1 to 3 arrives in the middle of inference processing and the inference processing is interrupted.

Functions and Effects of Embodiment

As described above, the ideal image is generated by the inference processing when the code image generated by the camera 5 is input to the neural network during the operation of the optical information reading device 1 or 1A according to this embodiment. Since the decoding processing is performed on the ideal image obtained after the inference processing, the reading accuracy is improved.

In addition, when the code image is appropriate for code reading, the decoding processing is performed on the code image generated by the camera 5 without performing the inference processing. Since the inference processing and the decoding processing of performing decoding without performing the inference processing are executed in parallel, it is possible to execute the decoding processing on another code image, which does not require the inference processing, during the execution of the inference processing on a code image, which requires the inference processing, or to execute the inference processing on another code image, which requires the inference processing, during the execution of the decoding processing on a code image which does not require the inference processing. As a result, the processing time is shortened.

OTHER EMBODIMENTS

Figure 28:
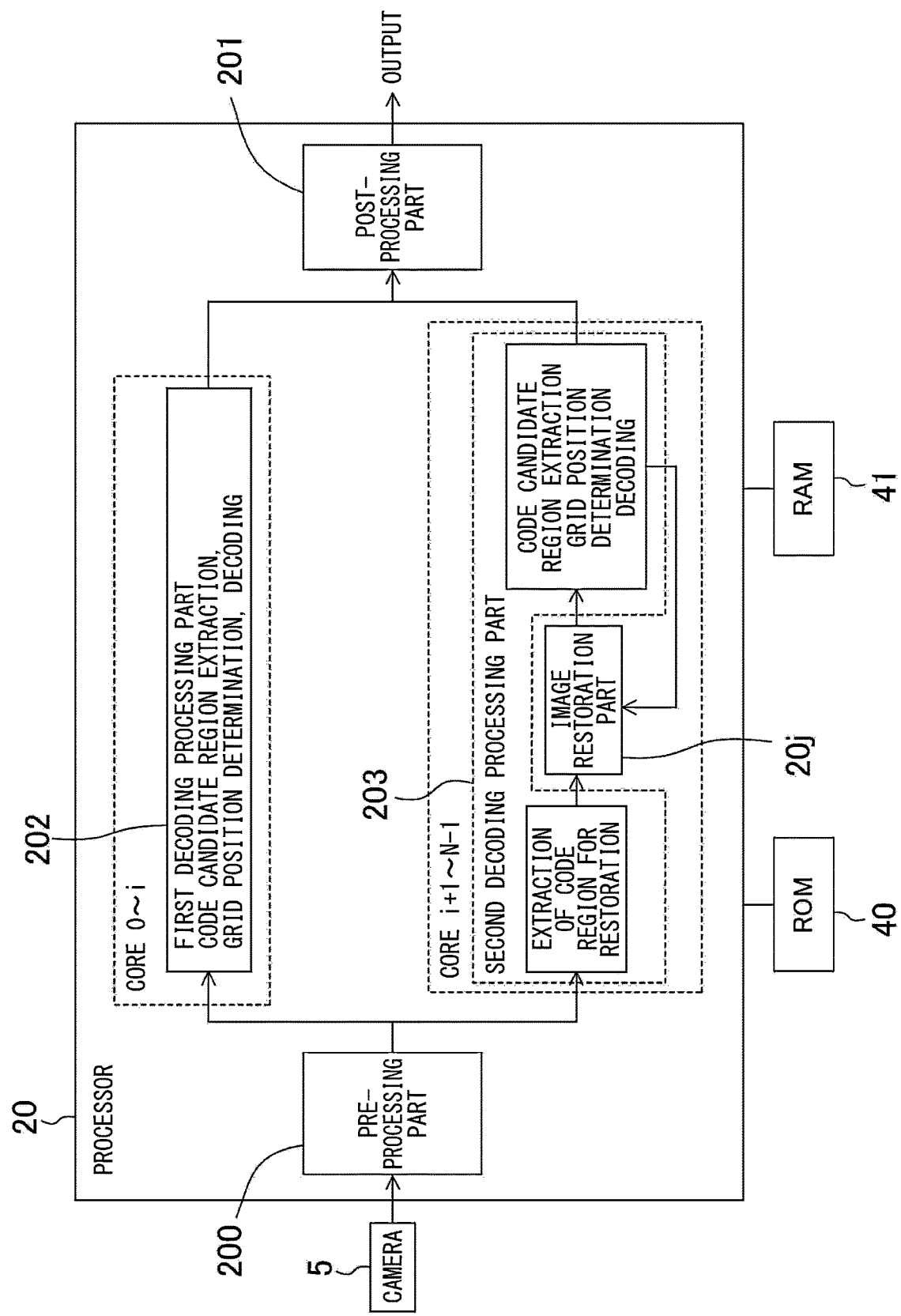
FIG. 28 is a diagram illustrating an example of a decoding processing procedure according to another embodiment.

FIG. 28 is a diagram illustrating an example of a procedure of processing during the operation of the optical information reading device 1 according to another embodiment. In addition to the inference processing part (image restoration part) 20j, a pre-processing part 200, a post-processing part 201, a first decoding processing part 202, and a second decoding processing part 203 are configured by the processor 20 in this embodiment. The pre-processing part 200 is a portion that executes a noise removal filter, a contrast correction filter, an averaging filter, and the like on a code image generated by the camera 5, which is similar to the filter processing part 20c.

The first decoding processing part 202 is a portion that executes decoding processing on the code image generated by the camera 5, and the decoding processing executed by the first decoding processing part 202 is also referred to as first decoding processing. In a case where the processor 20 has a plurality of cores (N cores), the first decoding processing part 202 is constituted by Core 0 to Core i. The first decoding processing part 202 may include one core.

In addition, the second decoding processing part 203 is a portion that executes decoding processing on a restored image generated by the inference processing part 20j, and the decoding processing executed by the second decoding processing part 203 is also referred to as second decoding processing. In the case where the processor 20 has N cores, the second decoding processing part 203 is constituted by Core i+1 to Core N−1. The second decoding processing part 203 may include one core.

Figure 29:
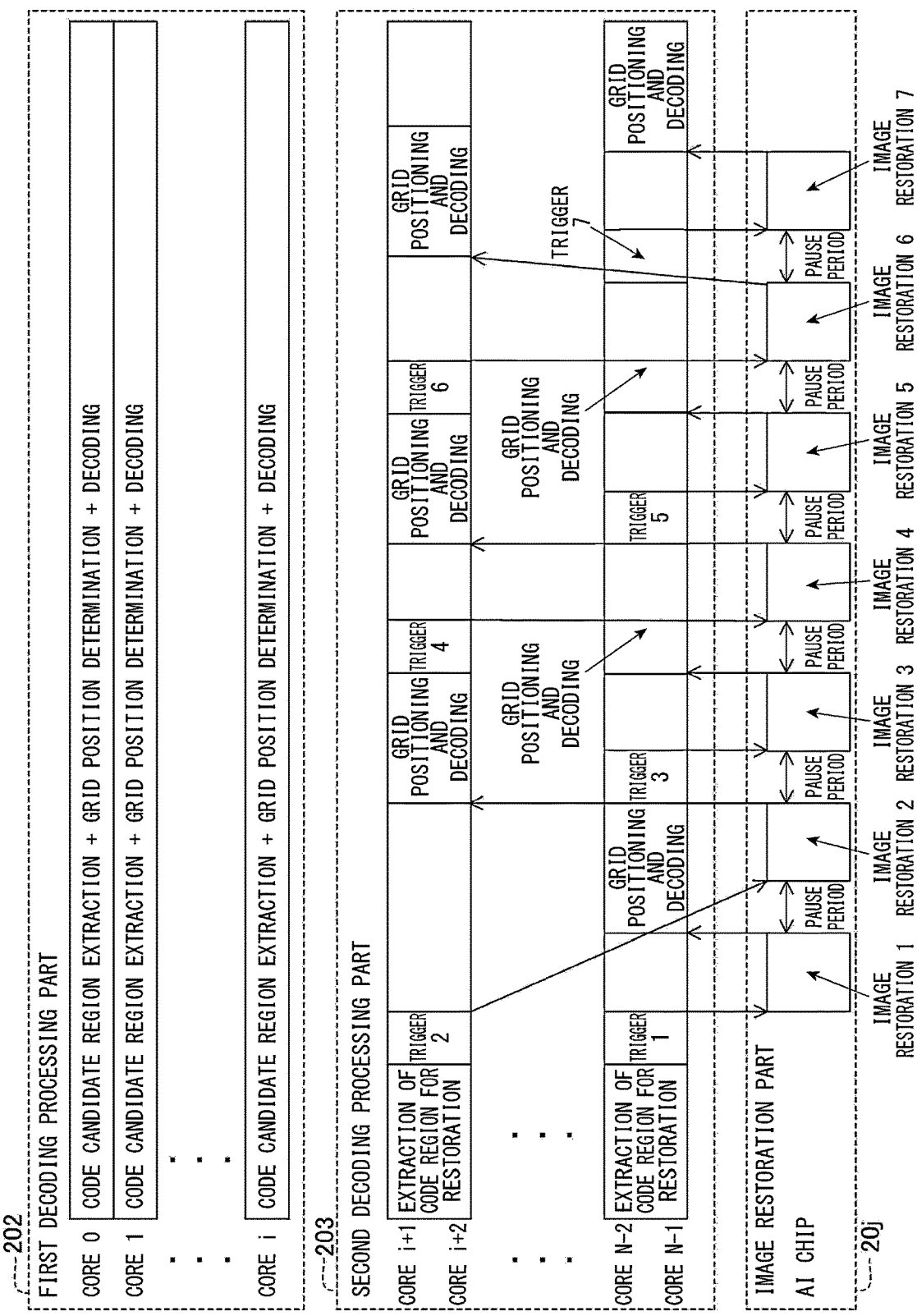
FIG. 29 is a time chart of decoding processing performed by a first decoding processing part and a second decoding processing part.

As also illustrated in FIG. 29, in the case where the first decoding processing part 202 is constituted by Core 0 to Core i, each of Core 0 to Core i executes positioning processing of a contour of a code and modules forming the code after extracting a code candidate region in which the code is highly likely to be present from the code image generated by the camera 5, and then, discriminates whether each of the modules forming the code is white or black, and executes decoding processing. A result of the processing is output to the post-processing part 201.

On the other hand, in the case where the second decoding processing part 203 is constituted by Core i+1 to Core N−1 as illustrated in FIG. 29, each of Core i+1 to Core N−1 extracts a code candidate region in which a code is highly likely to be present from the code image as a code region for restoration, and sends a trigger signal to the inference processing part 20j so as to execute inference processing. Although FIG. 29 illustrates that one task is executed by two cores, but one task may be executed by one or more arbitrary cores.

Specifically, when Core N−2 and Core N−1 forming the second decoding processing part 203 extract a code candidate region for restoration, a trigger signal (Trigger 1) is output to the inference processing part 20j to cause the inference processing part 20j to execute inference processing. When receiving the trigger signal (Trigger 1) sent from Core N−2 and Core N−1, the inference processing part 20j inputs a partial image corresponding to the code candidate region for restoration extracted by Core N−2 and Core N−1 to the neural network, and executes the inference processing of generating a restored image in which the partial image has been restored (Image Restoration 1). The restored image generated in Image Restoration 1 is sent to Core N−2 and Core N−1. Core N−2 and Core N−1 determine a grid position indicating each cell position of the code based on the restored image generated in Image Restoration 1, and execute decoding processing of the restored image based on the determined grid position.

On the other hand, when Core i+1 and Core i+2 forming the second decoding processing part 203 extract a code candidate region for restoration, a trigger signal (Trigger 2) is output to the inference processing part 20j to cause the inference processing part 20j to execute inference processing. When receiving the trigger signal (Trigger 2) sent from Core i+1 and Core i+2, the inference processing part 20j inputs a partial image corresponding to the code candidate region for restoration extracted by Core i+1 and Core i+2 to the neural network, and executes the inference processing of generating a restored image in which the partial image has been restored (Image Restoration 2). The restored image generated in Image Restoration 2 is sent to Core i+1 and Core i+2. Core i+1 and Core i+2 determine a grid position indicating each cell position of the code based on the restored image generated in Image Restoration 2, and execute decoding processing of the restored image based on the determined grid position.

Hereinafter, similarly, Image Restoration 3 is executed by a trigger signal (Trigger 3) sent from Core N−2 and Core N−1, Image Restoration 4 is executed by a trigger signal (Trigger 4) sent from Core i+1 and Core i+2, Image Restoration 5 is executed by a trigger signal (Trigger 5) sent from Core N−2 and Core N−1, Image Restoration 6 is executed by a trigger signal (Trigger 6) sent from Core i+1 and Core i+2, and Image Restoration 7 is executed by a trigger signal (Trigger 7) sent from Core N−2 and Core N−1.

As illustrated in this time chart, the inference processing by the inference processing part 20j and the first decoding processing by the first decoding processing part 202 are executed in parallel. For example, the inference processing by the inference processing part 20j is executed once or a plurality of times while the first decoding processing part 202 continuously performs the code region extraction, the grid position determination, and the decoding processing. In addition, the second decoding processing part 203 executes the extraction of the code region for restoration, the output of the trigger signal, the grid position determination, and the second decoding processing while the first decoding processing part 202 continuously performs the code region extraction, the grid position determination, and the decoding processing. Since the inference processing part 20j only needs to be specialized in the restoration of the partial image corresponding to the code candidate region for restoration in this manner, the speed of the inference processing can be increased.

At least a part of a period during which the second decoding processing part executes the second decoding processing has a pause period during which the inference processing by the inference processing part 20j is not executed. That is, the second decoding processing part 203 starts the second decoding processing after the end of Image Restoration 1 of the inference processing part 20j as illustrated in FIG. 29, but a predetermined period is provided until the inference processing part 20j starts the next Image Restoration 2, and this predetermined period is the pause period during which the inference processing part 20j does not perform the image restoration. This pause period is a period during which the inference processing part 20j does not perform the inference processing, and it is possible to reduce a load on the inference processing part 20j and suppress heat generation of the AI chip 23 by providing the pause period. Note that a processing time of the grid position determination may be long or short depending on a restored image to be processed. Although FIG. 29 illustrates an example in which the processing of each core is alternately executed, the processing of each core does not need to be alternately executed depending on the processing time of the grid position determination. That is, the trigger issuance and the grid position determination may be executed in order from a core that is available for processing.

As described above, the setting part 20e is configured such that the user can select one of "application of the image restoration filter" and "non-application of the image restoration filter". Applying the image restoration filter means performing the image restoration. In addition, not applying the image restoration filter means not performing the image restoration. Thus, the setting part 20e also corresponds to a portion that sets whether the second decoding processing part 203 executes the second decoding processing. Since this setting is executed by the user, the setting part 20e is configured to be capable of receiving the user's operation. A setting form is not limited to the application and non-application of the image restoration filter, and for example, setting forms such as application and non-application of inference processing (restoration processing) and application and non-application of processing by AI may be used. Examples of the user's operation include an operation on a button or the like displayed on a user interface screen.

The optical information reading device 1 is operated after performing tuning processing of determining, in advance, the imaging conditions such as the exposure time and the gain, and settings such as the image processing filter. For example, in a case where a workpiece W is a label, a code is clearly printed, and thus, a high reading rate can be realized if an appropriate condition is set by the tuning processing. However, regarding a workpiece W made of metal, resin, or the like, there may be a case where reading becomes difficult due to a change in a code image due to weak ambient light or the like, or it is difficult to perform reading with ultra-low contrast due to an optical design and an algorithm design in the first place even if an optimum condition during the tuning processing is set.

When an image restoration algorithm executed by the inference processing part 20j of this example is performed in parallel with the case of performing the decoding processing without performing the image restoration, it is possible to improve the reading performance regarding the workpiece W made of metal, resin, or the like while maintaining the conventional reading performance and enhance the reading stability. In addition, the image restoration algorithm can be applied to a workpiece W that is not readable by the conventional optical design and algorithm.

As a specific example, in a step of reading a code printed on a seal attached to a box in a certain factory, the stable operation is possible even with conventional reading performance in a case where there is no restriction on an installation condition of the optical information reading device 1 so that the optimum installation is possible. Thus, it is possible to prioritize tact without applying the image restoration filter.

In addition, there is a case where there is a step of reading a code clearly printed on metal in a certain factory, and the optimum condition is determined in tuning processing at the time of setting the reading, but the reading becomes unstable due to a scratch on a metal surface, a variation in reading position and angle, a change in brightness of a surrounding environment, and the like during the actual operation. In such a case, when the image restoration filter is applied to improve the image quality, the resistance against the above variations in the conditions increases so that the reading performance is improved.

In addition, reading with the conventional algorithm is impossible for some workpieces, but there is a case where reading becomes possible by applying the image restoration filter in such a case. For example, even in a case where a code is significantly scratched or contrast is not clear, it is possible to restore the contrast or the scratch by applying the image restoration filter and perform reading.

Since the second decoding processing executed in the case where the image restoration filter is applied executes the decoding processing on a restored image, the time required for the processing is often longer than that of the first decoding processing in which the decoding processing of a normal code image is executed. Therefore, the first decoding processing part 202 can execute the first decoding processing in the time shorter than the time taken for the second decoding processing by the second decoding processing part 203. This is used as the premise in this example, and the setting part 20e can change a decoding timeout time which is a time limit of decoding processing.

Specifically, the setting part 20e is configured to be capable of setting a decoding timeout time longer than the time required for executing the second decoding processing when it is set to execute the second decoding processing, and is configured to be capable of setting a decoding timeout time shorter than the time required for executing the second decoding processing when it is set not to execute the second decoding processing. As a result, when the second decoding processing is executed during the operation, it is possible to set the decoding timeout time longer than the time required for executing the general second decoding processing, and thus, the decoding processing for the restored image can be reliably executed. On the other hand, when it is set not to execute the second decoding processing, in general, only the first decoding processing, capable of performing the decoding processing in a shorter time than the second decoding processing, is executed, and thus, the short decoding timeout time corresponding to the first decoding processing can be set. Since the decoding timeout time is changed in this manner, it is possible to set the decoding timeout time corresponding to each of the first decoding processing and the second decoding processing.

Figure 30:
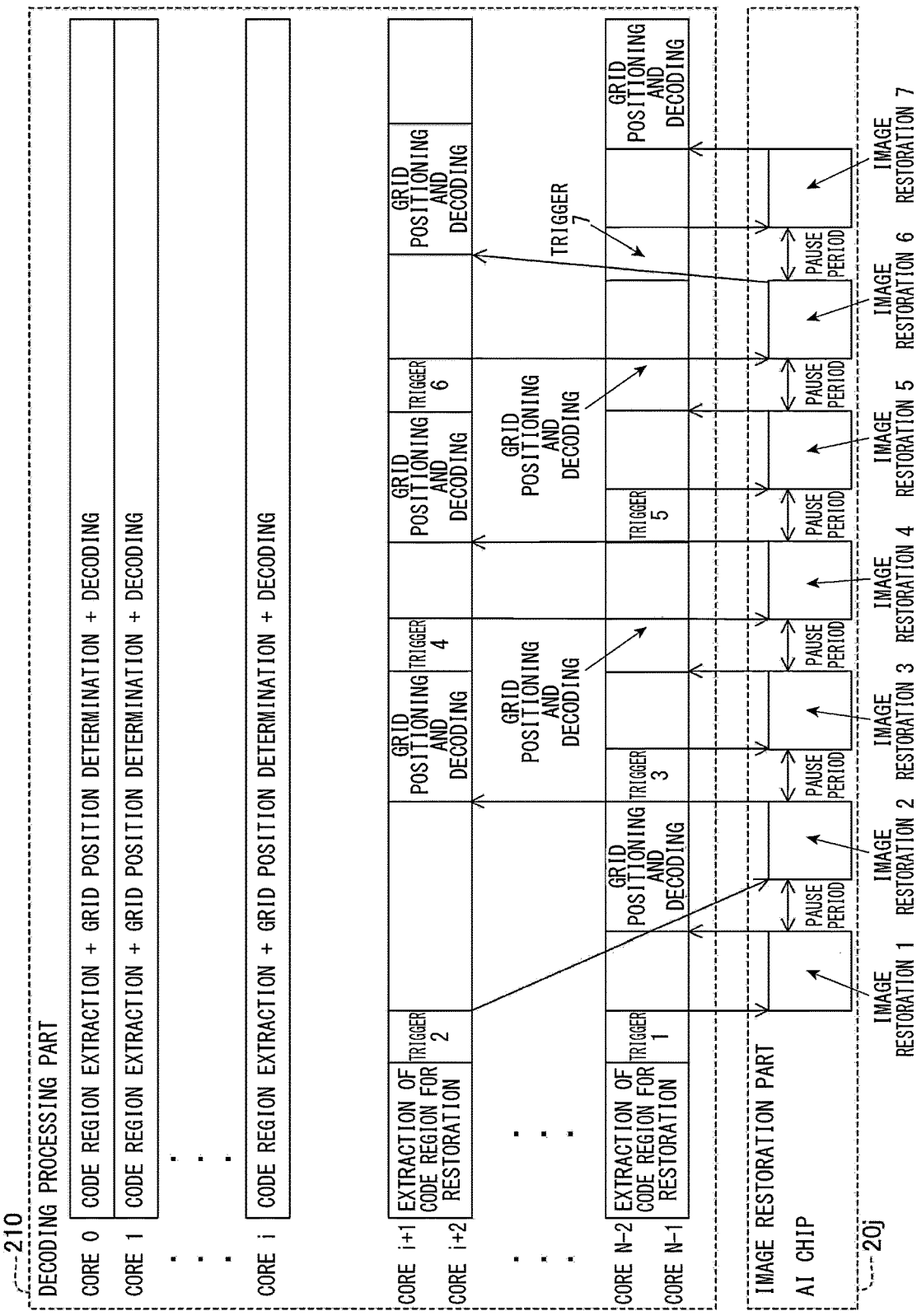
FIG. 30 is a time chart of decoding processing performed by a decoding processing part.

Although the first decoding processing part 202 and the second decoding processing part 203 are separated in FIG. 29, the first decoding processing part 202 and the second decoding processing part 203 may be collectively configured as a decoding processing part 210 as illustrated in FIG. 30. The decoding processing part 210 executes the second decoding processing on a restored image in parallel with the first decoding processing on a code image generated by the camera 5. In this manner, portions for executing the decoding processing can be arbitrarily divided on hardware or can also be integrated. Hereinafter, an example in which the portions for executing the decoding processing are integrated into one portion will be described, but the present aspect is not limited thereto, and can be similarly applied to a case where the portions are divided into a plurality of portions.

The decoding processing part 210 is configured to allocate processing resources to be used for the second decoding processing to the first decoding processing in the case where it is set by the setting part 20*e* not to execute the second decoding processing, and to speed up the first decoding processing as compared with the case where it is set to execute the second decoding processing. The processing resources are, for example, a use area of a memory, a core forming a multi-core CPU, and the like. Specifically, in the case where it is set not to execute the second decoding processing, the number of cores responsible for the first decoding processing is increased as compared with the case where it is set to execute the second decoding processing. In addition, in a case where it is set that the second decoding processing is not executed, the area of the memory used in the first decoding processing is enlarged as compared with a case where it is set that the second decoding processing is executed. Increasing the number of cores and expanding the area of the memory may be used in combination or only any one thereof may be performed. As a result, the performance of the multi-core CPU can be maximized to speed up the first decoding processing.

The decoding processing part 210 extracts a code candidate region in which a code is highly likely to be present from the code image prior to image restoration. That is, if an image to be input to a neural network is large at the time of performing the image restoration using the neural network, there is a problem that the calculation time becomes long. In addition, the number of decoding attempts is also desirably reduced as much as possible from the viewpoint of speeding up the processing. On the other hand, in this example, a search technique based on a heat map, instead of line search, is adopted in order to reliably extract the code candidate region even if it takes some time. For example, the decoding processing part 210 quantifies a characteristic amount of the code, generates a heat map in which the magnitude of the characteristic amount is assigned to each pixel value, and extracts the code candidate region in which the code is highly likely to be present on the heat map. As a specific example, there is a method of acquiring a characteristic portion (for example, a finder pattern or the like) of a two-dimensional code in a region that is relatively hot (has a large characteristic amount) in a heat map. In a case where a plurality of characteristic portions are acquired, the characteristic portions can be extracted according to priorities and stored in the RAM 41, the storage part 30, or the like.

After the decoding processing part 210 extracts the code candidate region, a partial image corresponding to the extracted code candidate region is output to the inference processing part 20*j*. The inference processing part 20*j* inputs the partial image corresponding to the code candidate region extracted by the decoding processing part 210 to the neural network and executes inference processing of generating a restored image obtained by restoring the partial image. As a result, the calculation time can be shortened.

Further, the decoding processing part 210 may be configured to extract a code candidate region having a size capable of including a code to be read set by the tuning processing described above and having a high possibility that the code is present in a code image, input the extracted image to the neural network after reducing or enlarging the extracted image to a predetermined size, and decode a restored image restored by the neural network. Since the extracted image is enlarged or reduced to the image having the predetermined size and then input to the neural network, the PPC of the code image input to the neural network can be kept within a predetermined range, and the image restoration effect by the neural network can be stably achieved. In addition, it is conceivable that there are various sizes of codes to be read, but the size of the code to be finally input to the neural network can be fixed, and thus, the balance between high-speed processing and the ease of decoding can be maintained at a certain level or more.

Figure 31:
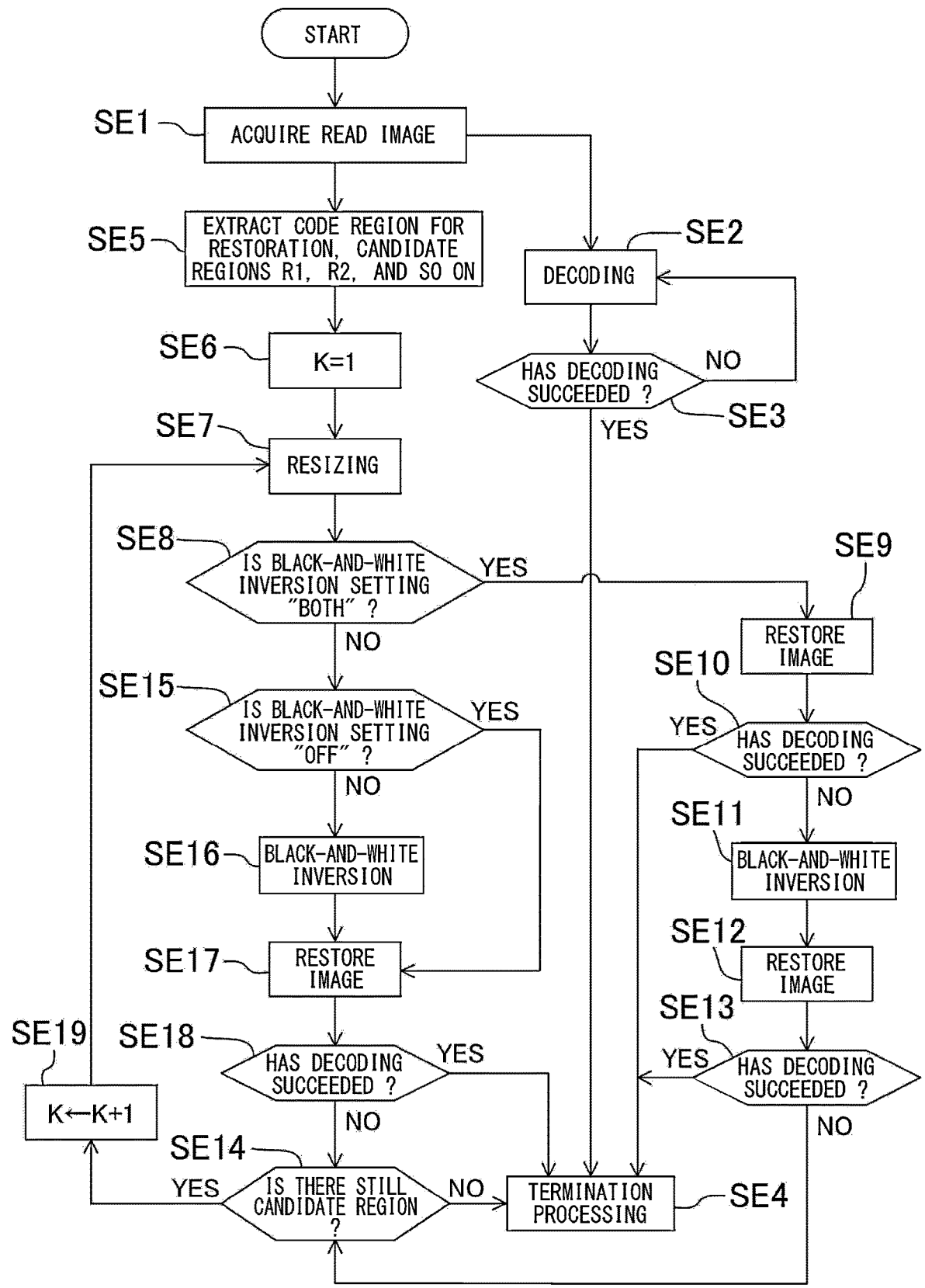
FIG. 31 is a flowchart illustrating examples of the first decoding processing and the second decoding processing.

Hereinafter, a flowchart of the first decoding processing and the second decoding processing will be described in detail with reference to FIG. 31. In Step SE1 after the start, the processor 20 causes the camera 5 to generate a code image and acquires the code image. The code image acquired in Step SE1 is input to the decoding processing part 210. In Step SE2, the first decoding processing is executed without performing image restoration on the code image acquired in Step SE1. When the first decoding processing has succeeded, the processing proceeds to Step SE4 to execute termination processing, that is, a process of outputting a result of the decoding. If the first decoding processing fails in Step SE2, the processing returns to Step SE2 to execute the first decoding processing again. When a predetermined decoding timeout time has elapsed, the first decoding processing for the code image is stopped.

Figure 32:
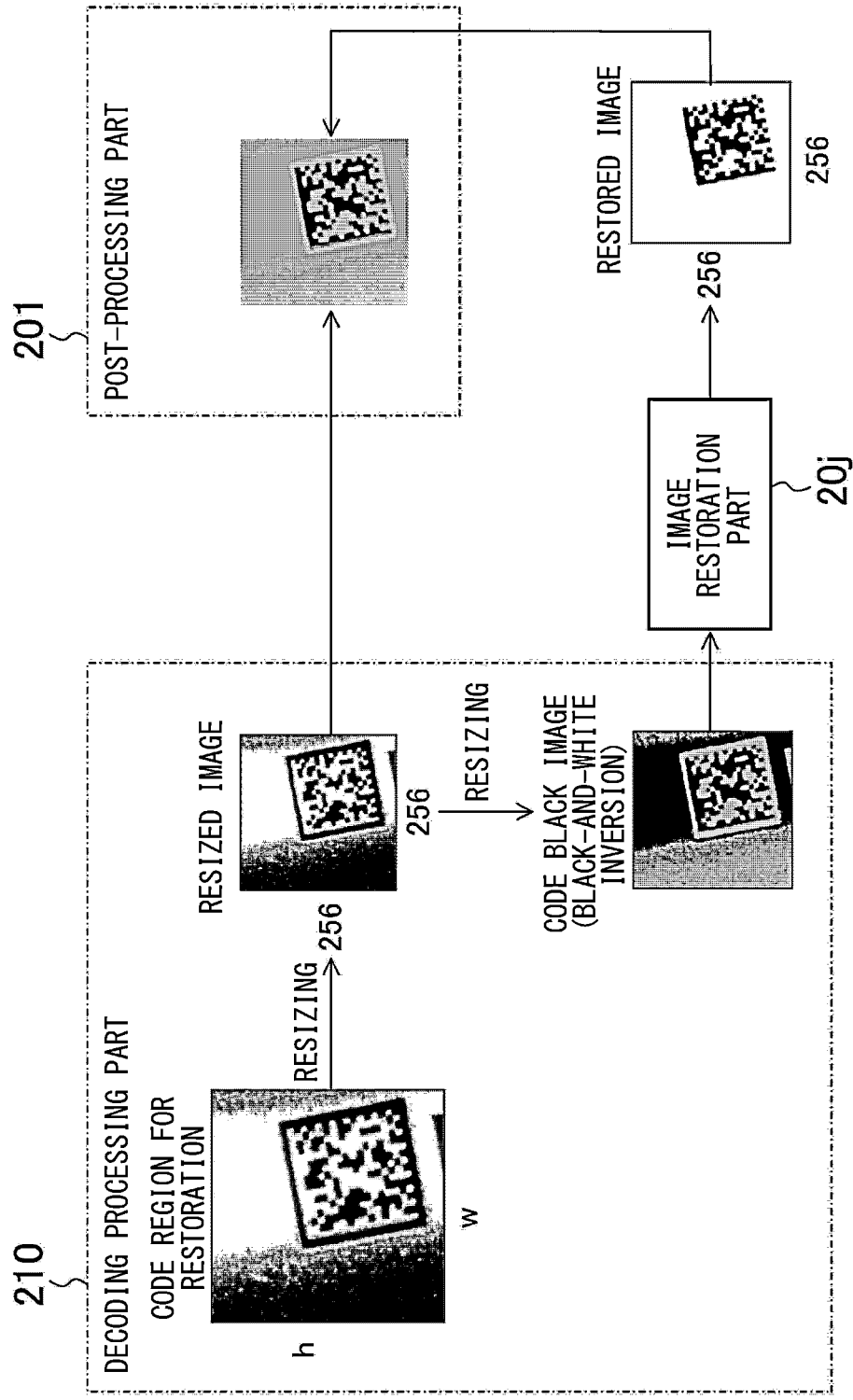
FIG. 32 is a view illustrating an image example of each processing.

In a route from Step SE1 to Step SE5, the decoding processing part 210 extracts a code region for restoration from the code image. Specifically, a code candidate region having a size that can include a code to be read set by the tuning processing and having a high possibility that the code is present in the code image is extracted. At this time, when a plurality of code regions for restoration are extracted, the code regions for restoration are temporarily stored as candidate regions R1, R2, and so on. An example of the extracted code region for restoration is illustrated in FIG. 32. Thereafter, the processing proceeds to Step SE6, and a value of k is set to one.

In Step SE7, resizing processing is executed on a partial image corresponding to a candidate region Rk. The resizing processing is processing of reducing or enlarging the partial image corresponding to the code region for restoration extracted in Step SE5 so as to have a predetermined size. Through this resizing processing, a size of an image to be input to the neural network, which will be described later, can be set to the predetermined size in advance. In the example illustrated in FIG. 32, a case where the size of the partial image input to the neural network is 256 pixels×256 pixels is illustrated, but the size of the partial image is not limited thereto, and can be resized to an arbitrary size in consideration of the processing speed and the like.

In Step SE8, it is determined whether the black-and-white inversion setting is "both". That is, the image restoration is to perform mapping mathematically, and there is a case where it is highly difficult to realize the mapping from white to black, from black to white, from black to black, and from white to white by a single neural network. Therefore, black-and-white inversion processing is executed based on a property so as to obtain an image in which black is printed on a white background. An image in which white is printed on a black background may also be adopted depending on a way of learning of the neural network. An example of the black-and-white inversion processing is illustrated in FIG. 32. The black-and-white inversion processing will be described later in detail.

When YES is determined in Step SE8 and the black-and-white inversion setting is "both", the processing proceeds to Step SE9, and the resized image is input to the inference processing part 20*j* to execute the image restoration. Thereafter, the processing proceeds to Step SE10, and the decoding processing part 210 executes the second decoding processing on the restored image. When the second decoding processing succeeds in Step SE10, the processing proceeds to Step SE4 to execute the termination processing. When the second decoding processing fails in Step SE10, the processing proceeds to Step SE11 to perform the black-and-white inversion processing on the resized image. Thereafter, the image obtained after the black-and-white inversion processing is input to the inference processing part 20*j* in Step SE11 to execute the image restoration (see FIG. 32). Next, the processing proceeds to Step SE13, and the decoding processing part 210 executes the second decoding processing on the restored image. When the second decoding processing succeeds in Step SE13, the processing proceeds to Step SE4 to execute the termination processing. When the second decoding processing fails in Step SE13, the processing proceeds to Step SE14. In Step SE14, it is determined whether there is still a candidate region extracted in Step SE5, and the processing proceeds to Step SE4 to execute the termination processing when there is no candidate region.

On the other hand, when NO is determined in Step SE8 and the black-and-white inversion setting is not "both", the processing proceeds to Step SE15 to determine whether the black-and-white inversion setting is "OFF". When NO is determined in Step SE15 and the black-and-white inversion setting is not "OFF", the processing proceeds to Step SE16 to perform the black-and-white inversion processing on the resized image. Thereafter, the image obtained after the black-and-white inversion processing is input to the inference processing part 20*j* in Step SE17 to execute the image restoration. Next, the processing proceeds to Step SE18, and the decoding processing part 210 executes the second decoding processing on the restored image. When the second decoding processing succeeds in Step SE18, the processing proceeds to Step SE4 to execute the termination processing. When the second decoding processing fails in Step SE18, the processing proceeds to Step SE14. It is determined whether there is still a candidate region in Step SE14, and the processing proceeds to Step SE4 to execute the termination processing when there is no candidate region.

When it is determined in Step SE14 that there is still a candidate region, the processing proceeds to Step SE19, one is added to the value of k, and the processing proceeds to Step SE7. In Step SE7, since the value of k is increased by one from the previous flow, the resizing processing is similarly executed on a partial image corresponding to the next candidate region Rk. Step SE8 and the subsequent steps are similarly applied as described above. That is, when the decoding has succeeded in one of the first decoding processing and the second decoding processing, the decoding result is output at the time of the success so as not to perform decoding processing on the other candidate regions, a code image obtained by capturing the next workpiece W is acquired, and the similar processing is executed.

The post-processing part 201 illustrated in FIG. 32 executes a process of combining a partial image that has not been subjected to the image restoration after the resizing processing and a partial image that has been subjected to the image restoration by the inference processing part 20*j* after the resizing processing. That is, in the image restoration using the neural network, a code before restoration can be visually confirmed by a human, but a case where the image restoration is poorly performed and a case where a cell becomes rounded when the image restoration is performed may occur. Regarding such cases, if the partial image that has not been subjected to the image restoration and the partial image that has been subjected to the image restoration are superimposed at an appropriate ratio, the subsequent decoding processing is sometimes facilitated. The ratio at which the partial image that has not been subjected to the image restoration and the partial image that has been subjected to the image restoration are superimposed may be a predetermined fixed value or may be a value other than the fixed value. For example, the ratio may be determined to be optimized dynamically at the time of reading based on the stability of the restoration by the inference processing part 20*j*, or by preliminary evaluation (tuning). For example, in the preliminary evaluation, the ratio may be adjustable by the user with a scale bar or the like, and adjustment may be performed while presenting a combined image to the user.

(Bank Switching Function)

The present embodiment is configured such that, for example, a parameter set in which parameters forming imaging conditions of the camera 5 and parameters forming processing conditions and the like in the decoding processing part 210 are grouped as a set can be stored in the parameter set storage part 30*c*. The parameter set may be referred to as a bank. A plurality of the banks are provided and respectively store different parameters. For example, the parameter set storage part 30*c* stores a plurality of imaging conditions and code conditions including first imaging condition and code condition and second imaging condition and code condition, set by the tuning execution part 20*d*, as parameter sets different from each other.

The optical information reading device 1 is configured to be capable of performing switching from one parameter set including the first imaging condition and code condition to another parameter set including the second imaging condition and code condition among the plurality of parameter sets stored in the parameter set storage part 35*c* and performing the opposite switching. The switching of the parameter set can be also performed by the processor 20, by the user, or by a switching signal from an external control device such as the PLC 101. In a case where the user switches the parameter set, for example, a parameter set switching part incorporated in a user interface may be operated. When the parameter set switching part is set to "valid", the parameter set of the bank is used during the operation of the optical information reading device 1. When the parameter set switching part is set to "invalid", the parameter set of the bank is not used during the operation of the optical information reading device 1. That is, the parameter set switching part is configured to switch from one parameter set to the other parameter set.

When the decoding processing part 210 of this example fails in the second decoding processing on a restored image while operating using one parameter set, the parameter set is switched to another parameter set, and then, the image restoration and the second decoding processing are executed on a code image captured under another condition. For example, when the decoding processing part 210 detects that the second decoding processing has failed, the image restoration and the second decoding processing are executed after switching to a parameter set other than the current parameter set. When it is detected that the second decoding processing has failed even with this parameter set, the image restoration and the second decoding processing are executed after switching to another parameter set that has not been used so far. There is a case where not only the imaging condition of the camera 5 but also the size of the code to be read is changed when the parameter set is switched. In this case, the size at the time of extracting the code candidate region in which the code is highly likely to be present is also changed. As a result, the reduction ratio or the enlargement ratio of the image input to the neural network also changes, and a result of the image restoration also changes.

(Handling of Black-and-White Inversion)

Figure 33A:
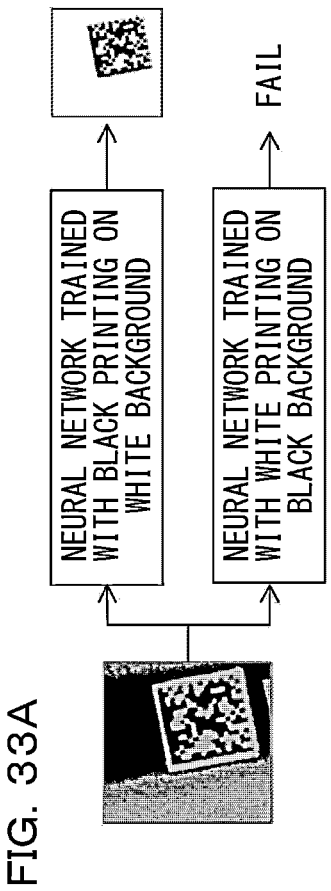
FIGS. 33A to 33C are views for describing a case of handling black-and-white inversion of a code using a plurality of neural networks.
Figure 33B:
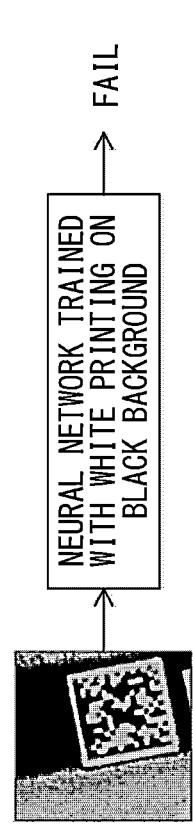
Figure 33C:
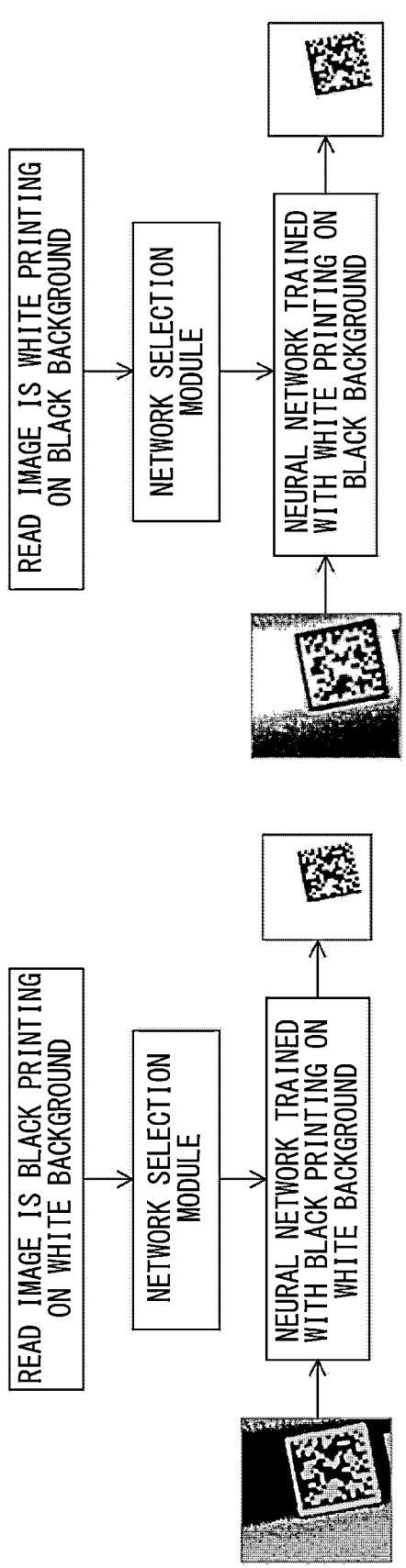

Next, handling of black-and-white inversion of a code will be described with reference to FIGS. 33A to 34C. FIGS. 33A to 33C are views for describing a case of handling black-and-white inversion of a code using two neural networks, that is, a neural network trained with a code printed in black on a white background and a neural network trained with a code printed in white on a black background. FIG. 33A illustrates a scheme in which a code image (leftmost image) to each of the neural network trained with the code printed in black on the white background and the neural network trained with the code printed in white on the black background to output decoding results from the respective neural network, and this scheme is referred to as a parallel execution scheme. Since the code image is an image obtained by capturing a code printed in black on a white background, decoding processing succeeds in a restored image obtained by the neural network trained with the code printed in black on the white background, but decoding processing fails in a restored image obtained by the neural network trained with the code printed in white on the black background.

In FIG. 33B, a code image (leftmost image) is first input only to the neural network trained with the code printed in white on the black background to attempt decoding processing of a restored image. Only when the decoding processing fails, the code image is input to the neural network trained with the code printed in black on the white background to generate a restored image. This scheme is a scheme of using another network after failure.

FIG. 33C is a scheme in which a neural network to which a code image is input is selected based on the user's setting. A case illustrated on the left side is a case where it is set that a code image is an image obtained by capturing a code printed in black on a white background. In this case, a network selection module selects the neural network trained with the code printed in black on the white background. Then, the code image (leftmost image) is input to the neural network trained with the code printed in black on the white background. On the other hand, a case illustrated on the right side is a case where it is set that a code image is an image obtained by capturing a code printed in white on a black background. In this case, the network selection module selects the neural network trained with the code printed in white on the black background. Then, the code image (leftmost image) is input to the neural network trained with the code printed in white on the black background.

Figure 34A:
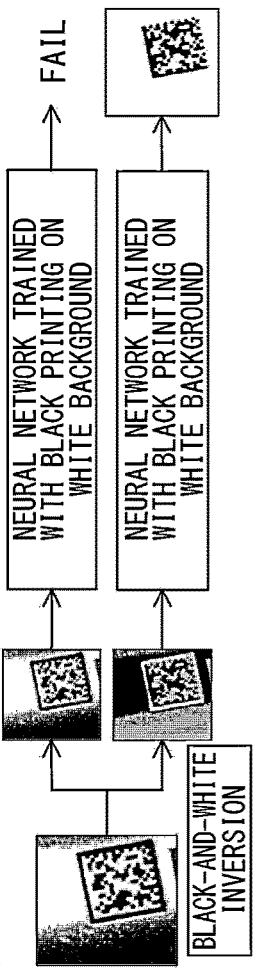
FIGS. 34A to 34C are views for describing a case of handling black-and-white inversion of a code using one neural network.
Figure 34B:
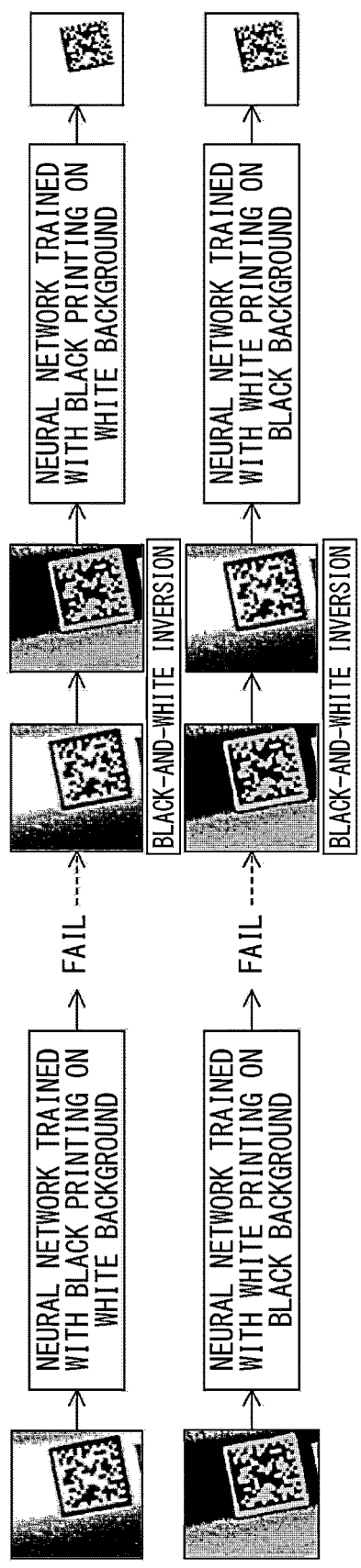
Figure 34C:
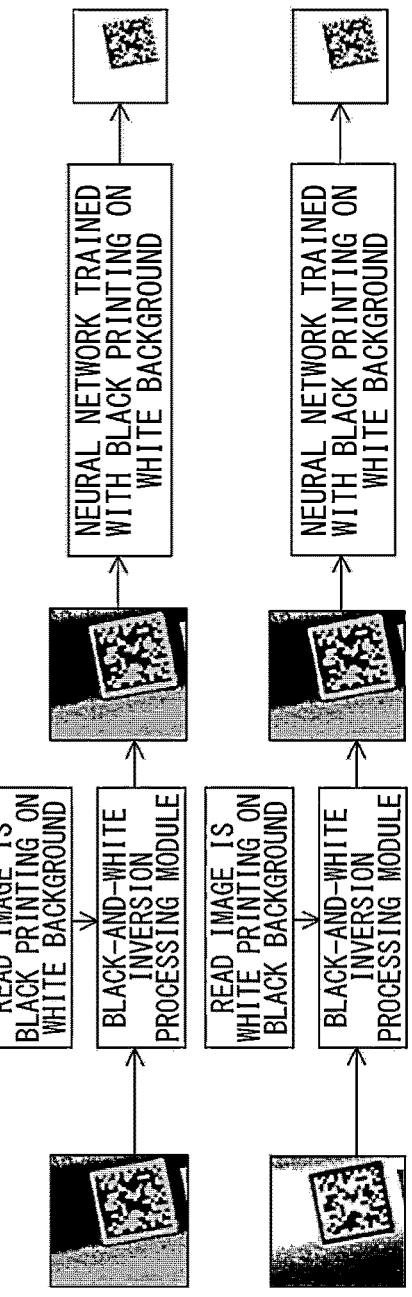

FIGS. 34A to 34C are views for describing a case of handling black-and-white inversion of a code using only one neural network. FIG. 34A illustrates a case where black-and-white inverted image is generated by performing black-and-white inversion processing on a code image (leftmost image). An image that has not been subjected to the black-and-white inversion processing and an image that has been subjected to the black-and-white inversion processing are input to the neural network trained with the code printed in black on the white background. Since the code image is an image obtained by capturing a code printed in white on a black background, decoding processing fails in a restored image by the neural network trained with the code printed in black on the white background, but decoding processing succeeds by using the image obtained after the black-and-white inversion processing.

In an example illustrated on the top of FIG. 34B, a code image (leftmost image) is an image of a code printed in white on a black background, and thus, decoding processing fails when the code image is input to the neural network trained with the code printed in black on the white background. Thereafter, when an image that has been subjected to the black-and-white inversion processing is generated and input to the neural network trained with the code printed in black on the white background, decoding processing succeeds.

In an example illustrated on the bottom of FIG. 34B, a code image (leftmost image) is an image of a code printed in black on a white background, and thus, decoding processing fails when the code image is input to the neural network trained with the code printed in white on the black background. Thereafter, when an image that has been subjected to the black-and-white inversion processing is generated and input to the neural network trained with the code printed in white on the black background, decoding processing succeeds.

FIG. 34C is a scheme in which whether to execute the black-and-white inversion processing is determined based on the user's setting. A case illustrated on the upper side is a case where it is set that a code image is an image obtained by capturing a code printed in black on a white background. In this case, a black-and-white inversion processing module does not execute the black-and-white inversion processing, and the code image is directly input to the neural network trained with the code printed in black on the white background. On the other hand, a case illustrated on the lower side is a case where it is set that a code image is an image obtained by capturing a code printed in white on a black background. In this case, the black-and-white inversion processing module executes the black-and-white inversion processing. Then, an image that has been subjected to the black-and-white inversion processing is input to the neural network trained with the code printed in black on the white background.

(Relationship between Contrast and Matching Level)

The matching level is used, for example, as a score at the time of tuning or is used to manage print quality and reading performance at the time of operation. For example, the matching level is defined by a positive integer value between 0 and 100, and can be designed to have a reading rate of 100% in a case of performing a reading rate test with the matching level of 50 or more. In addition, the matching level of 0 indicates a case where reading is not possible, and the matching level of 1 is the lowest value in a case where reading is possible.

Figure 35:
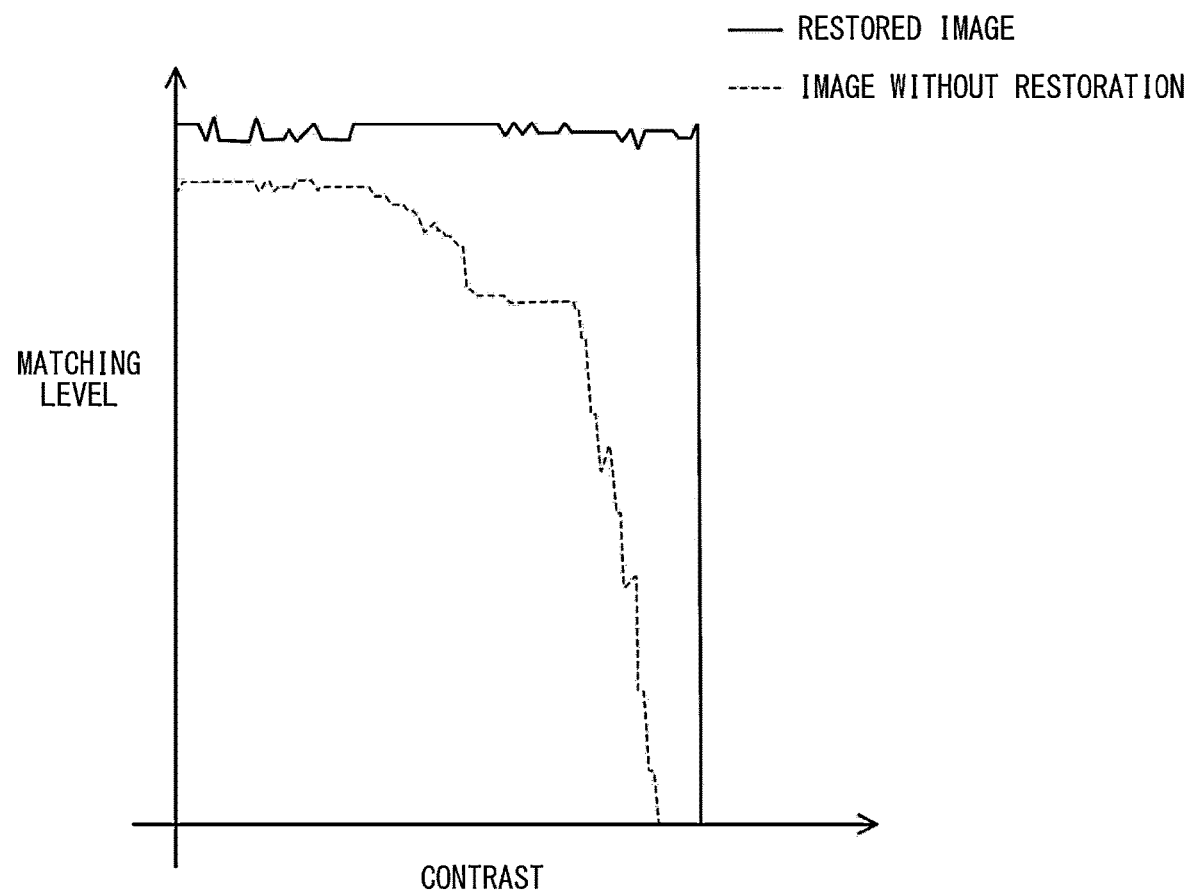
FIG. 35 is a graph illustrating a relationship between contrast and a matching level.

FIG. 35 is a graph illustrating a relationship between contrast and a matching level, in which a solid line indicates a relationship between contrast and a matching level of an image (restored image) that has been subjected to the image restoration by the inference processing part 20j, and a broken line indicates a relationship between contrast and a matching level of an image (code image) that has not been subjected to the image restoration by the inference processing part 20j. As is clear from this graph, the matching level of the restored image is higher than the matching level of the code image as a whole, but the matching level rapidly decreases if the image quality deteriorates by a certain level or more.

(Process of Calculating Matching Level)

Figure 36:
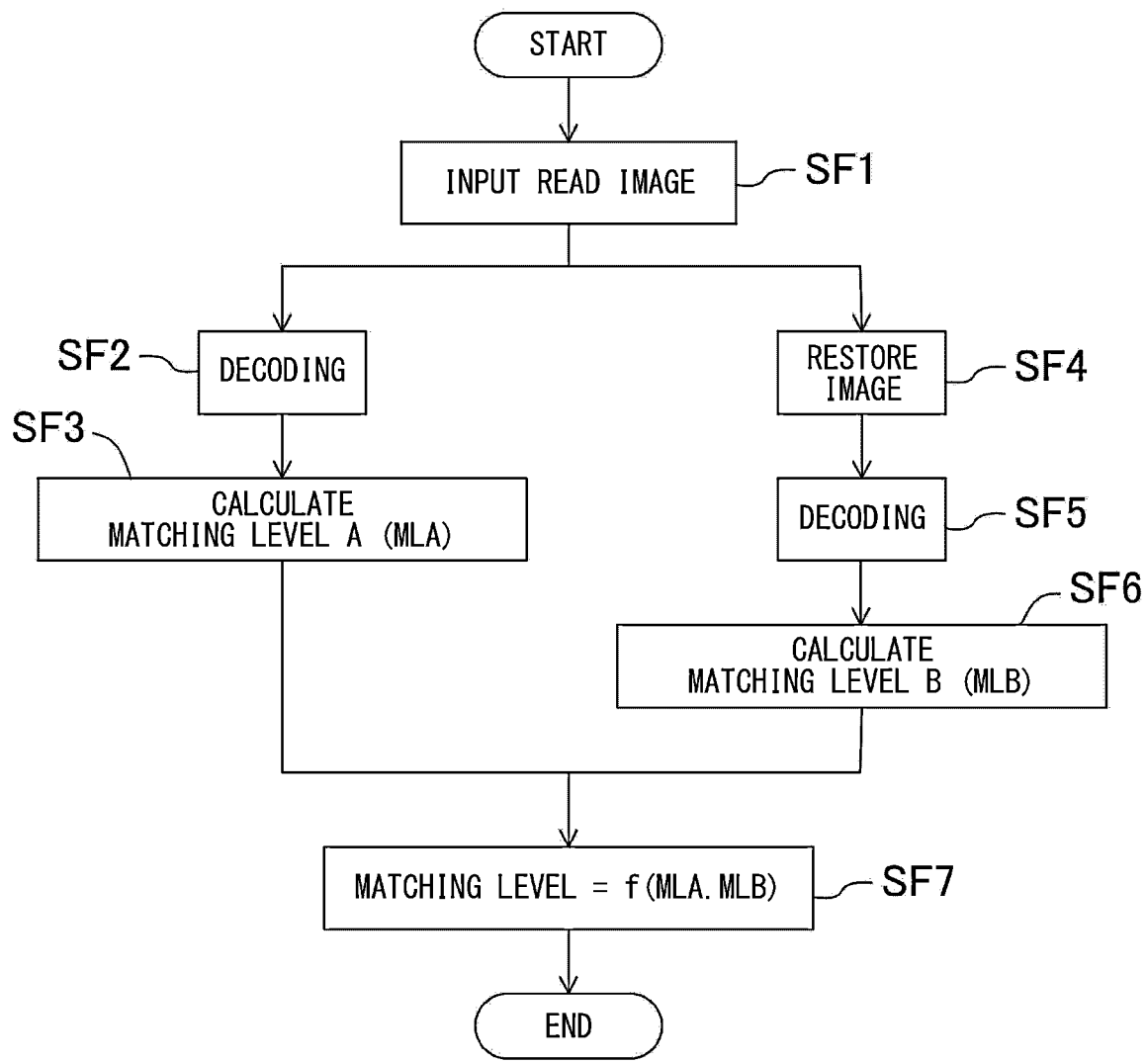
FIG. 36 is a flowchart illustrating an example of a process of calculating the matching level.

The matching level is set for each algorithm. In general, one algorithm is used for one code type. In the present embodiment, however, two algorithms (an algorithm with image restoration and an algorithm without image restoration) are executed for one code type by mounting the image restoration function. Between these two algorithms, a result of an algorithm in which decoding processing has succeeded earlier is output. Thus, there is a possibility that a value of the matching level becomes unstable in a case where the decoding processing succeeds alternately in the two algorithms. In addition, an image that is easily readable is obtained by executing image restoration, and thus, a matching level tends to be higher in a matching level calculation method, which is similar to the conventional method, than the existing matching level. On the other hand, in the present embodiment, a weighted sum of the matching levels of the two algorithms is taken to adjust the value of the matching level. Hereinafter, a specific example will be described with reference to a flowchart illustrated in FIG. 36.

In Step SF1 after the start, a code image is input to the decoding processing part 210. In Step SF2, the decoding processing part 210 executes the first decoding processing without restoring the image. In Step SF3, a matching level A (MLA) by the first decoding processing is calculated. On the other hand, in Step SF4, the code image is input to the inference processing part 20j to execute image restoration processing. Thereafter, the processing proceeds to Step SF5, and the decoding processing part 210 executes the second decoding processing on the restored image. In Step SF6, a matching level B (MLB) by the second decoding processing is calculated. Note that MLA=0 is obtained when decoding has not succeeded in Step SF2, and MLB=0 is obtained when decoding has not succeeded in Step SF5.

In Step SF7, values of MLA and MLB are adjusted using, for example, an averaging function or the like. In addition, a processing of weighting the value of MLA is performed even if the decoding has succeeded in either Step SF2 or Step SF5.

Example of User Interface

Figure 37:
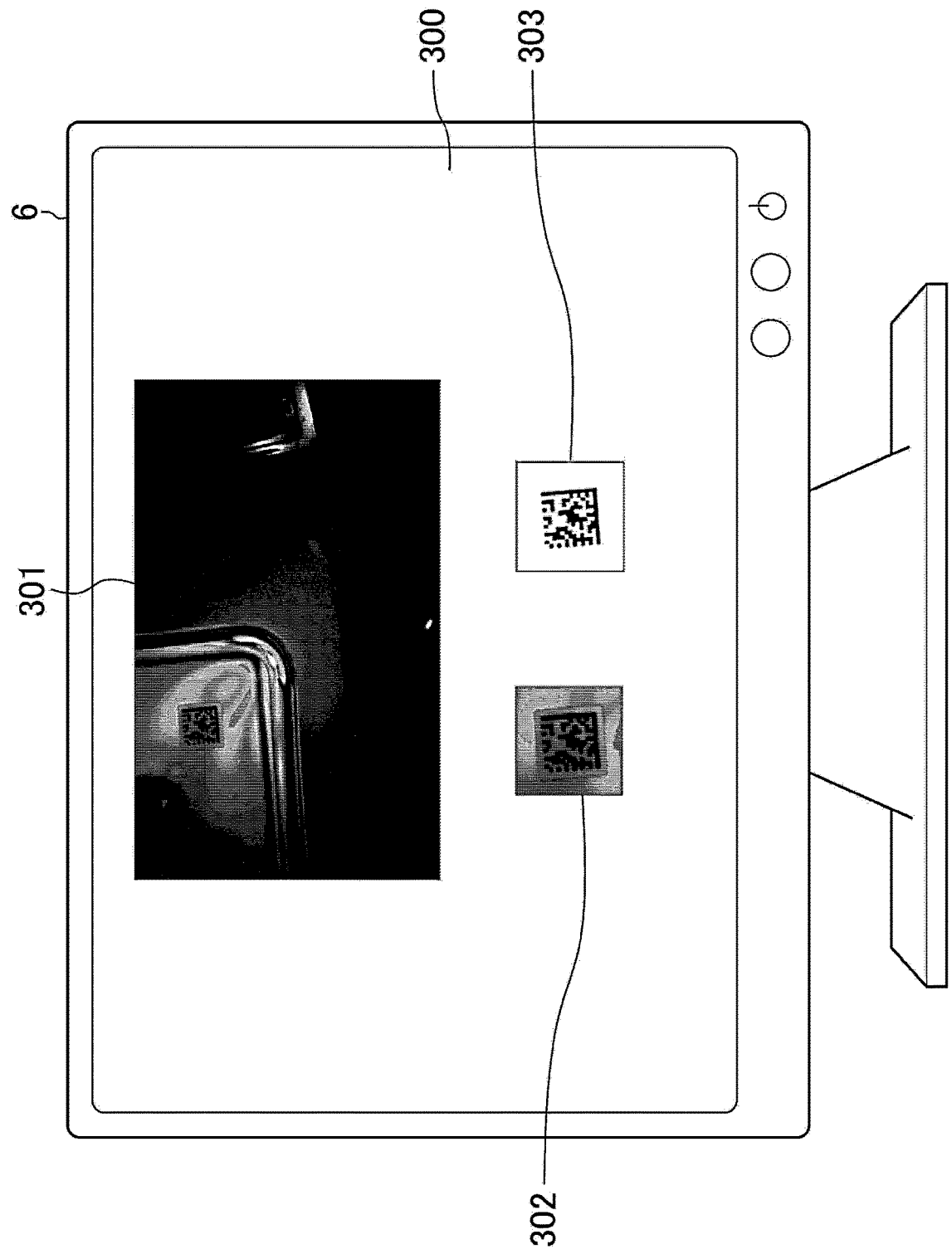
FIG. 37 is a view illustrating an example of a user interface displayed on a display part.

FIG. 37 is a view illustrating an example of a user interface 300 displayed on the display part 6. The processor 20 generates the user interface 300 and displays the user interface 300 on the display part 6. The user interface 300 is provided with a first image display region 301 in which an image (live-view image) currently captured by the camera 5 is displayed, a second image display region 302 in which a code image is displayed, and a third display region 303 in which a restored image restored by the inference processing part 20j is displayed. As a result, the code image and the restored image can be presented to the user in a comparable form. In addition, the user can grasp what kind of image an image on which decoding processing is to be executed or an image obtained after the execution of the decoding processing is.

Example of Imaging Element with AI Chip

Figure 38A:
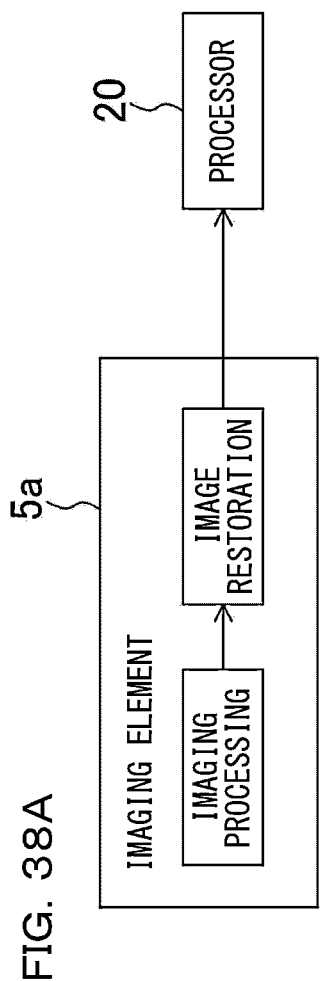
FIGS. 38A to 38C are diagrams illustrating examples of using an imaging element with an AI chip.
Figure 38B:
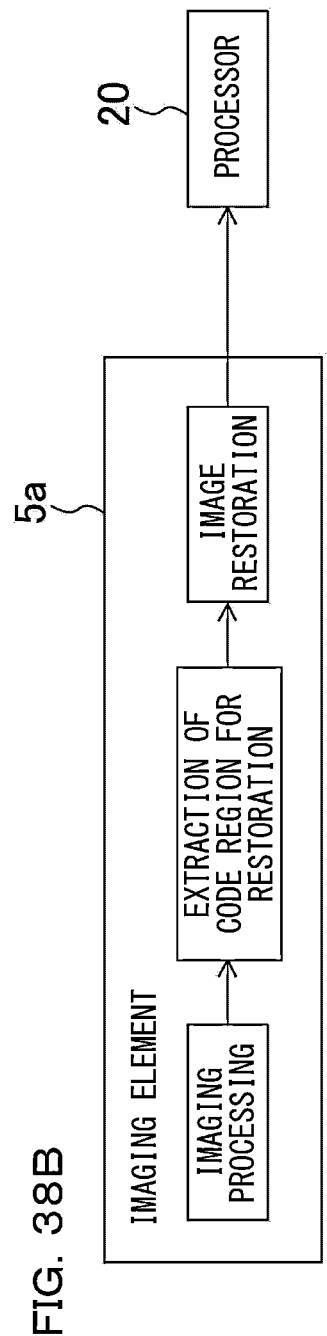
Figure 38C:
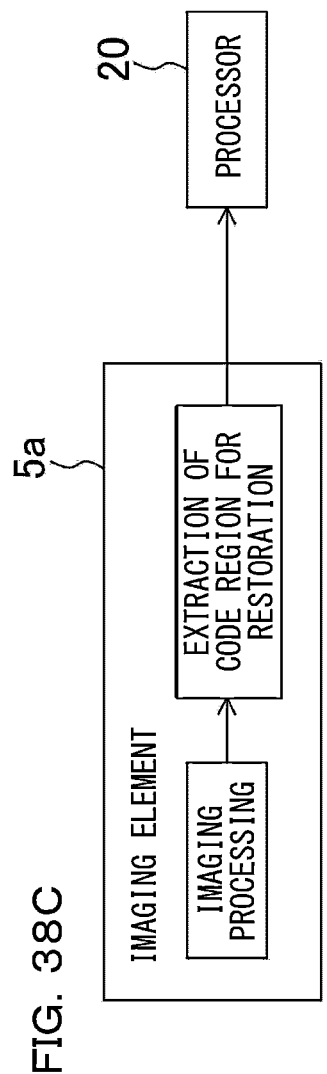

FIGS. 38A to 38C are diagrams illustrating examples of using the imaging element 5a with an AI chip. The imaging element 5a of the camera 5 can be configured as illustrated in the respective diagrams. FIG. 38A is a diagram illustrating a case where the imaging element 5a is provided with an AI chip executing image restoration and packaged, in which a code image is subjected to image restoration and then output to the processor 20. FIG. 38B is a diagram illustrating a case where the imaging element 5a is provided with an AI chip executing extraction of a code region for restoration and image restoration and packaged, in which the code region for restoration is extracted from a code image, and thereafter, a partial image corresponding to the region is subjected to image restoration and then output to the processor 20. FIG. 38C is a diagram illustrating a case where the imaging element 5a is provided with an AI chip executing extraction of a code region for restoration and packaged, in which the code region for restoration is extracted from a code image, and thereafter, a partial image corresponding to the region is output to the processor 20.

In the example illustrated in FIG. 38A, the code image acquired by the imaging element 5a may be output to the processor 20, the image restoration may be executed by the AI chip, and the restored image may be output to the processor 20. The same applies to the examples illustrated in FIG. 38B and FIG. 38C.

(Polarizing Filter Attachment 3)

In the present embodiment, the first illumination part 4a and the second illumination part 4b each of which is formed of the plurality of light emission diodes are provided as light sources to generate illumination light for illuminating at least a code as illustrated in FIG. 2. The polarizing filter attachment 3 includes a first polarizing plate 3a that allows passage of light of a first polarizing component out of light generated by the light emission diodes forming the second illumination part 4b, and a second polarizing plate 3b that allows passage of light of a second polarizing component substantially orthogonal to the first polarizing component. The first polarizing plate 3a and the second polarizing plate 3b can be provided respectively in hatched ranges in FIG. 2. For example, the first polarizing plate 3a is arranged so as to cover the second illumination part 4b, and the second polarizing plate 3b is arranged so as to cover the optical system 5b of the camera 5 from the light incident side.

Therefore, the camera 5 receives light that has passed through the first polarizing plate 3a and been reflected from a surface (code) of a workpiece W via the second polarizing plate 3b. As a result, a specular reflection component of the workpiece W is removed, and the camera 5 generates a code image with lower contrast as compared with a case where the first polarizing plate 3a and the second polarizing plate 3b are not interposed. The processor 20 acquires such a low-contrast code image. The processor 20 inputs the low-contrast code image to the neural network to convert the code image into a restored image with higher contrast than the contrast before the input, and executes decoding processing on the restored image.

That is, since the specular reflection component of the workpiece W is removed by using the polarizing plates 3a and 3b, it is possible to acquire the code image in which the influence of the specular reflection component has been reduced. For example, the polarizing plates 3a and 3b are suitable for an image having many specular reflection components as in a case where the image is obtained by capturing a metal workpiece, but there is a case where the code image becomes dark due to a decrease in the amount of light, and the contrast decreases. In such a case, the reading performance is improved by converting the code image into the restored image with the high contrast by the inference processing of the neural network.

The above-mentioned embodiment is merely an example in all respects, and should not be construed in a limited manner. Further, all modifications and changes belonging to the equivalent range of the claims fall within the scope of the present aspect.

As described above, the optical information reading device according to the present aspect can be used, for example, in the case of reading the code attached to the workpiece.

What is claimed is:

1. An optical information reading device for reading a code attached to a workpiece, the optical information reading device comprising:
 a camera that captures an image of the code and generates a code image;
 a storage that stores a structure and a parameter of a neural network configured to generate an ideal image corresponding to the code image, the neural network is either a first neural network for restoring a code having black cells on a white background or a second neural network for restoring a code having white cells on a black background; and a processor that inputs the code image into the neural network, executes an inference process to generate a restored image by restoring the code image, and decodes the restored image, wherein the processor executes a black-and-white inversion process, before inputting the code image into the neural network, to invert a black-and-white relationship of the code image to match a black-and-white relationship that can be restored by the neural network.

2. The optical information reading device according to claim 1,
wherein the processor inputs the code image with the black-and-white inversion process performed and the code image without the black-and-white inversion process performed to the neural network.

3. The optical information reading device according to claim 1,
only when the processor fails to decode the restored image generated by inputting the code image without the black-and-white inversion process to the neural network, the processor inputs the code image with the black-and-white inversion process performed to the neural network.

4. The optical information reading device according to claim 1, further comprising:
a setting part that accepts a selection of whether or not to perform the black-and-white inversion process, wherein
the processor performs the black-and-white inversion process on the code image before inputting the code image to the neural network when the setting part accepts a selection to perform the black-and-white inversion process.

5. The optical information reading device according to claim 1, further comprising:
an illumination unit having a plurality of groups each having light emitting elements for illuminating the code;
a translucent plate disposed in front of one of the plurality of groups; and
a polarizing plate disposed in front of another of the plurality of groups.

6. The optical information reading device according to claim 1,
an illumination unit having a plurality of groups each having light emitting elements for illuminating the code;
a translucent plate disposed in front of one of the plurality of groups; and
a diffuser plate disposed in front of another of the plurality of groups.

7. An optical information reading device for reading a code attached to a workpiece, the optical information reading device comprising:

a camera that captures an image of the code and generates a code image;
a storage that stores a structure and a parameter of each of a plurality of neural networks configured to generate an ideal image corresponding to the code image, the plurality of neural networks includes a first neural network for restoring a code having black cells on a white background and a second neural network for restoring a code having white cells on a black background; and
a processor that inputs the code image into at least one of the first neural network and the second neural network, executes an inference process to generate a restored image by restoring the code image, and decodes the restored image.

8. The optical information reading device according to claim 7,
the processor inputs the code image to both the first neural network and the second neural network, and decodes the restored image generated.

9. The optical information reading device according to claim 7,
only when the processor fails to decode a first restored image generated by inputting the code image into one of the first neural network and the second neural network, the processor inputs the code image into the other of the first neural network and the second neural network to generate a second restored image and decodes the second restored image.

10. The optical information reading device according to claim 7, further comprising:
a setting part that accepts a selection of which neural network to input the code image to among the first neural network and the second neural network, wherein
the processor inputs the code image to one of the first neural network and the second neural network accepted by the setting part to generate a restored image, and decodes the restored image.

11. The optical information reading device according to claim 7, further comprising:
an illumination unit having a plurality of groups each having light emitting elements for illuminating the code;
a translucent plate disposed in front of one of the plurality of groups; and
a polarizing plate disposed in front of another of the plurality of groups.

12. The optical information reading device according to claim 7,
an illumination unit having a plurality of groups each having light emitting elements for illuminating the code;
a translucent plate disposed in front of one of the plurality of groups; and
a diffuser plate disposed in front of another of the plurality of groups.

* * * * *